US011274660B2

(12) United States Patent
Radke

(10) Patent No.: US 11,274,660 B2
(45) Date of Patent: Mar. 15, 2022

(54) SYSTEMS AND METHODS FOR THE CAPTURE OF HEAT ENERGY, LONG-DISTANCE CONVEYANCE, STORAGE, AND DISTRIBUTION OF THE CAPTURED HEAT ENERGY AND POWER GENERATED THEREFROM

(71) Applicant: Lochterra Inc., Calgary (CA)

(72) Inventor: Gerald Alvin Radke, Calgary (CA)

(73) Assignee: Lochterra Inc., Calgary (CA)

( * ) Notice: Subject to any disclaimer, the term of this patent is extended or adjusted under 35 U.S.C. 154(b) by 0 days.

(21) Appl. No.: 17/390,127

(22) Filed: Jul. 30, 2021

(65) Prior Publication Data

US 2021/0355922 A1 Nov. 18, 2021

Related U.S. Application Data

(63) Continuation of application No. 17/293,834, filed as application No. PCT/CA2018/051431 on Nov. 13, 2018.

(51) Int. Cl.
*F03G 6/00* (2006.01)
*F01K 1/08* (2006.01)
(Continued)

(52) U.S. Cl.
CPC ................ *F03G 6/005* (2013.01); *F01K 1/08* (2013.01); *F01K 13/02* (2013.01); *F03G 7/04* (2013.01);
(Continued)

(58) Field of Classification Search
CPC ... F03G 6/005; F03G 7/04; F01K 1/08; F01K 13/02; F24D 10/00; F24D 2200/13; F17D 3/03
See application file for complete search history.

(56) References Cited

U.S. PATENT DOCUMENTS 5,788,418 A 8/1998 Kuehn
2006/0144595 A1 7/2006 Milligan et al.
2016/0097571 A1* 4/2016 Lenk ........................ F01K 3/06
62/238.7

FOREIGN PATENT DOCUMENTS

DE 102012217339 A1 3/2014
WO 2009149519 A1 12/2009

OTHER PUBLICATIONS

International Search Report issued in International Application No. PCT/CA2018/051431 dated Jul. 5, 2019 (3 pages).

(Continued)

*Primary Examiner* — Mark A Laurenzi
*Assistant Examiner* — Mickey H France
(74) *Attorney, Agent, or Firm* — Osha Bergman Watanabe & Burton LLP

(57) ABSTRACT

A stand-alone long-distance closed-loop heat energy capture, conveyance, and delivery system, comprises three closed-loop modules in serial communication. The first module is in communication with a first closed-loop piping infrastructure interconnected with a source of heat energy, and has a LBP liquid circulating therein whereby the LBP liquid is converted into its gas phase when flowing through the source of heat energy thereby capturing a portion of heat energy therefrom, and is converted into its liquid phase when flowing through a first heat exchanger that transfers the captured-heat energy to a second closed-loop piping infrastructure wherein also is circulating a LBP liquid. The second closed-loop module may extend for long distances. The captured-heat energy in the second module is transferred to a third closed-loop piping infrastructure wherein is also circulating a LBP liquid. The captured-heat energy is transferred from the third module to a delivery site.

7 Claims, 31 Drawing Sheets

100
104 Heat Energy Source
5 7 6
Heat Energy Capture and Power Generation Module
111 10 11 12 50 60 14 13
Control & Communication
51 52 53 62 24 110
126 Ground Surface
22 21 25 26 20
Line Bundle
Conveyance Module 65
Long Distance Lines
125
140b 140a Power User Heat User 140
53 41 42 40 Delivery Module
135 34 35 136 55 33 32
64 C&C 56 62 53 54 23
21 20 22 126

(51) Int. Cl.
*F03G 7/04* (2006.01)
*F01K 13/02* (2006.01)
*F24D 10/00* (2006.01)
*F17D 3/03* (2006.01)

(52) U.S. Cl.
CPC ................ *F24D 10/00* (2013.01); *F17D 3/03* (2013.01); *F24D 2200/13* (2013.01)

(56) References Cited

OTHER PUBLICATIONS

Written Opinion issued in International Application No. PCT/CA2018/051431 dated Jul. 5, 2019 (6 pages).
Examiner's Requisition issued in CA Application No. 3,102,576 dated Jan. 26, 2021 (5 pages).
Notice of Allowance issued in CA Application No. 3,102,576 dated Apr. 29, 2021 (1 page).

* cited by examiner

100
Heat Energy Source
104
Heat User
140a
Power User
140b
140
Delivery Module
135
136
Heat Energy Capture and Power Generation Module
110
111
Control & Communication
60
C & C
64
Long Distance Lines
Line Bundle
65
Ground Surface
Conveyance Module
125
126

100
Heat Energy Source
Heat Energy Capture and Power Generation Module
Control & Communication
Conveyance Module
Ground Surface
Line Bundle
Long Distance Lines
Delivery Module
Heat User
Power User
C & C 100
104a
104b
104c
Geothermal
Thermal Solar
Waste Heat
Heat Energy Source
104
110
Heat Energy Capture and Power Generation Module
Control & Communication
60
62
Ground Surface
111

100
Heat Energy Source
104
Fueled Boiler-Heater
Sole Source or
Supplemental
108
76
76m
77
77m
6
7
5
6m
7m
10
11
12
13
14
50
50m
51
51m
52
52m
53
53a
21a
22c
22b
24
21
22
60
62
Control
&
Communication
Heat Energy Capture and
Power Generation
Module
110
111
Ground Surface 100
Heat Energy Source
Heat Energy Capture and Power Generation Module
Control & Communication
Ground Surface
Conveyance Module
Line Bundle
Long Distance Lines
Delivery Module
C & C
Power User
Heat User
140
140a
140b
104
110
111
125
126
135
136
65
5
6
7
11
12
13
14
15
20
21
22
23
24
25
26
32
33
34
35
40
41
42
50
51
52
53
54
55
56
60
62
64
M 100
104
104a
104b
104c
Geothermal
Thermal Solar
Waste Heat
Heat Energy Source
15
6
7
5
6m
7m
110
Heat Energy Capture and Power Generation Module
Control & Communication
60
62
11
12
13
14
50
50m
51
51m
52
52m
53
53a
21
21a
22
22b
22c
24
111
Ground Surface

100

100
Power Grid
Smart Energy Grid
Local Distributed Grid
106c
106d
106e
Delivered Power or Supplemental Source
106
Heat Energy Source
104
Heat Energy Capture and Power Generation Module
110
Control & Communication
60
62
Ground Surface
111

200
210
Heat Energy Capture Module
Control & Communication
60
62
Delivered Power or Supplemental Source
Heat Energy Source
204
206
211
226
225
Ground Surface
80
80m
52m
52
53
53a
51
51m
6
6m
7
7m
5
10
13
14
16
21
21a
22
22b
22c
24
25
26
20

400
Delivery Module
435a
Delivery Module
435b
Delivery Module
435c
Delivery Module
435d
Delivery Module
435e
Delivery Module
435f
Delivery Module
435g
425
425a
425b
425c
425d
425e
425f
425g
Heat Capture and Power Generation Module
410

500
Index to Symbols in Fig. 13
540e
540f
540g
540h
510b
510c
510d
515a
515b
506a
506b
540a
540b
540c
540d
510a
502
504
525
525a
525b
525c
525d
535a
535b
535c
535d
535e
535f
535g
535h
515aa
515bb
506aa
506bb
502a
504a
551
552
553
554
555
557
558
559
560
561
562

551
Geothermal Heat Source
552
Waste Heat Source
553
Fuel Fired Heat Source
554
Thermal Solar Heat Source
555
Heat Source Power Generation
556
Fuel Fired Power Generation
557
Wind Power Generation
558
PV Solar Power Generation
559
Heat User
560
Power User
561
Heat Storage
562
Power Storage 100
Heat User
Power User
140a
140b
640
Delivery Module
635
Long Distance Lines
Line Bundle
Heat Energy Capture and Power Generation Module
110
Control & Communication
C & C
Heat Energy Source
104
Ground Surface
Conveyance Module
125
126
136
111
65

FIG. 18

Thermodynamic Model Operating Paramaters - 80°C Source Temperature

| Unit Number | Unit Description | Inlet of unit State Point | Inlet P, Bar | Inlet T, °C | Inlet Enthalpy kJ/kg | Inlet Entropy kJ/kg°K | Outlet of Unit State Point | Outlet P, Bar | Outlet T, °C | Outlet Enthalpy kJ/kg | Outlet Entropy kJ/kg°K |
|---|---|---|---|---|---|---|---|---|---|---|---|
| Heat Capture and Power Generation Loop - Ammonia | | | | | | | | | | | |
| *80 ° C source temperature & 0 ° C outlet temperature* | | | | | | | | | | | |
| 14 | pump | 1 | 4.3 | 0 | 200 | 1.00 | 2 | 13.5 | 2 | 202 | 1.00 |
| 10 | source heat exchanger | 2 | 13.5 | 2 | 202 | 1.00 | 3 | 13.5 | 80 | 1,620 | 5.62 |
| 11,12 | expander & generator | 3 | 13.5 | 80 | 1,620 | 5.62 | 4 | 4.3 | 0 | 1,462 | 5.62 |
| 13 | source-conveyance heat exchanger | 4 | 4.3 | 0 | 1,462 | 5.62 | 1 | 4.3 | 0 | 200 | 1.00 |
| Conveyance Loop - Ethane | | | | | | | | | | | |
| *0 ° C conveyance temperature & 15 ° C outlet temperature* | | | | | | | | | | | |
| 23 | compressor | 5,6 | 23.9 | 0 | 551 | 2.17 | 7 | 33.5 | 20 | 565 | 2.17 |
| 32 | conveyance-delivery heat exchanger | 7 | 33.5 | 20 | 565 | 2.17 | 8 | 33.5 | 15 | 304 | 1.25 |
| 24 | expansion valve | 8,9 | 33.5 | 15 | 304 | 1.25 | 10 | 23.9 | 0 | 304 | 1.29 |
| 13 | source-conveyance heat exchanger | 10 | 23.9 | 0 | 304 | 1.29 | 5,6 | 23.9 | 0 | 551 | 2.17 |
| Delivery Loop - Difluoromethane (R32) | | | | | | | | | | | |
| *15 ° C delivery temperature & 60 ° C outlet temperature* | | | | | | | | | | | |
| 33 | compressor | 11 | 12.8 | 15 | 517 | 2.10 | 12 | 26.1 | 60 | 543 | 2.10 |
| 34 | delivery heat exchanger | 12 | 26.1 | 60 | 543 | 2.10 | 13 | 26.1 | 42 | 280 | 1.27 |
| 35 | expansion valve | 13 | 26.1 | 42 | 280 | 1.27 | 14 | 12.8 | 15 | 280 | 1.29 |
| 32 | conveyance-delivery heat exchanger | 14 | 12.8 | 15 | 280 | 1.29 | 11 | 12.8 | 15 | 517 | 2.10 |

Saturation Pressure, Bar
125
100
75
50
25
0
(25)
0
25
50
75
100
125
150
T °C
Carbon Dioxide
Ethane
Difluoromethane
Ammonia
Propane
1,1-Difluoroethane FIG. 22
FIG. 22A
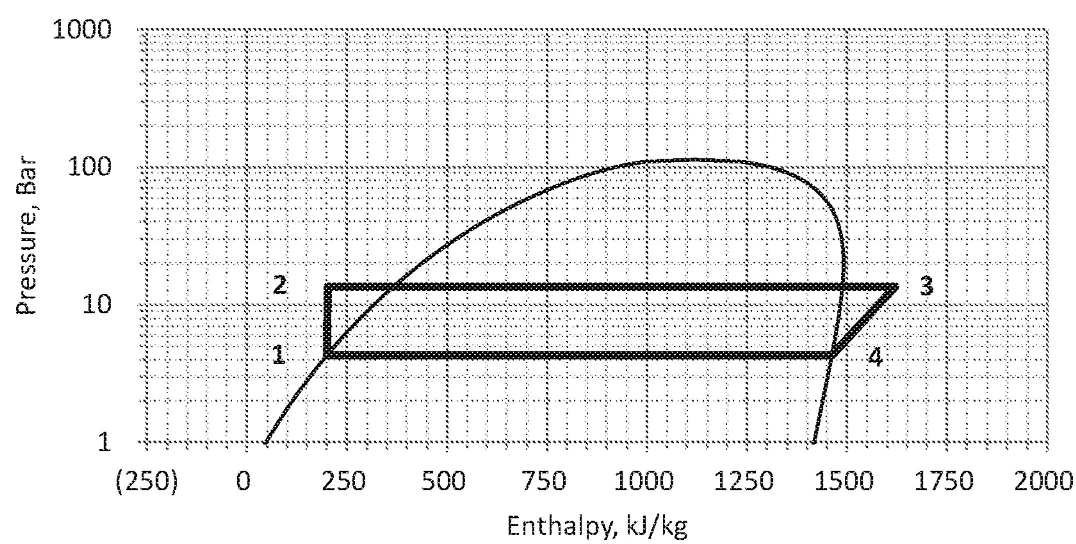
FIG. 22B
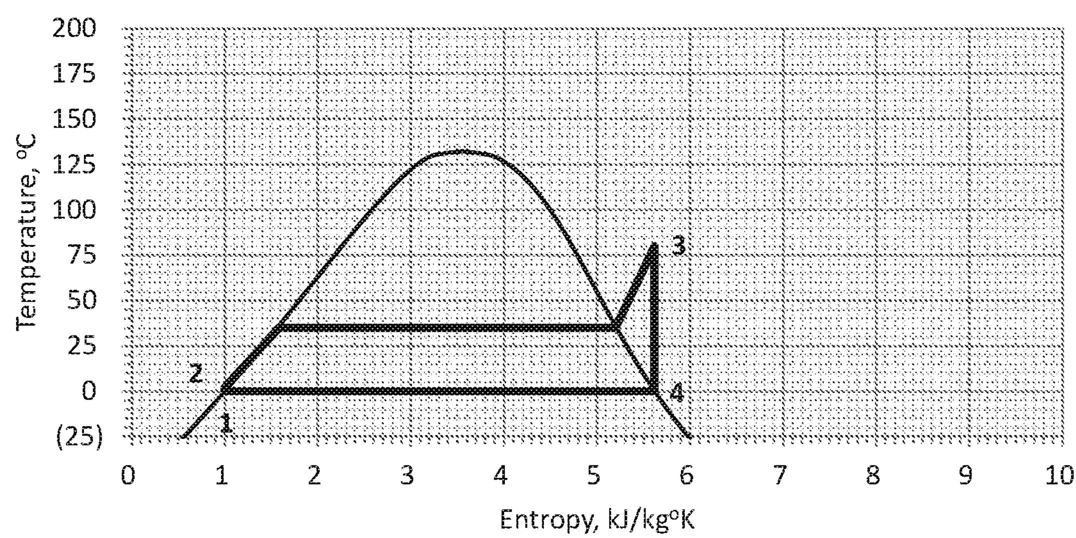

FIG. 23
FIG. 23A
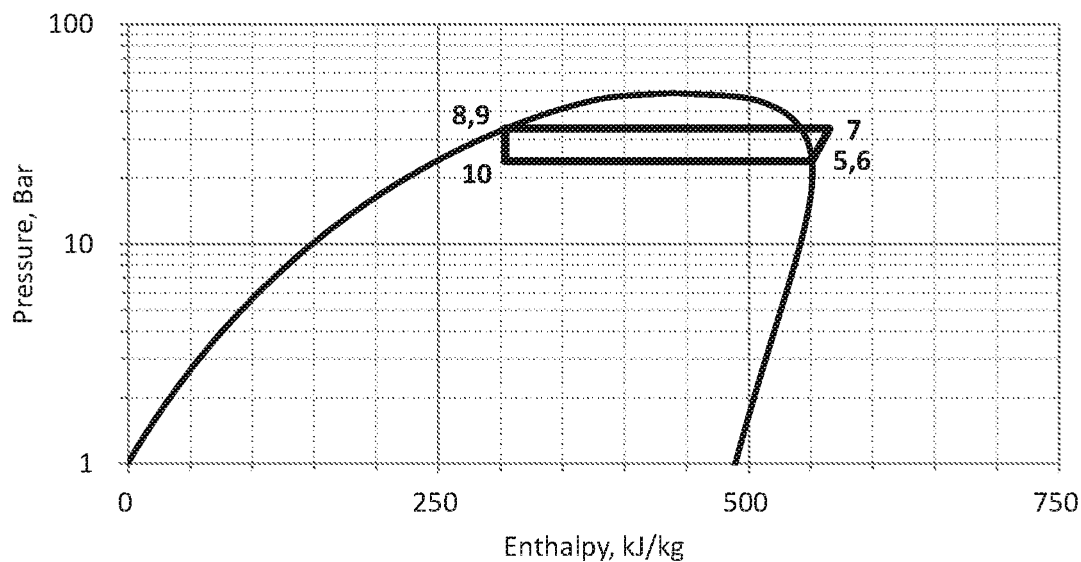
FIG. 23B
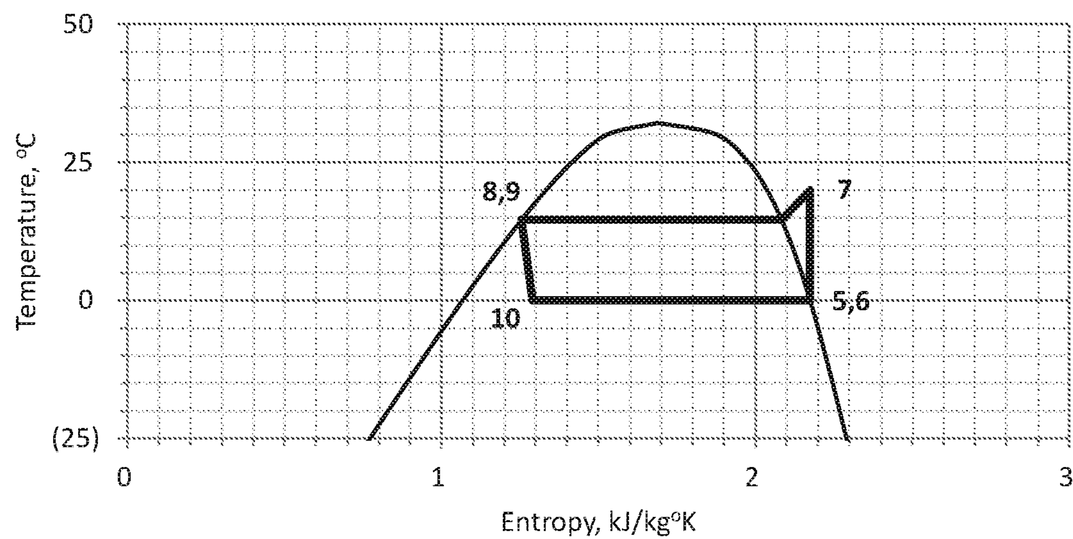

FIG. 24
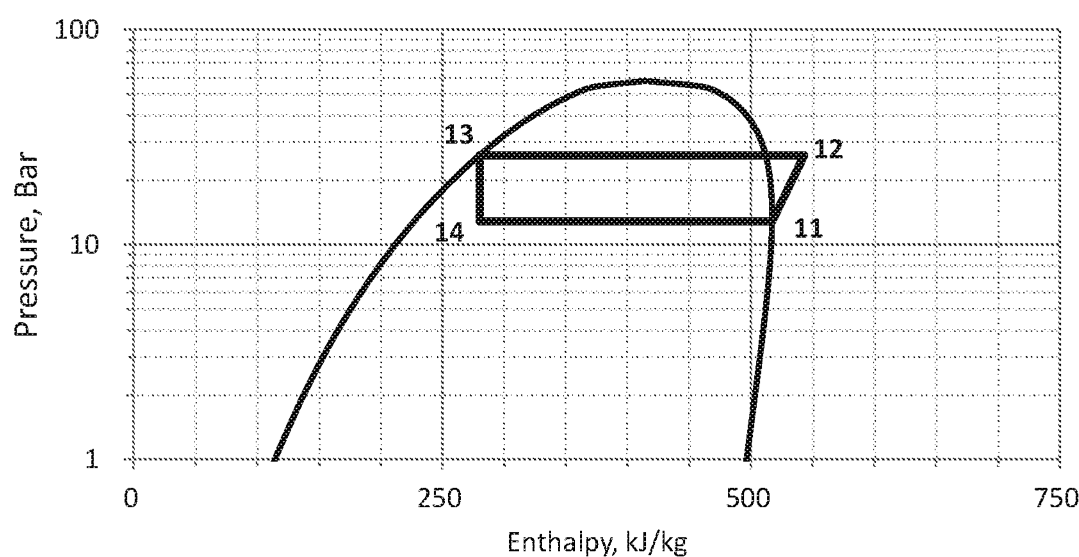
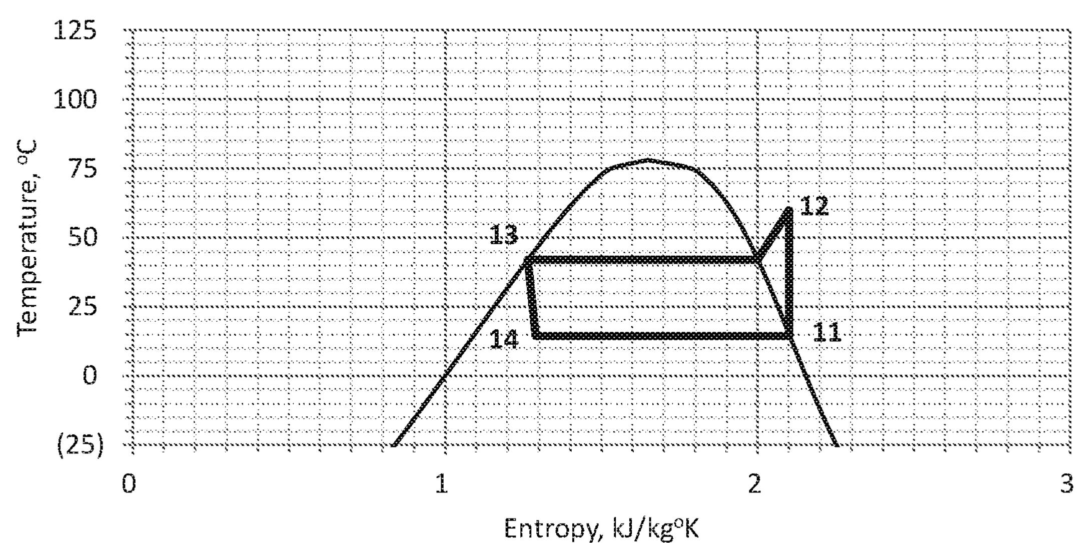

FIG. 25

Energy Balance Calculations - Summary

| Unit Number | Unit Description | Flow Rate kg/s | 60°C Enthalpy Rate kJ/s | 60°C Power kW | 80°C Enthalpy Rate kJ/s | 80°C Power kW | 100°C Enthalpy Rate kJ/s | 100°C Power kW | 120°C Enthalpy Rate kJ/s | 120°C Power kW | 140°C Enthalpy Rate kJ/s | 140°C Power kW |
|---|---|---|---|---|---|---|---|---|---|---|---|---|
| Heat Capture and Power Generation Loop - Ammonia | | | | | | | | | | | | |
| *@ source temperature & 0° C outlet temperature* | | | | | | | | | | | | |
| 14 | pump | 1.00 | 2 | (2) | 2 | (2) | 2 | (2) | 2 | (2) | 2 | (2) |
| 10 | source heat exchanger | 1.00 | 1,379 | | 1,418 | | 1,456 | | 1,498 | | 1,538 | |
| 11,12 | expander & generator | 1.00 | (119) | 119 | (158) | 158 | (196) | 196 | (238) | 238 | (278) | 278 |
| 13 | source-conveyance heat exchanger | 1.00 | (1,262) | | (1,262) | | (1,262) | | (1,262) | | (1,262) | |
| Conveyance Loop - Ethane | | | | | | | | | | | | |
| *0° C conveyance temperature & 15° C outlet temperature* | | | | | | | | | | | | |
| 23 | compressor | 5.10 | 72 | (72) | 72 | (72) | 72 | (72) | 72 | (72) | 72 | (72) |
| 32 | conveyance-delivery heat exchanger | 5.10 | (1,334) | | (1,334) | | (1,334) | | (1,334) | | (1,334) | |
| 24 | expansion valve | 5.10 | 0 | | 0 | | 0 | | 0 | | 0 | |
| 13 | source-conveyance heat exchanger | 5.10 | 1,262 | | 1,262 | | 1,262 | | 1,262 | | 1,262 | |
| Delivery Loop - Difluoromethane (R32) | | | | | | | | | | | | |
| *15° C delivery temperature & 60° C outlet temperature* | | | | | | | | | | | | |
| 33 | compressor | 5.63 | 147 | (147) | 147 | (147) | 147 | (147) | 147 | (147) | 147 | (147) |
| 34 | delivery heat exchanger | 5.63 | (1,480) | | (1,480) | | (1,480) | | (1,480) | | (1,480) | |
| 35 | expansion valve | 5.63 | 0 | | 0 | | 0 | | 0 | | 0 | |
| 32 | conveyance-delivery heat exchanger | 5.63 | 1,334 | | 1,334 | | 1,334 | | 1,334 | | 1,334 | |
| Power Produced | | | | 119 | | 158 | | 196 | | 238 | | 278 |
| Power Used | | | | (220) | | (220) | | (220) | | (220) | | (220) |
| Net Power | | | | (101) | | (63) | | (25) | | 18 | | 58 |
| Fraction of Power Requirements Produced | | | | 0.54 | | 0.72 | | 0.89 | | 1.08 | | 1.26 |
| Fraction of Source Energy utilized for Power Generation | | | | 0.086 | | 0.111 | | 0.134 | | 0.159 | | 0.181 |

FIG. 26
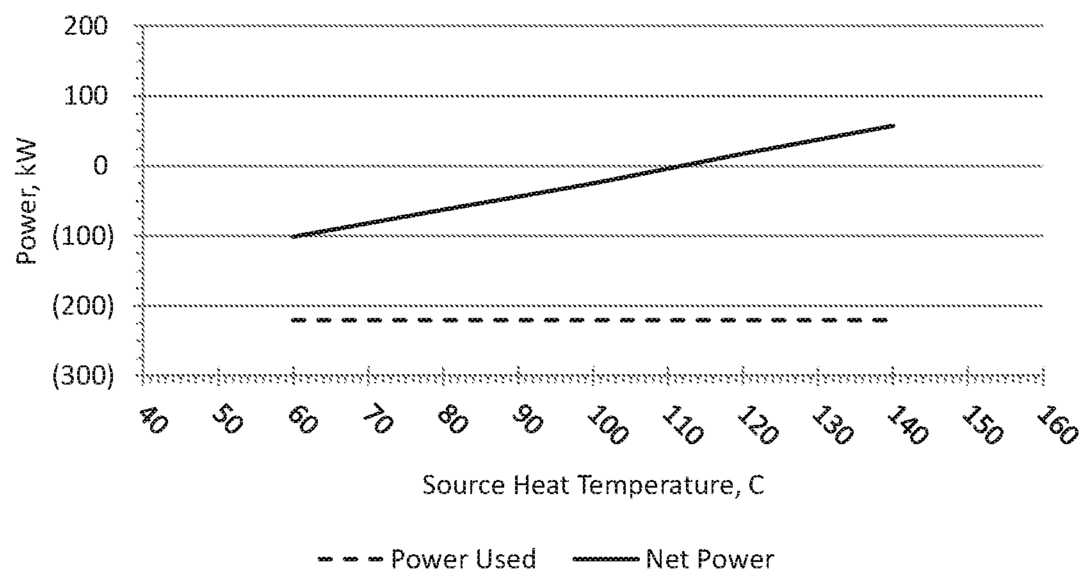
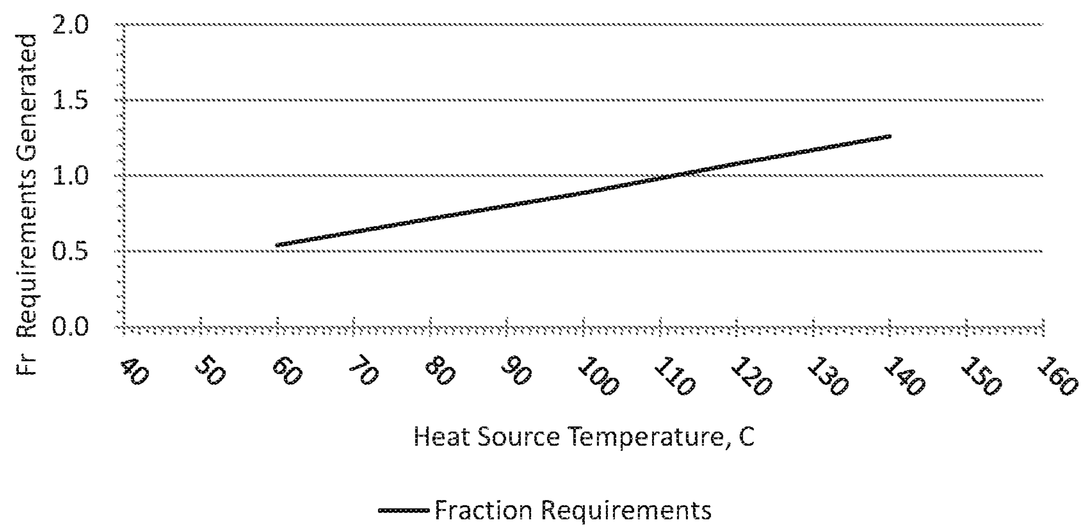

FIG. 27

Example Project

| Element | 60°C Values | 80°C Values | 100°C Values | 120°C Values | 140°C Values |
|---|---|---|---|---|---|
| | Heat Energy Source Temperature | | | | |
| Heat Capture and Power Generation Loop - Ammonia | | | | | |
| circulation rate, kg/s | 1.00 | 1.00 | 1.00 | 1.00 | 1.00 |
| power supply (-) delivered (+), kW | (101) | (63) | (25) | 18 | 58 |
| heat energy in, kW | 1,379 | 1,418 | 1,456 | 1,498 | 1,538 |
| power generated, kW | 119 | 158 | 196 | 238 | 278 |
| power generated, hp | 160 | 212 | 262 | 319 | 373 |
| heat energy out, kW | 1,262 | 1,262 | 1,262 | 1,262 | 1,262 |
| Conveyance Loop - Ethane | | | | | |
| circulation rate, kg/s | 5.10 | 5.10 | 5.10 | 5.10 | 5.10 |
| circulation rate, m3/d | 706 | 706 | 706 | 706 | 706 |
| power used, kW | 72 | 72 | 72 | 72 | 72 |
| power used, hp | 96 | 96 | 96 | 96 | 96 |
| Delivery Loop - Difluoromethane (R32) | | | | | |
| circulation rate, kg/s | 5.63 | 5.63 | 5.63 | 5.63 | 5.63 |
| circulation rate, m3/d | 779 | 779 | 779 | 779 | 779 |
| power used, kW | 147 | 147 | 147 | 147 | 147 |
| power used, hp | 197 | 197 | 197 | 197 | 197 |
| heat energy out, kW | 1,480 | 1,480 | 1,480 | 1,480 | 1,480 |
| At the Residences | | | | | |
| heat duty per residence, Btu/hr | 80,000 | 80,000 | 80,000 | 80,000 | 80,000 |
| heat duty per residence, kW | 23.4 | 23.4 | 23.4 | 23.4 | 23.4 |
| possible number of residences | 63 | 63 | 63 | 63 | 63 |
| conveyance loop power per residence, kW | 1.13 | 1.13 | 1.13 | 1.13 | 1.13 |
| conveyance loop power per residence, hp | 1.52 | 1.52 | 1.52 | 1.52 | 1.52 |
| delivery loop power per residence, kW | 2.32 | 2.32 | 2.32 | 2.32 | 2.32 |
| delivery loop per residence, hp | 3.12 | 3.12 | 3.12 | 3.12 | 3.12 |
| power supply (-) delivered (+) per residence, kW | (1.60) | (0.99) | (0.39) | 0.28 | 0.91 |
| At the Deep Aquifer Geothermal Heat Energy Source | | | | | |
| water inlet enthalpy @ source temp, kJ/kg | 251 | 335 | 419 | 504 | 589 |
| water outlet enthalpy 0°C outlet temp, kJ/kg | 0 | 0 | 0 | 0 | 0 |
| delta enthalpy, kJ/kg | 251 | 335 | 419 | 504 | 589 |
| heat energy source water circulation rate, kg/s | 5.49 | 4.23 | 3.47 | 2.97 | 2.61 |
| heat energy source water circulation rate, $m^3/s$ | 0.0055 | 0.0042 | 0.0035 | 0.0030 | 0.0026 |
| heat energy source water circulation rate, $m^3/d$ | 474 | 366 | 300 | 257 | 226 |
| heat energy source water circulation rate, bbls/d | 2,984 | 2,300 | 1,887 | 1,616 | 1,419 |

FIG. 28

Thermodynamic Model Operating Paramaters - 80°C Source Temperature

| | | Inlet of unit | | | | | Outlet of Unit | | | | |
|---|---|---|---|---|---|---|---|---|---|---|---|
| Unit Number | Unit Description | State Point | P, Bar | T, °C | Enthalpy kJ/kg | Entropy kJ/kg°K | State Point | P, Bar | T, °C | Enthalpy kJ/kg | Entropy kJ/kg°K |
| Heat Capture and Power Generation Loop - Ammonia | | | | | | | | | | | |
| *80° C source temperature & 15° C outlet temperature* | | | | | | | | | | | |
| 14 | pump | 1 | 7.3 | 15 | 270 | 1.25 | 2 | 17.8 | 17 | 272 | 1.25 |
| 10 | source heat exchanger | 2 | 17.8 | 17 | 272 | 1.25 | 3 | 17.8 | 80 | 1,602 | 5.43 |
| 11,12 | expander & power generator | 3 | 17.8 | 80 | 1,602 | 5.43 | 4 | 7.3 | 15 | 1,476 | 5.43 |
| 13 | source-conveyance heat exchanger | 4 | 7.3 | 15 | 1,476 | 5.43 | 1 | 7.3 | 15 | 270 | 1.25 |
| Conveyance Loop - Ethane | | | | | | | | | | | |
| *15° C conveyance temperature & 60° C outlet temperature* | | | | | | | | | | | |
| 23 | compressor | 5,6 | 33.8 | 15 | 542 | 2.08 | 7 | 63.1 | 60 | 576 | 2.08 |
| 337 | conveyance-delivery heat exchanger | 7 | 63.1 | 60 | 576 | 2.08 | 8 | 63.1 | 18 | 305 | 1.25 |
| 24 | expansion valve | 8,9 | 63.1 | 18 | 305 | 1.25 | 10 | 33.8 | 15 | 305 | 1.26 |
| 13 | source-conveyance heat exchanger | 10 | 33.8 | 15 | 305 | 1.26 | 5,6 | 33.8 | 15 | 542 | 2.08 |

FIG. 29

Energy Balance Calculations - Summary

| Unit Number | Unit Description | Flow Rate kg/s | 60°C Enthalpy Rate kJ/s | 60°C Power kW | 80°C Enthalpy Rate kJ/s | 80°C Power kW | 100°C Enthalpy Rate kJ/s | 100°C Power kW | 120°C Enthalpy Rate kJ/s | 120°C Power kW | 140°C Enthalpy Rate kJ/s | 140°C Power kW |
|---|---|---|---|---|---|---|---|---|---|---|---|---|
| Heat Capture and Power Generation Loop - Ammonia | | | | | | | | | | | | |
| *@ source temperature & 15 ° C outlet temperature* | | | | | | | | | | | | |
| 14 | pump | 1.00 | 2 | (2) | 2 | (2) | 2 | (2) | 2 | (2) | 2 | (2) |
| 10 | source heat exchanger | 1.00 | 1,291 | | 1,330 | | 1,370 | | 1,407 | | 1,444 | |
| 11,12 | expander & power generator | 1.00 | (87) | 87 | (126) | 126 | (165) | 165 | (203) | 203 | (240) | 240 |
| 13 | source-conveyance heat exchanger | 1.00 | (1,206) | | (1,206) | | (1,206) | | (1,206) | | (1,206) | |
| Conveyance Loop - Ethane | | | | | | | | | | | | |
| *15 ° C conveyance temperature & 60 ° C outlet temperature* | | | | | | | | | | | | |
| 23 | compressor | 5.10 | 176 | (176) | 176 | (176) | 176 | (176) | 176 | (176) | 176 | (176) |
| 337 | conveyance-delivery heat exchanger | 5.10 | (1,383) | | (1,383) | | (1,383) | | (1,383) | | (1,383) | |
| 24 | expansion valve | 5.10 | 0 | | 0 | | 0 | | 0 | | 0 | |
| 13 | source-conveyance heat exchanger | 5.10 | 1,206 | | 1,206 | | 1,206 | | 1,206 | | 1,206 | |
| Power Produced | | | | 87 | | 126 | | 165 | | 203 | | 240 |
| Power Used | | | | (178) | | (178) | | (178) | | (178) | | (178) |
| Net Power | | | | (91) | | (53) | | (13) | | 25 | | 61 |
| Fraction of Power Requirements Produced | | | | 0.49 | | 0.70 | | 0.93 | | 1.14 | | 1.34 |
| Fraction of Source Energy utilized for Power Generation | | | | 0.067 | | 0.094 | | 0.121 | | 0.144 | | 0.166 |

FIG. 30
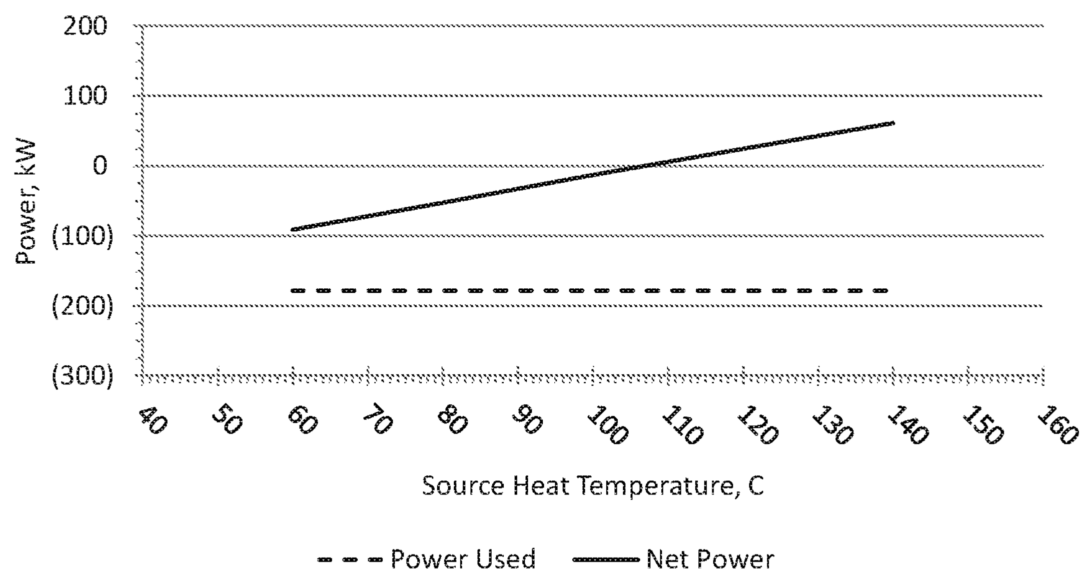
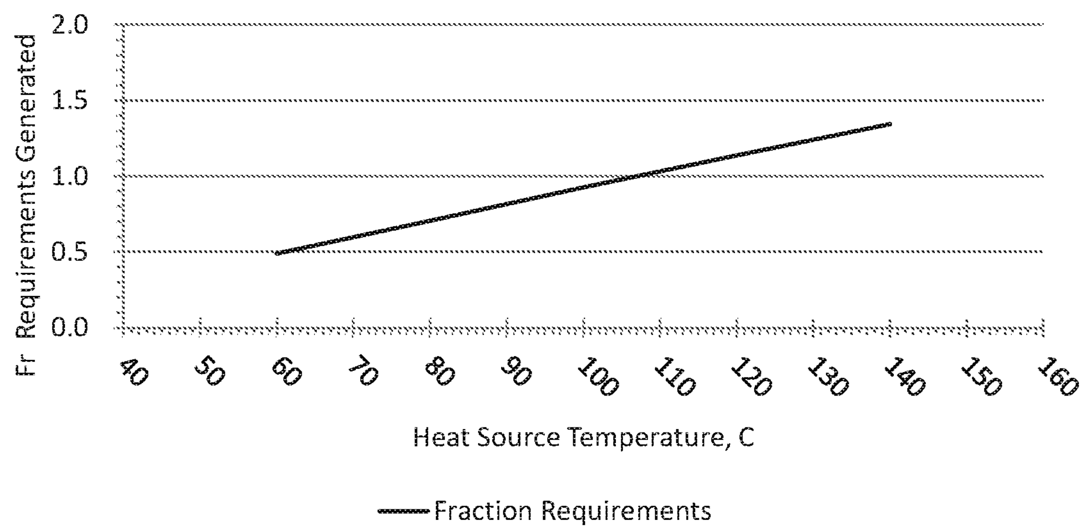

FIG. 31

Example Project

| Element | Heat Energy Source Temperature 60°C Values | 80°C Values | 100°C Values | 120°C Values | 140°C Values |
|---|---|---|---|---|---|
| Heat Capture and Power Generation Loop - Ammonia | | | | | |
| circulation rate, kg/s | 1.00 | 1.00 | 1.00 | 1.00 | 1.00 |
| power supply (-) delivered (+) | (91) | (53) | (13) | 25 | 61 |
| heat energy in, kW | 1,291 | 1,330 | 1,370 | 1,407 | 1,444 |
| power generated, kW | 87 | 126 | 165 | 203 | 240 |
| power generated, hp | 117 | 168 | 222 | 272 | 321 |
| heat energy out, kW | 1,206 | 1,206 | 1,206 | 1,206 | 1,206 |
| Conveyance-Delivery Loop - Ethane | | | | | |
| circulation rate, kg/s | 5.10 | 5.10 | 5.10 | 5.10 | 5.10 |
| circulation rate, m3/d | 706 | 706 | 706 | 706 | 706 |
| power used, kW | 176 | 176 | 176 | 176 | 176 |
| power used, hp | 236 | 236 | 236 | 236 | 236 |
| heat energy out, kW | 1,383 | 1,383 | 1,383 | 1,383 | 1,383 |
| At the Residences | | | | | |
| heat duty per residence, Btu/hr | 80,000 | 80,000 | 80,000 | 80,000 | 80,000 |
| heat duty per residence, kW | 23.4 | 23.4 | 23.4 | 23.4 | 23.4 |
| possible number of residences | 59 | 59 | 59 | 59 | 59 |
| conveyance-delivery loop power/residence, kW | 2.99 | 2.99 | 2.99 | 2.99 | 2.99 |
| conveyance-delivery loop power/residence, hp | 4.01 | 4.01 | 4.01 | 4.01 | 4.01 |
| power supply (-) delivered (+) per residence, kW | (1.55) | (0.89) | (0.22) | 0.42 | 1.04 |
| At the Deep Aquifer Geothermal Heat Energy Source | | | | | |
| water inlet enthalpy @ source temp, kJ/kg | 251 | 335 | 419 | 504 | 589 |
| water outlet enthalpy 0°C outlet temp, kJ/kg | 0 | 0 | 0 | 0 | 0 |
| delta enthalpy, kJ/kg | 251 | 335 | 419 | 504 | 589 |
| heat energy source water circulation rate, kg/s | 5.14 | 3.97 | 3.27 | 2.79 | 2.45 |
| heat energy source water circulation rate, $m^3/s$ | 0.0051 | 0.0040 | 0.0033 | 0.0028 | 0.0025 |
| heat energy source water circulation rate, $m^3/d$ | 444 | 343 | 282 | 241 | 212 |
| heat energy source water circulation rate, bbls/d | 2,794 | 2,158 | 1,776 | 1,518 | 1,332 |

SYSTEMS AND METHODS FOR THE CAPTURE OF HEAT ENERGY, LONG-DISTANCE CONVEYANCE, STORAGE, AND DISTRIBUTION OF THE CAPTURED HEAT ENERGY AND POWER GENERATED THEREFROM

TECHNICAL FIELD

Various embodiments disclosed herein generally relate to systems, equipment, and methods for capture of heat energy and the long-distance conveyance, storage, and distribution of the captured-heat energy to users. More specifically, this disclosure relates to the long-distance conveyance, storage, and distribution of captured-heat energy at ambient temperatures by utilizing the latent heat energy of low-boiling-point fluids in conveyance lines, and to the utilization of some of the captured-heat energy for power the generation at or near heat capture locations.

BACKGROUND

The effective capture and utilization of heat energy, in particular lower-temperature heat energy from sources such as geothermal, thermal solar, waste heat, cogeneration, combined heat and power (CHP), fueled boiler-heater, steam, and the like, for generating power and providing heating offers vast potential for energy efficiencies, development of renewable energy sources, and reduction of $CO_2$ emissions.

There have been considerable efforts to capture and utilize these types of heat energy either as stand-alone projects or through district energy distribution systems, often also known as district heating systems, district energy sharing systems, or community distributed energy systems.

Historically, district heating systems have been largely fuel-fired central heating plants, often with cogeneration, that produce and distribute the heat energy as high-temperature steam or hot water. Most district energy sharing installations in North America are part of institutional infrastructures such as hospital complexes, university campuses, and in urban centers. In Europe, many district heating systems are located in urban centers and are similarly characterized by combustion-fueled heating plants that distribute steam or hot water. One limitation of such systems is the limited feasible areal extent due to heat losses from flowlines that carry steam or hot water. Furthermore, such district heating systems and district energy sharing systems are not systems per se because they simply deliver heat energy in one direction in response to demand.

Many district heat systems have been commissioned to utilize low-temperature heat energy sources such as low-enthalpy (low temperature) geothermal sources. However, the utilization of fluids such as hot water, limits the temperature ranges available for use to convey and deliver captured-heat energy via the sensible heat contained in the hot water and thereby, limits the feasible areal extent of such systems.

Organic Rankine Cycle (ORC) and other technologies such as Kalina cycle, sterling engine cycle, absorption, and the like, have been implemented to generate power from lower-temperature heat energy sources, whereby low-temperature vaporization-point fluids also commonly referred to as low-boiling-point fluids, such as ammonia, commercial refrigerants, $CO_2$, volatile hydrocarbons, and the like are utilized. Heat energy that is not converted to mechanical energy for power generation is normally ejected because the exit temperatures are too low for heat utilization. As well, heat-sink temperatures restricted to ambient temperatures limit the viability of lower-temperature heat sources for power generation.

Many communities, industrial installations, and resource-extraction installations are isolated from cost-effective power and energy supply and distribution infrastructures because they may be located in remote sparsely populated areas or in regions with poor infrastructures. Often these communities and installations have to rely on high-transport-cost bulk liquid fuels such as diesel, to power generators and for fuel-fired heating. In arctic and near-arctic regions, transportation of such materials is often seasonal with water-barge transport during the summer months and by overland road trucking in the winter, and in certain cases, via air. Also, on-site construction, installation, and commissioning costs are very high in such regions.

Impacts of catastrophic events such as hurricanes and earthquakes require stand-alone self-sufficient power generation and heating capacity that can be quickly set up on an emergency or temporary basis.

SUMMARY

The embodiments of the present disclosure generally relate to stand-alone systems, apparatus, and methods for:
(i) capturing heat energy from sources such as geothermal, thermal solar, waste heat, cogeneration, combined heat and power (CHP), fueled boiler-heater, steam, and the like;
(ii) employing a portion of the captured-heat energy for generation of electrical power utilizing Organic Rankine Cycle (ORC) or other technologies such as Kalina cycle, sterling engine cycle, absorption, and the like;
(iii) transferring and converting the remaining captured-heat energy to the latent heat of a low-boiling point-liquid by vaporization into its vapor phase;
(iv) conveying over long distances, the captured-heat energy contained in the vapor of the low-boiling-point liquid as latent heat at ambient temperatures instead of as high-temperature sensible heat in hot liquids or as latent heat in high-boiling-point fluids; and
(v) converting the conveyed latent heat energy to sensible heat energy at a delivery site by condensing the vapor of the low-boiling-point liquid into its liquid phase.

According to one embodiment of the present disclosure, the long-distance conveyance of heat energy at ambient temperatures by the stand-alone systems, apparatus, and methods disclosed herein, is enabled through the deployment of two or more closed-loop circulation systems connected in series, wherein each of said closed-loops utilizes low-temperature vaporization-point fluids (i.e., low-boiling-point fluids) such as, for example, ethane, ammonia, commercial refrigerants, $CO_2$, volatile hydrocarbons, and the like. Aspects of the embodiments disclosed herein include power generation systems that incorporate lower heat-sink temperatures in the power generation cycle (i.e., loop), thereby opening up opportunities to generate more power from lower-temperature heat sources.

Another embodiment of the present disclosure relates to the bundling of long-distance flowlines along with power and communication cables via installing them by way of methods such as, but not limited to, bundling as "umbilical cords" within tubing or wraps, or by placement of the bundled flowlines and cables into one trench or alternatively, by placement of separated flowlines and cables into two or more closely spaced-together trenches, or by ploughing the bundled flowlines into one run or alternatively by ploughing separated flowlines and cables into two or more closely spaced-together runs, or by drawing the bundled flowlines through one bore or alternatively by drawing separated flowlines and cables through two or more closely spaced-together bores, or by placing the flowlines and cables near to each other on ground surfaces or on above-ground cable and pipe support racks.

Another embodiment of the present disclosure relates for equipment configurations into integrated heat energy capture, storage, distribution, and delivery systems wherein included are network sharing and controls systems. The integrated heat energy capture, storage, distribution, and delivery systems have the means and capacity to generate at least some or alternatively all, or alternatively, a surplus of power requisite for operation of the systems. Additionally, the present integrated heat energy capture, storage, distribution, and delivery systems enable installation and stand-alone operation of smart-energy distribution and sharing systems in isolated regions and also, within larger established energy infrastructure systems.

Another embodiment of the present disclosure relates to the incorporation of systems of meters and data collection systems for the recording and assembly of mass flows and energy flows that can be used to calculate heat-energy-transfer quantities for invoicing, payment, and other financial purposes.

Another embodiment of the present disclosure relates to a modular approach for configuring the equipment, apparatus, and systems disclosed herein, onto and into transportable skids or trailers, whereby the equipment, apparatus and systems may be manufactured and configured at selected industrial locations, and then transported to remote installation sites for rapid installation and commissioning of power generation and heating while minimizing on-site construction costs. Additionally, the transportable modularized equipment, apparatus, and systems are useful for rapid response and deployment on a temporary basis to locations that sustained loss of power and energy infrastructures as a consequence of severe weather events such as hurricanes, tornados, and the like.

Another embodiment of the present disclosure relates to configurations of the equipment, apparatus, and systems into manufactured self-contained modular units that can be fitted into confined residential spaces and/or confined commercial, wherein the configurations are provided with standardized couplers and receptacles designed for ease-of-connection. According to one aspect, the manufactured self-contained modular units are inter-connectable as multiple units at a location to facilitate scaling-up of heat-energy and power supply capacity.

DESCRIPTION OF THE DRAWINGS

These and other features of the disclosure will become more apparent in the following detailed description in which reference is made to the appended drawings, wherein:

FIG. 18 is a table summarizing the operating parameters used for the thermodynamic model outlined in Example 1;

FIGS. 22A and 22B are charts showing the enthalpy curves (FIG. 22A) and entropy curves (FIG. 22B) for the working fluid used in the heat energy capture and power generation loop for the thermodynamic model outlined in Example 1;

FIGS. 23A and 23B are charts showing the enthalpy curves (FIG. 23A) and entropy curves (FIG. 23B) for the working fluid used in the long-distance conveyance loop for the thermodynamic model outlined in Example 1;

FIGS. 24A and 24B are charts showing the enthalpy curves (FIG. 24A) and entropy curves (FIG. 24B) for the working fluid used in the delivery loop for the thermodynamic model outlined in Example 1;

FIG. 25 is a table summarizing the results of energy balance calculations generated by the thermodynamic model outlined in Example 1;

FIGS. 26A and 26B are charts showing the relationship between heat source temperature (FIG. 26A) and the fraction of heat energy that is available for power generation (FIG. 26B) in the calculations modelled by the thermodynamic model outlined in Example 1;

FIG. 27 is a table summarizing the results of modelling a long-distance three-loop closed-loop heat energy capture, storage, distribution, delivery, storage, and sharing system that delivers heat energy and power from one heat energy capture and power generation module to several users, as outlined in Example 2;

FIG. 28 is a table summarizing the operating parameters used for the thermodynamic model outlined in Example 3 that is a model of an example of a two-loop closed-loop system disclosed herein;

FIG. 29 is a table summarizing the results of energy balance calculations generated by the thermodynamic model outlined in Example 3;

FIGS. 30A and 30B are charts showing the relationship between heat source temperature (FIG. 30A) and the fraction of heat energy that is available for power generation (FIG. 30B) in the calculations modelled by the thermodynamic model outlined in Example 3; and FIG. 31 is a table summarizing the results of modelling a long-distance two-loop closed-loop heat energy capture, storage, distribution, delivery, storage, and sharing system that supplies heat energy and power from one heat energy capture and power generation module to several users as outlined in Example 4.

DETAILED DESCRIPTION

Figure 1:
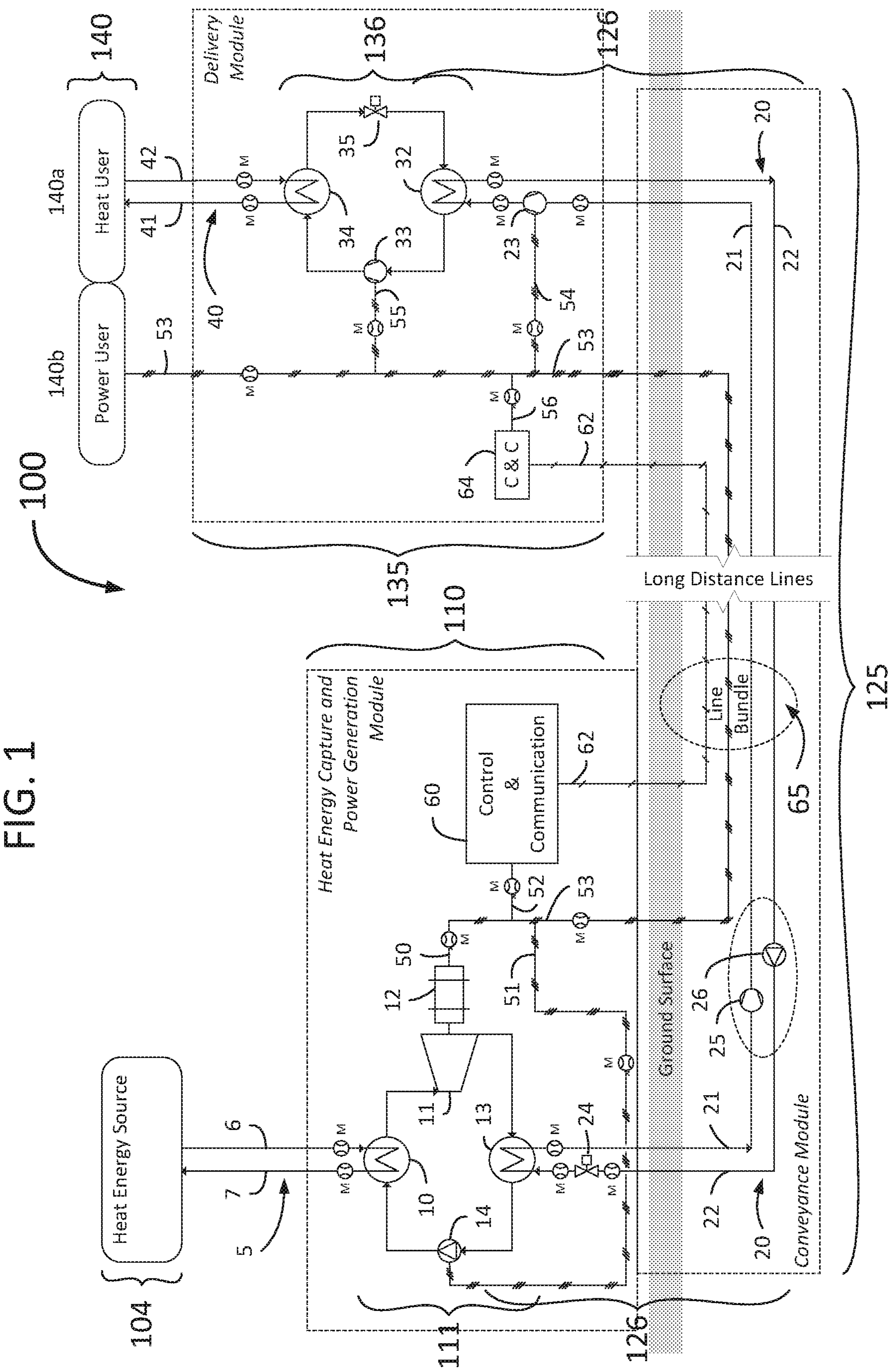
FIG. 1 is a schematic flowchart illustrating an embodiment disclosed herein of a stand-alone long-distance three-loop closed-loop heat energy capture, generation of power from a portion of the captured-heat energy, conveyance, and delivery system 100.

The embodiments of the present disclosure generally relate to integrated systems, apparatus, and methods for the capture of heat energy and for the long-distance conveyance, storage, and distribution of the captured-heat energy at ambient temperatures. The long-distance conveyance and distribution of the captured-heat energy is facilitated by utilizing the latent heat energy of low-boiling-point (LBP) fluids in closed-loop conveyance lines. Some embodiments relate to the utilization of some of the heat energy for the generation of power at or near heat capture locations.

One embodiment of the present disclosure relates to the long-distance conveyance (transportation) of heat energy at ambient temperatures as latent heat energy via a fluid in its vapor phase instead of as sensible heat.

Another embodiment of the present disclosure relates to the long-distance conveyance of latent heat energy, via a fluid in its vapor phase, from a source of heat energy to a heat energy delivery site using a two-loop closed-loop system, or alternatively a three-loop closed-loop system, in locations having ambient temperatures from a range of −40° C. to +50° C.

Another embodiment of the present disclosure relates to the ability to convey heat energy long distances at below-freezing temperatures (less than 0° C.) thereby enabling the conveyance of heat energy through subsurfaces in regions with permafrost without thawing the permafrost.

According to a first aspect, the two-loop closed-loop systems disclosed herein generally consist of two loops wherein the first loop comprises equipment and systems configured for capturing and transferring heat energy from a heat energy source as well as for generating power. The second loop comprises equipment, systems, and controls configured for receiving the captured-heat energy from the first loop, for conveying the captured-heat energy for long distances, and for delivering the captured-heat energy to consumers. In regard to the first aspect, the first loop is referred to herein as a "heat energy capture and power generation loop", and the second loop is referred to herein as a "long-distance captured-heat energy conveyance and delivery loop". According to a second aspect, the three-loop closed-loop systems disclosed herein generally consist of three loops wherein the first loop comprises equipment, systems, and controls configured for capturing and transferring heat energy from a heat energy source as well as for generating power. The second loop comprises equipment, systems, and controls configured for receiving the captured-heat energy from the first loop, for conveying the captured-heat energy for long distances and then transferring the captured-heat energy to a third loop which comprises equipment, systems, and controls configured delivering the captured-heat energy to consumers. In regard to the second aspect, the first loop is referred to herein as a "heat energy capture and power generation loop", the second loop is referred to herein as a “long-distance heat energy conveyance loop”, and the third module is referred to as a “heat energy delivery module”.

According to another aspect, the second loop may convey heat energy for long distances at below freezing temperatures (less than 0° C.) thereby enabling the conveyance of heat through the subsurface in regions with permafrost without thawing the permafrost. According to another aspect, the second loop may convey heat energy for long distances on permafrost surfaces without thawing the permafrost surfaces.

Another embodiment of the present disclosure relates to use of a portion of the captured-heat energy to generate electrical power for use to power equipment requisite for operation of the first module, wherein the first module is configured for capturing the heat energy and transferring the captured-heat energy and generated power to the second module, i.e., the long-distance conveyance module. According to one aspect, excess electrical power generated in the first module may be conveyed in the second module for delivery to power consumers, and optionally to provide electrical power for use to power equipment requisite for delivery of the captured-heat energy to a consumer. According to another aspect, supplemental power may be provided to the first module for powering equipment requisite for operation of the first module, and optionally, for long-distance conveyance and delivery to a power consumer. In regard to this embodiment, the first module may be referred to as a “heat energy capture and power generation module”, the second module may be referred to as a “long-distance captured-heat energy and power transmission module”, and the third module may be referred to as a “captured-heat energy and power delivery module”.

Another embodiment of the present disclosure relates to configuration of systems and related methods of operation into two-loop or three-loop closed-loop integrated heat energy capture, storage, distribution, delivery, storage, and sharing systems, which depending on the temperature of the captured heat energy, can generate some, all, or a surplus of its power requirements, enable the installation of self-sufficient smart energy distribution and sharing systems able to stand alone in situations where such systems are useful and/or additionally, in isolated locations.

Another embodiment of the present disclosure relates to a stand-alone and self-sufficient system comprising equipment and controls that are integrated into the two-loop closed-loop and three-loop closed-loop systems, apparatus, and methods for the capture of heat energy and for the long-distance conveyance, storage, and distribution of the captured-heat energy. According to one aspect, the stand-alone equipment and control system may be monitored and operated by on-site operators. According to another aspect, the stand-alone equipment and control system may be monitored and operated by remotely located operators and optionally, on a semi-attended basis. According to another aspect, the stand-alone equipment and control system may be monitored and controlled by on on-site operators and concurrently monitored by remotely located operators.

Another embodiment of the present disclose relates to providing a control and communication system interconnected with and in communication with an integrated system, apparatus, and related methods for the capture of heat energy and for the long-distance conveyance, storage, and distribution of the captured-heat energy configured as disclosed herein, wherein the control and communication system is programmable to monitor and record (i) selected parameters associated with the flows of the LBP working fluids within and throughout each of the closed-loop piping infrastructures, (ii) the operating performance of each apparatus in communication with each of the closed-loop piping infrastructure, and (iii) to control in accordance with predefined optimization parameters, one or more of the apparatus to optimize flows of the LBP working fluids within and throughout each of the closed-loop piping infrastructures, whereby the delivery of the captured heat energy is optimized. According to one aspect, the control and communication system may be configured for continuous on-site monitoring and control. According to another aspect, the control and communication system may be configured for continuous remote monitoring and control, According to another aspect, the control and communication system may be configured for integrated continuous remote monitoring and control and remote monitoring and control. According to another aspect, the control and communication system may be integrated with a “smart energy system” whereby process operations as well as the capture, long-distance conveyance, storage, and distribution of heat energy, power, and power generated therefrom, are automatically optimized.

Another embodiment of the present disclosure relates to a system of meters and meter-monitoring systems integrated into each of the modules disclosed herein, to monitor, quantify, and record the flows of captured-heat energy and power within and between each of the loops comprising the systems disclosed herein, whereby the capture and conveyance of heat energy and power generated therefrom and optionally provided thereto, can be monetized.

Another embodiment of the present disclosure relates to systems that comprise a long-distance captured-heat energy and power-transmission trunk conveyance module interconnected with (i) a plurality of heat energy capture modules and/or heat energy capture and power generation modules that transfer captured-heat energy and generated power to the long-distance captured-heat energy and power-transmission trunk conveyance module, and (ii) a plurality of captured-heat energy and power delivery modules wherein each of the captured-heat energy and power delivery modules receives a portion of the captured-heat energy and power conveyed along the long-distance captured-heat energy and power-transmission trunk conveyance module. According to one aspect, systems comprising a long-distance captured-heat energy and power-transmission trunk conveyance module, interconnected with (i) a plurality of heat energy capture modules and/or heat energy capture and power generation modules (i.e., first modules), and (ii) a plurality of captured-heat energy and power delivery modules (i.e., third modules), may additionally comprise one or more heat sinks interconnected thereto. Examples of suitable heat sinks include subterranean geological formations and subterranean water bodies. Each heat sink may be interconnected with the long-distance captured-heat energy and power-transmission trunk conveyance module by flowlines wherein is circulating a LBP working fluid.

Another embodiment of the present disclosure relates to equipment and component configurations for the first module (i.e., the heat energy capture and power generation module) and for the third module (i.e., the heat energy delivery module) into standardized manufactured self-contained modular units that may be fitted into confined residential spaces and/or confined commercial spaces, whereby depending on a particular application, the modular units may comprise height-width-depth sizes from the ranges of about 1 m to 4 m per side (for example, approximate sizes similar to one to four kitchen refrigerators or freezers According to an aspect the standardized manufactured self-contained modular units may be provided with standardized quick-release standardised couplers and receptacles designed to facilitate demountable engagement of the modular units with flowlines, and cables.

Another embodiment of the present disclosure relates to configuring and installing the equipment components for the first module (i.e., the heat energy capture and power generation module) and for the third module (i.e., the heat energy delivery module), onto transportable skids. The modular skids may be configured and fabricated at suitable manufacturing facilities and then transported to remote sites for installation, commissioning, and use. For example, the modular skids may be sized to fit onto the decks of flat-bed trailers for hauling and/or carriage by heavy-duty over-road truck tractors and/or by rail and/or by barges and/or by ships. Examples of suitable skid dimensions include: (i) North American specifications for flat-bed trailer decks having widths of 8.5' (2.6 m) and lengths ranging between 40' (12.2 m) and 63' (19.2 m), and (ii) European specifications for flat-bed decks having widths of 2.55 m (8.4') and lengths ranging between 12 m (39.4') and 18.5 m (60.7'). It is optional for the skid-mounted modules to be enclosed with sidewalls and roofs for protection from environmental conditions and to prevent vandalism. Particularly suitable are intermodal shipping containers that are designed and built for intermodal freight transport. Those skilled in this art will understand that intermodal containers are designed such that they can be used for shipping goods with multiple modes of transport options such as by ship, by rail, by truck, and by air. Intermodal container handling equipment is commonly available at cargo receiving and distribution facilities, for loading and unloading the same types of intermodal containers onto and from a ship, onto and from a rail car, onto and from a transport truck trailer, and onto and from a cargo airplane. Intermodal containers commonly have dimensions that are: (i) either twenty feet or forty feet (6.1 m or 12.2 m) long, (ii) eight and a half feet or nine and a half feet (2.6 m or 2.9 m) high, and (iii) six and a quarter feet of eight feet (1.9 m or 2.44 m) wide, and are configured to fit onto the decks of North American trailer decks and European trailer decks. Those skilled in this art will know that such intermodal containers have numerous common names including sea-cans, C-cans, Conex boxes, cargo containers, among others.

The skid-mounted modules disclosed herein may be configured for use in remote harsh environmental conditions (for example tundra permafrost, desert), or in isolated mining camps, or in refugee camps, or in remote military installations and staging areas. The skid-mounted modules disclosed herein may also be configured into/onto smaller skids/trailer units towable by 2-wheel-drive and/or 4-wheel-drive vehicles for rapid deployment and commissioning to provide emergency power and heating supplies to population areas wherein their power and energy infrastructures were catastrophically damaged by severe weather such as hurricanes, tornadoes, and the like.

According to some aspects, the integrated systems, apparatus, and methods disclosed herein pertain to the capture of heat energy from geothermal sources, from thermal solar sources, from waste heat emitted via exhaust gases from internal-combustion engines, flue gases from combustion processes, from fueled boiler-heater plants, from steam plants, from hot or warm waste streams from processing facilities, from cogeneration of heat and electricity, from combined heat and power (CHP) plants, and the like.

According to some aspects, heat energy captured by the integrated systems, apparatus, and methods disclosed herein, is used to convert LBP fluids circulating in closed-loop conveyance lines comprising the systems from their fluid phase into their vapor phase.

According to some aspects, the integrated systems, apparatus, and methods disclosed herein, may be configured to capture heat energy by circulating LBP working fluids as well as by fluids such as water, hot oil, glycol solution, gases, and the like, with or without causing a phase change.

According to some aspects, the integrated systems, apparatus, and methods disclosed herein, may be configured to deliver heat energy by circulating LBP working fluids as well fluids such as water, hot oil, glycol solution, gases including combustion gases, and the like, with or without phase change.

Unless otherwise defined, all technical and scientific terms used herein generally have the same meaning as commonly understood by one of ordinary skill in the art to which this disclosure pertains. Exemplary terms are defined below for ease in understanding the disclosure described herein.

The term “a” or “an” refers to one or more of that entity; for example, “a gene” refers to one or more genes or at least one gene. As such, the terms “a” (or “an”), “one or more” and “at least one” are used interchangeably herein. In addition, reference to an element or feature by the indefinite article “a” or “an” does not exclude the possibility that more than one of the elements or features are present, unless the context clearly requires that there is one and only one of the elements.

The term “about” as used herein is meant to encompass variations of ±20%, ±10%, ±5%, ±1%, ±0.5% or ±0.1% of the specified amount. When the value is a whole number, the term about is meant to encompass decimal values, as well the degree of variation just described.

The term “ambient temperature” as used herein means the temperature of the surrounding environment measured as atmospheric temperature. The surrounding environment may be above ground level wherein the ambient temperature will be the average temperature of the air in a band that extends to about 30 m above the ground surface, will vary with the latitude of a location or region and its annual seasonal cycle, and may be in the range of −50° C. to over 50° C. Alternatively, the surrounding environment may be below the ground surface level in which case, the ambient temperature will the temperature of the surrounding subsoil layers and may also be in the range of −40° C. to about 40° C.

The term “and/or” refers to and encompasses any and all possible combinations of one or more of the associated listed items (e.g. one or the other, or both), as well as the lack of combinations when interrupted in the alternative (or).

As used herein, the term “enthalpy” refers to a thermodynamic quantity equivalent to the total energy content of a substance, and is equal to the internal energy of the system plus the product of pressure and volume.

As used herein, the term “latent heat energy” refers to the heat energy released from or absorbed by condensing or vaporizing a fluid circulating within the closed-loop heat-energy conveyance systems disclosed herein.

As used herein, the term latent heat as used herein refers to the energy absorbed or released by a substance during a change in its physical state (i.e., phase) that occurs without changing its temperature. The latent heat associated with vaporizing a liquid or a solid or condensing a vapor is called the heat of vaporization. The latent heat is normally expressed as the amount of heat (in units of joules or calories) per mole or unit mass of the substance undergoing a change of state.

As used herein, the term "low-boiling-point fluid" (low-temperature vaporization-point fluid) refers to a fluid that boils (i.e., vaporizes) i.e., undergoes a phase change from liquid to vapor at a temperature of about −30° C. or less at 1 Bar (one atmosphere of pressure). Examples of low-boiling-point fluids suitable for use and conveyance in the closed-loop circulation systems disclosed herein, include but are not restricted to ammonia (BP about −36° C.), $CO_2$ (BP about −78° C.), ethane (BP about −88° C.), chlorodifluoromethane refrigerant R-22 (BP about −41° C.), dichlorodifluoromethane refrigerant R-12 (BP about −30° C.), difluoromethane R-32 (BP about −52° C.), other commercial refrigerants, propane (BP about −42° C.), propene (BP about −47° C.), propylene (BP about −47° C.), other volatile hydrocarbons, and the like. The term "low-boiling-point" may be represented herein by the acronym "LBP".

As used herein, the term "fluid" refers to a substance in the form of a liquid or a vapor or a gas that flows and conforms to the outline of its container, and includes LBP (low-boiling-point, low-vaporization-point) substances such as ethane, ammonia, commercial refrigerants, $CO_2$, volatile hydrocarbons as well substances such as water, hot oil, glycol solution, gases including combustion gases, flue gases, and the like, with or without phase change.

As used herein, the term "sensible heat" refers to the heat energy content of a circulating liquid without any phase changes, and is a function of changes in temperature of the fluid.

As used herein, the term "low-temperature waste heat" means low-enthalpy waste heat below 140° C. that may be captured from waste heat energy and energy in general from geothermal sources, from thermal solar sources, from hot or warm processing plant streams, combustion gases, from fueled boiler-heater plants, from steam plants, from cogeneration of heat and electricity, from combined heat and power (CHP) plants, and the like.

As used herein, the term "geothermal body" refers to: (i) geothermal energy contained within geothermal geological formations such as subterranean warm or subterranean hot, dry crystalline basement rock and to deep warm aquifers and deep hot aquifers contained in fractured crystalline basement rock (also referred to herein as a "geothermal geological formation"), (ii) near-surface subsoils and fresh water aquifers, and (iii) to bodies of water, that may or may not be heated by geothermal energy.

As used herein, the term "PV solar" refers to electricity provided from photovoltaic solar cells that convert light energy (i.e., photons) into voltage.

As used herein, the term "electrical grid" refers to refers to an interconnected network for delivering electricity from producers to consumers. Electrical grids comprise generating facilities that produce electrical power, transmission lines that carry electrical power from sources to distribution centres, and distribution lines that connect individual customers to distribution centres.

As used herein, the term "smart energy grid" refers to refers to an integrated network that controls in real time the generation, supply, distribution, use, and storage of electricity and heat energy within an interconnected system of devices, through the two-way control and distribution of electricity and heat energy. A smart energy grid comprises interactive controls, control systems, automated devices, and equipment.

As used herein, the term "local distributed electrical grid" refers to a "smart energy grid" that is local to an area or community, and not part of a widely distributed integrated electrical management network.

One embodiment of the present disclosure relates to a stand-alone system and related apparatus and equipment for capture of heat energy, and for the long-distance conveyance, storage, and distribution of the captured-heat energy to users. The captured-heat energy is captured, conveyed, and delivered by utilizing the latent heat energy of LBP fluids in closed-loop conveyance lines that are in communication with: (i) one or more sources of heat energy and (ii) one or more delivery sites whereto the captured-heat energy is transferred.

According to one aspect, one or more flowlines wherein is circulating a LBP fluid, with or without phase changes, may be employed for capturing heat energy from a geothermal source, or a thermal solar source, or from hot or warm processing plant streams, or from combustion gas waste heat, or from a combustion-fired heating plant, or from a cogeneration facility, or from a combined heat and power (CHP) facility, from a fueled boiler-heater facility, or other such sources. In particular, the embodiments disclosed herein are particularly useful for capturing low-temperate waste heat (i.e., having a temperature of less than 140° C.) from such sources.

According to another aspect, a portion of the waste heat energy captured by the systems, apparatus, and methods disclosed herein, may be used for generating electricity with one or more of technologies and equipment based on, for example, the Organic Rankine Cycle (ORC), the Kalina cycle, sterling engine cycle, or absorption. It is within the scope of this disclosure for such systems and apparatus to use the portion of the heat energy for generation of electricity nearby the source(s) from where the heat energy is captured. It is also within the scope of this disclosure for such systems and apparatus to use the portion of the captured-heat energy for generation of electricity nearby delivery sites and the users of the captured-heat energy.

According to another aspect, the remaining captured-heat energy not used for generation of electricity, may be transferred and converted into the latent heat of a fluid by vaporizing a LBP liquid into its vapor phase in a closed-loop piping infrastructure, conveying the captured-heat energy in the LBP liquid's vapor phase as latent heat in one or more closed-loop piping infrastructures at ambient temperatures over long distances at ambient external temperatures to delivery sites. The captured-heat energy is released from the LBP liquid by condensing the vapor phase into the liquid phase whereby that the conveyed latent heat energy is converted to sensible heat. The sensible heat is then distributed to heating apparatus such as radiant heaters, air-circulating heaters, and the like, or alternatively, via intermediate systems such as circulation of hot water.

Some embodiments of the present disclosure relate to bundling long-distance closed-loop flowlines together with electrical cables and communication cables by way of forming "umbilical cords" with tubing or wraps, or alternatively, placement of the flowlines and cables into one trench or into adjacent trenches, or alternatively, ploughing the flowlines and cables into on run or into adjacent runs, or alternatively, drawing the flowlines and cables through one bore or through adjacent bores, or by placing the flowlines and cables near to each other on the surface or on above ground electrical cable and pipe supports.

Some embodiments of the present disclosure relate to incorporation of a system of meters and a data monitoring and control system for recording mass flow data and energy flow data, and for the processing and assembly of the data for calculations of heat energy capture, transfer, and delivery amounts for use in monetization of the heat energy capture, the conveyance of the captured-heat energy, and the delivery of the captured-heat energy to consumers.

Some embodiments of the present disclosure relate to configuring the various apparatus and equipment requisite for the systems and methods disclosed herein, into modules that will fit onto transportable skids or into trailers, thereby enabling an economical manufacturing of components with minimal on-site work required for installation and commissioning. Such modular embodiments of the systems disclosed herein may be particularly useful in remote areas, or regions with poor infrastructure services, or where portability/transportability will facilitate rapid set-up of generation of electricity and heating capacity on an emergency or temporary basis.

Some embodiments of the present disclosure relate to configuring the equipment, apparatus, and systems disclosed herein into manufactured self-contained modular units that can be fitted into confined residential spaces and/or confined commercial spaces, wherein the modular units are provided with standardized quick-release couplers and receptacles for rapid demountable engagement with flowlines and cables.

Figure 2:
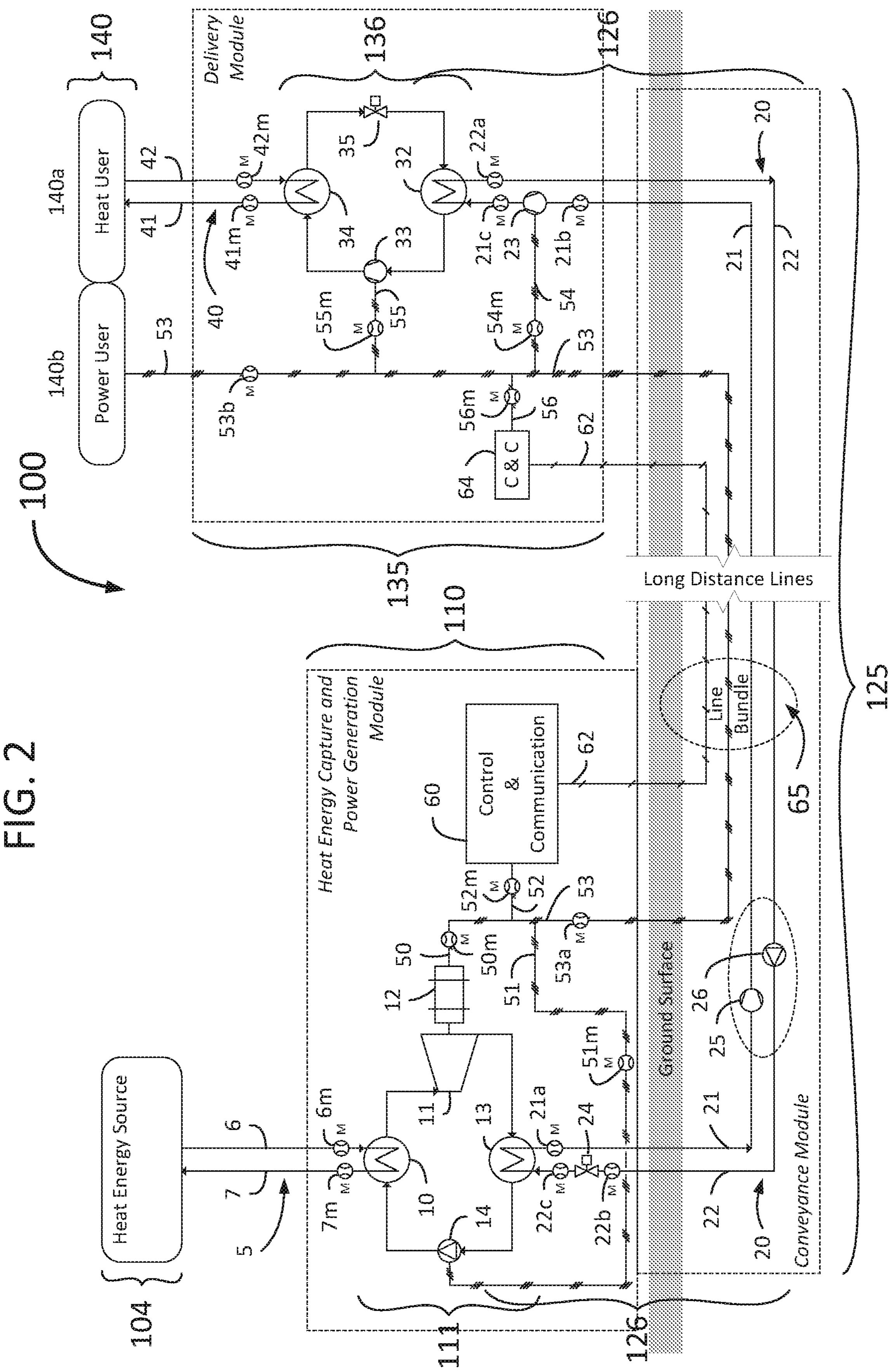
FIG. 2 is the schematic flowchart shown in FIG. 1 with additional references to certain components of the system.
Figure 3:
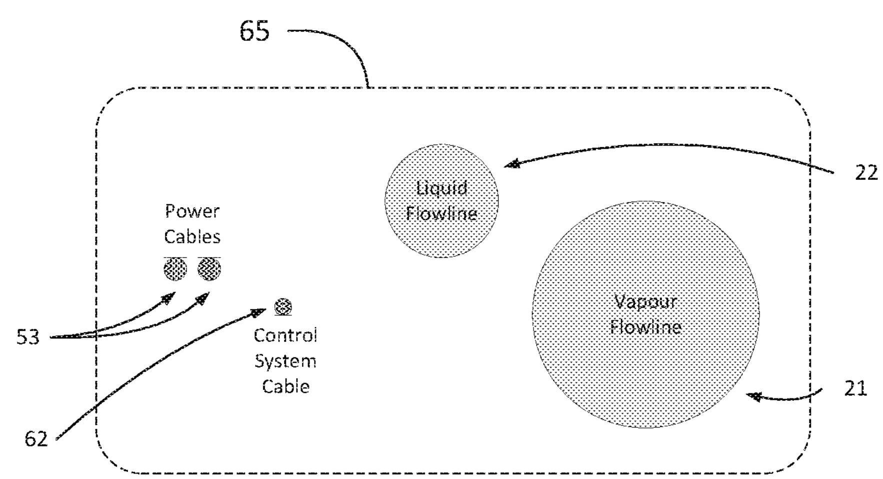
FIG. 3 is a cross-sectional view taken from FIG. 1, of the long-distance conveyance components of the system shown in FIGS. 1 and 2 wherein long-distance flowlines, power cables, and communications cables are bundled together into an "umbilical cord" configuration.

An embodiment of present disclosure pertaining to a stand-alone integrated system, apparatus, and methods for the capture of heat energy and for the long-distance conveyance, storage, and distribution of the captured-heat energy at ambient temperatures is illustrated in FIGS. 1 to 3. The illustrated stand-alone integrated system is a three-loop closed-loop system 100 comprising three modules 110, 125, 135 interconnected by three loops 111, 126, 136 wherein each loop 111, 126, 136 is circulating a LBP fluid. The first module 110 is a heat energy capture and power generation module. The second module 125 is a long-distance captured-heat energy conveyance module. The third module 135 is a captured-heat energy delivery module. As illustrated in FIG. 1, the elements of the heat energy capture and power generation loop 111 and the heat exchanger 13 (evaporator) of the conveyance loop are located in the heat energy capture and power generation module 110, the elements of the delivery loop 136 and the heat exchanger 32 (condenser), compressor 23, and expansion value 24 of the conveyance loop 126 are located in the captured-heat energy delivery module 135; and the long-distance captured-heat energy conveyance module 125 is comprised of the long distance conveyance flowlines 21 and 22, power and control cables 53 and 62, and booster compressors and pumps 25 and 26.

The heat energy capture and power generation loop 111 is connected to a heat energy source 104 by a piping infrastructure 5 comprising a pipe 6 in communication with the heat energy source 104 and a heat exchanger 10 within the heat energy capture and power generation loop 111, and a pipe 7 in communication with the heat exchanger 10 and the heat energy source 104. A working fluid circulates within the piping infrastructure 5 in pipes 6, 7.

The heat energy capture and power generation loop 111 in the heat energy capture and power generation module 110 comprises the heat exchanger 11 which is in communication with the heat energy source 104, a turbine 11, a second heat exchanger 13, and a pump 14. A portion of the heat energy captured from the heat energy source 104 and delivered to the heat exchanger 10 is utilized by the turbine 11 via organic Rankine cycle (ORC) technology to produce power with a generator 12 interconnected to the turbine 11. The remaining captured-heat energy flows to the second heat exchanger 13 wherein the heat energy is transferred to a pipe 21 of a second closed-loop piping infrastructure 20 comprising the second loop 126 which is referred to herein as the long-distance conveyance loop 126. A LBP fluid circulates within the second closed-loop piping infrastructure 20 and is converted into its vapor phase by the second heat exchanger 13.

The long-distance conveyance loop 126 comprises the second closed-loop piping infrastructure 20 having a pipe 21 in communication with the second heat exchanger 13 in module 110 and a third heat exchanger 32 within the third module 135, and a pipe 22 in communication with the third heat exchanger 32 and the second heat changer 13. A LBP fluid circulates within the second closed-loop piping infrastructure 20 in its vapor phase in pipe 21 and in its fluid phase in pipe 22. Long-distance conveyance of the captured-heat energy is enabled by converting heat energy transferred to the heat energy conveyance loop 126 to latent heat by vaporizing a LBP liquid into its vapor phase, and conveying heat energy as latent heat at ambient temperatures instead of high-temperature sensible heat contained in hot liquids or as latent heat in high-boiling-point vapors. It is suitable to provide, if necessary, one or more booster compressors 25 in communication with the vapor flowline 21 to maintain the vapor flow rate within a desired pressure range along the entire length of the long-distance conveyance module 125. It is also suitable to provide one or more booster pumps 26 in communication with the liquid flowline 22 to maintain the liquid flow rate within a desired range along the entire length of the long-distance conveyance module 125.

The heat energy delivery loop 136 comprises the third heat exchanger 32 interconnected with a compressor 33, the fourth heat exchanger 34, and an expansion valve 35, and a piping infrastructure 40 in communication with the fourth heat exchanger 34. The heat energy delivery loop 136 utilizes the captured-heat energy conveyed by the long-distance conveyance module 125 by condensing the vapor phase of the LBP liquid in line 21 to its liquid phase in the third heat exchanger 32 thereby releasing the latent heat and transferring it to pipe 41 of the piping infrastructure 40 via the fourth heat exchanger 34 whereby the captured-heat energy is delivered to the heat user 140*a*. The captured-heat energy may then be transferred to heating devices such as radiant heaters, aerial fan-driven heating coils or hot-water heaters or boilers heating circulating hot water or steam, and the like.

It is to be noted that the same LBP circulating fluid may be used in all three closed-loop piping infrastructures. Alternatively, a different LBP circulating fluid may be used in each of the three closed-loop piping infrastructures, and may be selected for optimal performance within the range of ambient conditions and operating conditions wherein each of the closed-loop piping infrastructure is deployed.

It is to be noted that the circulating working fluids in piping infrastructures 5 and 40 may be LBP fluids or alternatively, the working fluids may be water, hot oil, glycol solution, gases including combustion gases, and the like, and may or may not undergo phase changes while circulating throughout the piping infrastructures 5 and 40.

Those skilled in these arts will understand that use of LBP fluids enables the step-down of captured-heat energy temperatures in a range of 30° C. to 140° C. to temperatures in a range −10° C. to 50° C. for long-distance conveyance, and then stepped-up at one or more delivery sites to temperatures suitable for heating.

As illustrated in FIGS. 1 and 2, a portion of the heat energy captured from heat energy source 104, may be used for continuous generation of electrical power by the heat energy capture and power generation loop 111 via the first heat exchanger 10, the turbine 11, the generator 12, the second heat exchanger 13, and the pump 14. However, it is within the scope of the present invention to modify the heat energy capture and power generation loop 111 by substituting for the turbine 12, equipment such as a scroll or a screw or a rotary vane or other types of expanders known to those skilled in this art. It is also suitable, if so desired, to substitute for the ORC equipment, any one of Kalina cycle equipment, sterling engine cycle equipment, absorption power generation equipment, and the like. Those skilled in this art will understand that other configurations and equipment such as reheat cycles, regenerative cycles, combined reheat and regenerative cycles, and the like, may be selected to adapt and optimize the systems disclosed herein, for specific situations and/or operating conditions and/or optimization goals.

The electrical power generated by the generator 12 is transmitted by a power cable 50 from the heat energy capture and power generation module 110 via electrical power transmission trunk cable 53 in the long-distance conveyance module 125 to the heat energy delivery module 135, and then delivered to a power user **140*b*. A portion of electrical power may be transferred from power cable 50 to power cable 51 for powering the pump 14 in the first heat energy capture and power generation module 110. A portion of electrical power may be transferred from power cable 50 to power cable 52 for powering the control and communications equipment 60. A portion of the electrical power transmitted in trunk electrical power transmission trunk cable 53 may be used to power the booster compressor(s) 25 and booster pump(s) 26 in the long-distance conveyance module 125. Electrical power may be transmitted from electrical power transmission trunk cable 53 via power transmission cable 54 to power compressor 23 in the long-distance conveyance loop 126. Electrical power may be transmitted from trunk electrical power transmission trunk cable 53 via power transmission cable 55 to power compressor 33 in the heat energy delivery loop 136. A portion of electrical power may be transferred from power transmission trunk cable 53 to power cable 56 for powering the control and communications equipment 64. Electrical power may be transmitted from trunk electrical power transmission trunk cable 53 to a power user 140*b***.

One or more control systems cable(s) 62 interconnect the control and communications equipment 60 in the heat energy capture and power generation module 110, with the control and communications equipment 64 in the heat energy delivery module 135.

In regard to the long-distance conveyance module 125, it is suitable to bundle together the second closed-loop piping infrastructure 50 pipes 21, 22 with the power transmission trunk cable 53 and the control systems cables 62 into a single line bundle 65 (FIG. 3). The line bundle 65 may be formed into an "umbilical cord" by wrapping the pipes 21, 22, power transmission trunk cable 53, and control systems cables 62 with suitable materials. Suitable wrapping materials include insulating fabrics and aluminized fabrics. Examples of such wrapping materials include, but are not limited to, ZETEX® and ZETEXPLUS® fiberglass tapes and tubings, and Z-FLEX® aluminized fabric tapes (ZETEX, ZTEXPLUS, and Z-FLEX are registered trademarks of Newtex Industries Inc., Victor, N.Y., USA). Alternatively, the second closed-loop piping infrastructure 20 pipes 21, 22, the power transmission trunk cable 53, and the control systems cables 62 may be placed into close, but separated proximity, in a single trench provided therefor. Alternatively, the pipes 21, 22, the power transmission trunk cable 53, and the control systems cables 62 may be placed into separate but adjacent trenches provided therefor. Alternatively, the second closed-loop piping infrastructure 20 pipes 21, 22, the power transmission trunk cable 53, and the control systems cables 62 may be placed into a single ploughed run. Alternatively, the pipes 21, 22, the power transmission trunk cable 53, and the control systems cables 62 may be placed into separate but adjacent ploughed runs provided therefor. Alternately the pipes 21, 22, the power transmission trunk cable 53, and the control systems cables 62 may be placed near to each other on the surface or on surface-cable and flowline supports. A line bundle, according to the present disclosure, may extend for long distances between the heat energy capture and power generation module 110 and the heat energy delivery module 135. For example, the long distance may be 100 m, or 500 m, or 1 km, or 5 km, or 10 km, or 15 km, or 20 km, or 25 km, or 30 km, or 35 km, or 40 km, or 45 km, or 50 km, or 55 km, or 60 km, or 65 km, or 70 km, or 75 km, or 80 km, or 85 km, or 90 km, or 95 km, or 100 km, or longer.

Those skilled in this art will recognize that the long-distance conveyance loop 126 will have engineering thermodynamic characteristics that are similar to those of a simplified heat pump cycle. It is within the scope of the present disclosure, if so desired, to configure into the long-distance conveyance module 125 and the long-distance conveyance loop 126, equipment configured for incorporation of cascade systems, multistage compression systems, absorption technologies, and the like.

Another embodiment relates to the use of LBP fluids for circulation within the two-loop or three-loop capture, conveyance, and delivery systems disclosed herein.

Another embodiment relates to the use of LBP fluids or alternatively, fluids such as water, hot oil, glycol solution, gases including combustion gases, exhaust gases, and the like, with or without phase changes, for transferring heat energy into and out of the two-loop or three-loop capture, conveyance, and delivery systems disclosed herein.

Another embodiment of the present disclosure relates to a system of meters that measure and record data relating to the capture, transmission, and delivery of heat energy, mass flow rates, low-boiling-point fluid conditions within the fluid flowlines, and electrical power generated, transmitted and delivered. The scope of the present disclosure include a data collection and management system that enables recording and assembly of fluid mass and energy flow data for calculating heat energy and power transfer amounts for monetization purposes.

As illustrated in FIG. 2, the heat energy capture and power generation module 110 includes meter **6*m* that measures the heat energy flowing in line 6 of the piping infrastructure 5 from the heat energy source 104 to the first heat exchanger 10 of the heat energy capture and power generation loop 111. Meter 7*m* measures the heat energy flowing in the fluid in line 7 from the first heat exchanger 10 to the heat energy source 104, thereby enabling quantification of the amount of heat energy captured by the heat energy capture and power generation loop 111 from the heat energy source 104. If appropriate, the operator of the three-loop closed-loop system 100 may make payments to the owner of the heat energy source 104 for the quantities of heat energy captured from the heat energy source 104. The heat energy capture and power generation module 110 also includes meter 21*a* for measuring the heat energy in the vapor flowing out of the second heat exchanger 13 wherein the LBP working fluid flowing in line 21 has been converted into its vapor phase, and also includes meter 22***c* for measuring the heat energy of the LBP liquid phase flowing in line 22 into the second heat exchanger 13. The difference in the measurements between meters 21*a* and 6*m* enables quantification of the portion of the captured-heat energy used for electrical power generation by the turbine 11 and generator 12. The difference in measurements between meters 21*a*, 22*c* enables quantification of the amounts of capture heat energy transferred from the heat energy capture and power generation loop 111 of the first module 110 to the long-distance conveyance loop 126 of the second module 125. Meter 50*m* measures the electrical power generated and output by the turbine 11 and generator 12 into the trunk power transmission line 50. Meter 51*m* measures the power diverted from the trunk power transmission line 50 via electrical line 51 to power the pump 14 in the heat energy capture and power generation loop 111, while meter 53*a* measures the electrical power conveyed by the power transmission trunk cable 53 into the long-distance conveyance loop 126 of the second module 125.

As illustrated in FIG. 2, the heat energy delivery module 135 includes meter 21*b* that measures the heat energy flowing in the vapor phase of the LBP fluid in line 21 of the second closed-loop piping infrastructure 20, and may provide information that the control systems 60, 64 may be used to regulate the operation of compressor 23 to increase or decrease the flow rate of the working fluid in line 21 to the third heat exchanger 32 of the heat energy delivery loop 136 in the third module 135. Meter 21*c* measures the heat energy flowing in the LBP fluid in line 21 of the second closed-loop piping infrastructure 20 after compression by compressor 23 and into third heat exchanger 32. Meters 22*a*, 22*b* measure the heat energy flowing in the LBP fluid line 22 of the second closed-loop piping infrastructure 20 before and after expansion valve 24, and may provide information that the control systems 60, 64 may use to modulate the operation of expansion valve 24 to increase or decrease the flow rate of the LBP liquid phase in line 22 back to the second heat exchanger 13 in the heat energy capture and power generation loop 111 of the first module 110. The difference in measurements between meters 21*c*, 22*a* enables quantification of the amounts of capture heat energy transferred from the long-distance conveyance loop 126 of the second module 125 to the heat energy delivery loop 136 in the third module 135.

As illustrated in FIG. 2, the heat energy delivery module 135 includes meter 41*m* that measures the heat energy flowing in the working fluid in line 41 of the piping infrastructure 40, from the fourth heat exchanger 34 to the heat user 140*a*. Meter 42*m* measures the heat energy flowing in the working fluid in line 42 from the heat user 140*a* to the fourth heat exchanger 34 of the heat energy delivery loop 136. The differences in data recorded by meters 41*m*, 42*m* enable precise quantification of the amounts of heat energy transferred from the heat energy delivery loop 136 to the heat user 140*a*, thereby enabling the operator of the three-loop closed-loop system 100 to invoice the heat user 140*a* for the amounts of captured-heat energy supplied to the heat user 140*a*.

Electrical power may be diverted from the power transmission trunk cable 53 via electrical line 54 to power the compressor 23 as necessary to modulate the flow of captured-heat energy in the LBP working fluid line 21 to the third compressor 23. Electrical power may be diverted from the power transmission trunk cable 53 via electrical line 55 to power compressor 33 as necessary to regulate the flow of fluid in the heat energy delivery loop 136. The amounts of electrical power diverted to power compressor pump 23 is monitored and recorded by meter 54*m*, while meter 55*m* monitors and records the amounts of power diverted from the power transmission trunk cable 53 to compressor pump 33. Meter 53*b* continuously monitors and records the amounts of electrical power delivered from the heat energy delivery loop 136 to a power user 140*b* via power transmission trunk cable 53.

Another embodiment of the present disclosure relates to the utilization of an automated control and communication system 60, 64 interconnected by control systems cables 62 for monitoring, modulating, and optimizing the flows of heat energy and electrical power in the heat energy capture and power generation loop 111, the heat-energy conveyance loop 126, and the heat energy delivery loop 136. The automated control and communication system 60, 64 may be configured to enable remote and off-site communication, monitoring, control to enable semi-attended operations rather than continuous on-site operator attendance. If so desired, a "smart energy system" may be incorporated to optimize process operations as well as the capture, long-distance conveyance, storage, and distribution of heat energy, power, and power generated therefrom.

According to one aspect of the present disclosure, the heat energy source 104 may comprise heat energy captured from a geothermal body or formation 104*a* (FIG. 4) wherein the piping infrastructure 5 is interconnected with the geothermal body 104*a* via flowlines 70, 71. Meters 70*m*, 71*m* record the differences between captured-heat energy flowing out of the geothermal body 104*a* in flowline 70 and the heat energy of the working fluid in flowline 71 returning to the geothermal body 104*a*.

According to another aspect of the present disclosure, the heat energy source 104 may comprise heat energy captured from a thermal solar source 104*b* (FIG. 4) wherein the piping infrastructure 5 is interconnected with the thermal solar source 104*a* via flowlines 72, 73. Meters 72*m*, 73*m* record the differences between captured-heat energy flowing out of the thermal solar source 104*b* in flowline 72 and the heat energy in the flowline 73 returning to the thermal solar source 104*b*.

According to another aspect of the present disclosure, the heat energy source 104 may comprise heat energy captured from a waste heat source 104*c* (FIG. 4) wherein the piping infrastructure 5 is interconnected with the waste heat source 104*c* via flowlines 74, 75. Meters 74*m*, 75*m* record the differences between captured-heat energy flowing out of the waste heat source in flowline 74 and the heat energy in the flowline 75 returning to the waste heat source 104*c*. Some examples of suitable sources of waste heat include low-temperature heat energy that may be captured from waste heat emitted via exhaust gases from internal-combustion engines, flue gases from combustion processes, hot-waste streams and/or warm-waste streams from processing facilities, cogeneration equipment, combined heat and power (CHP) equipment, and the like.

Figure 4:
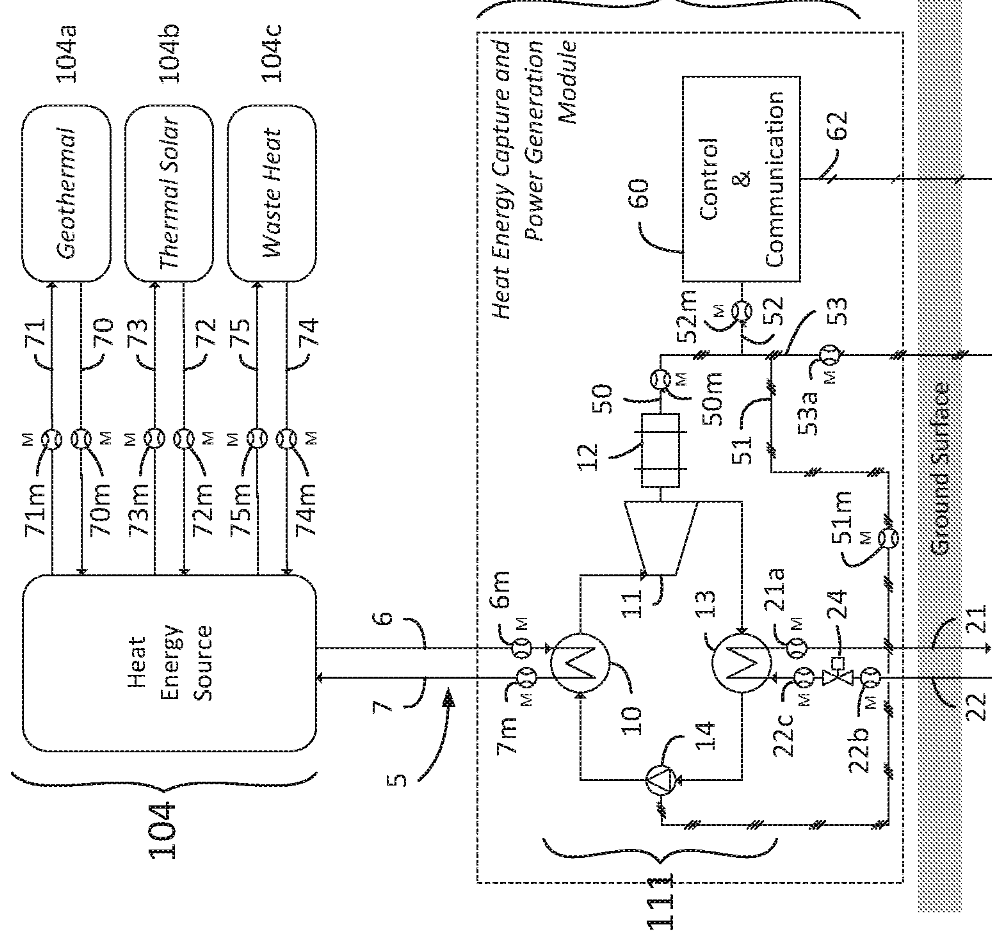
FIG. 4 is a schematic flowchart showing a view of the heat energy capture and power generation loop 111 of the system 100 shown in FIGS. 1 and 2, wherein the heat energy source 104 comprises heat energy captured from one or more of geothermal, thermal solar, and waste heat sources, wherein a portion of the captured-heat energy is used to produce power, and wherein the heat energy capture and power generation module 110 receives an external supply of power 106.

It is within the scope of the present disclosure for a stand-alone integrated system, apparatus, and methods for the capture of heat energy and for the long-distance conveyance, storage, and distribution of the captured-heat energy at ambient temperatures as illustrated and described in reference to FIGS. 1, 2, and 4 for the piping infrastructure 5 to communicate with two or more sources of heat energy, for example two or more of a geothermal body 140*a*, a thermal solar source 104*b*, a source of waste heat 104*c*, and the like.

In some installations, the heat energy captured from such heat energy sources may be insufficient to supply the demand from users for delivery of captured-heat energy, and additionally, provide sufficient heat energy to generate electrical power. Accordingly, another embodiment of the present disclosure relates to apparatus, equipment, and methods for providing a supplement heat energy supply from a fueled boiler-heater 108 (FIG. 5) whereby a working fluid in flowline 6 of first piping infrastructure 5 flows via flowline 76 into the fueled boiler-heater 108 wherein additional heat energy is transferred to the working fluid flowing out of the fueled boiler-heater 108 via flowline 77 and into the first heat exchanger 10. The control & communication systems 60 continuously monitor the data recorded by meter 76*m* on the working fluid flowline 76 and meter 77*m* on the working fluid flowline 77, and therewith modulate the inflow and outflow of the working fluid circulating in the piping infrastructure 5 into and out of the fueled boiler-heater 108 to provide a minimum desired threshold level of captured-heat energy into the heat energy capture and power generation loop 111.

Figure 6:
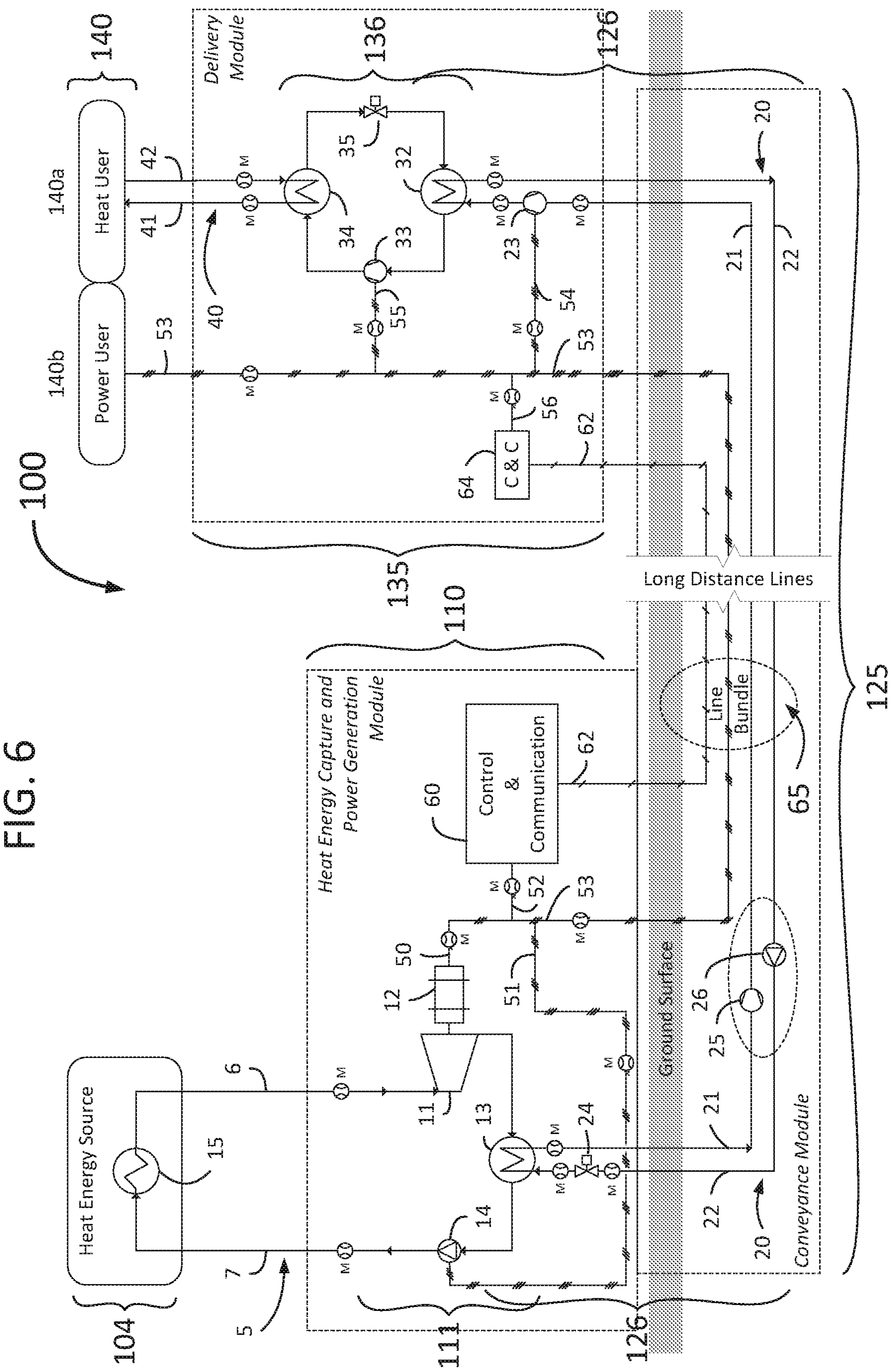
FIG. 6 is a schematic flowchart showing a view of another embodiment of a system 100 wherein the heat energy capture and power generation loop 111 captures heat energy directly from a heat energy source 104 and a portion of the captured heat energy is used for power generation, according to another embodiment of the present disclosure.
Figure 7:
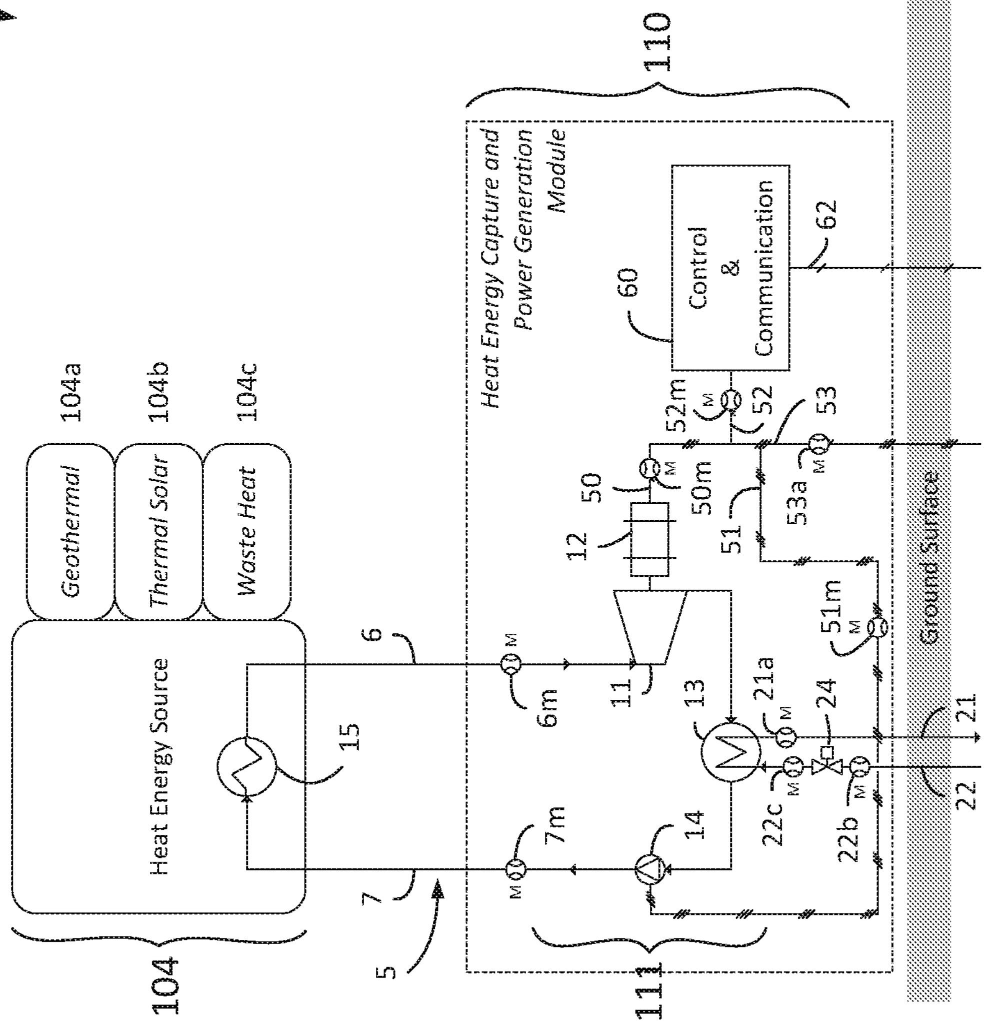
FIG. 7 is schematic flowchart showing another view of the heat energy capture and power generation loop 111 of the system 100 shown in FIG. 6, wherein the heat energy source 104 comprises heat energy captured from one or more of geothermal 104*a*, thermal solar 104*b*, and waste heat 104*c* sources, wherein a portion of the captured-heat energy is used to produce power.

According to another embodiment of the present disclosure, the first heat energy capture and power generation loop 111 of the three-loop closed-loop system 100 may be modified as illustrated in FIGS. 6 and 7, by removal of the first heat exchanger 10 from the first heat energy capture and power generation module 100, and by placing a substitute heat exchanger 15 directly within, or alternatively, adjacent to the heat energy source 104. The flowline 6 of piping infrastructure 5 interconnects the substitute heat exchanger 15 with turbine 11 of the first heat energy capture and power generation loop 111, and flowline 7 of piping infrastructure 5 interconnects the substitute heat exchanger 15 with the pump 14. According to this embodiment, it is suitable to use a LBP working fluid for circulation within the piping infrastructure 5 wherein the LBP working fluid is in its liquid phase in flowline 7 and is transformed into its vapor phase by the heat energy captured from heat source 104 by substitute heat exchanger 15. The captured heat energy is conveyed in the vapor phase of the LBP working fluid by flowline 6, to the turbine 11. In this embodiment, meter 7*m* measures the heat energy flowing in flowline 7 into the heat energy source 104 and the substitute heat exchanger 15 while meter 6*m* measures the heat energy flowing in the flowline 6 from the substitute heat exchanger 15 and the heat energy source 104, thereby enabling quantification of the amount of heat energy captured by the heat energy capture and power generation loop 111 from the heat energy source 104 (FIG. 6).

It is optional, if so desired in accordance with the embodiment illustrated in FIGS. 6, 7, to additionally capture heat energy from a geothermal body or formation 104*a* (FIG. 6) and/or to additionally capture heat energy from a thermal solar source 104*b* (FIG. 6) and/or to additionally capture heat energy from a waste heat source 104*c* (FIG. 6) for conveyance in flowline 6 of the first heat energy capture and power generation loop 111. Some examples of suitable geothermal bodies include warm and hot sedimentary and fractured basement rock aquifers as well near surface subsoils and fresh water aquifers. Some examples of suitable sources of waste heat include low-temperature heat energy that may be captured from cogeneration equipment, combined heat and power (CHP) equipment, physical plant processing systems, and the like.

It is also optional, if so desired in accordance with the embodiment illustrated in FIGS. 6, 7, to replace the substitute heat exchanger 15 with a piping infrastructure that may comprise a loop (not shown) ingressing into and egressing from a geothermal geological formation, or a wellbore, wherein a first ingressing portion of the loop is interconnected with flowline 7 of piping infrastructure 5 and a second egressing portion of the loop is interconnected with flowline 6 of piping infrastructure 5 of the heat energy capture and power generation loop 111. Alternatively, the substitute heat exchanger 15 shown in FIGS. 6, 7, may be substituted for with a flowline, a pipe, a tubing, a coiled-tubing loop, and the like (not shown) that is located within a suitable heat energy source, for example a surface water body, a subterranean water body, a deep geological aquifer, a shallow fresh-water aquifer, a process holding pond, a tank containing process fluids, and the like. A first ingressing end of the coiled-tubing loop is interconnected with flowline 7 of piping infrastructure 5 and a second egressing portion of the coiled-tubing loop is interconnected with flowline 6 of piping infrastructure 5 of the heat energy capture and power generation loop 111. LBP fluids are suitable working fluids for circulation within the heat energy capture and power generation loop 111 wherein the substitute heat exchanger 15 has been replaced with a flowline or a pipe or a tubing or a coiled-tubing loop, and the like.

Figure 8:
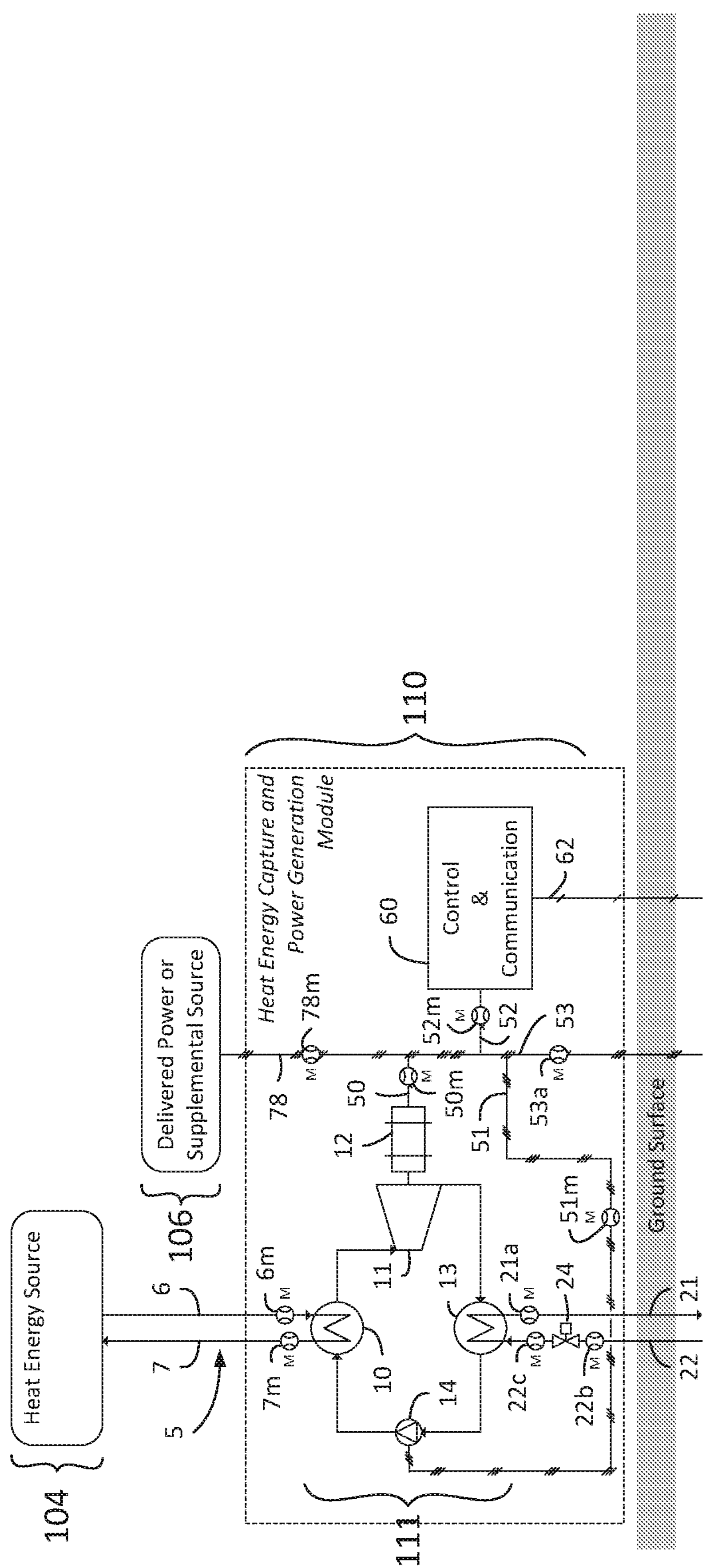
FIG. 8 is a schematic flowchart showing a view of the heat energy capture and power generation module 110 of the system 100 shown in FIGS. 1 and 2, wherein an external supply of power 106 is provided.

Some installations of the stand-alone integrated system, apparatus, and methods for the capture of heat energy and for the long-distance conveyance, storage, and distribution of the captured-heat energy at ambient temperatures as illustrated and described in reference to FIGS. 1 and 2, may be within proximity of an electrical grid infrastructure wherein power generated elsewhere, is transmitted. Accordingly, another embodiment of the present disclosure relates to supplementing the electrical power generated within the heat energy capture and power generation loop 111 from captured-heat energy, with a supply of electrical power 106 from an electrical grid infrastructure via power transmission line 78 (FIG. 8). The amounts of supplemental electrical power 106 received from an electrical grid infrastructure is monitored by a meter 78*m* in communication with the control & communication systems 62 (FIG. 8).

Figure 9:
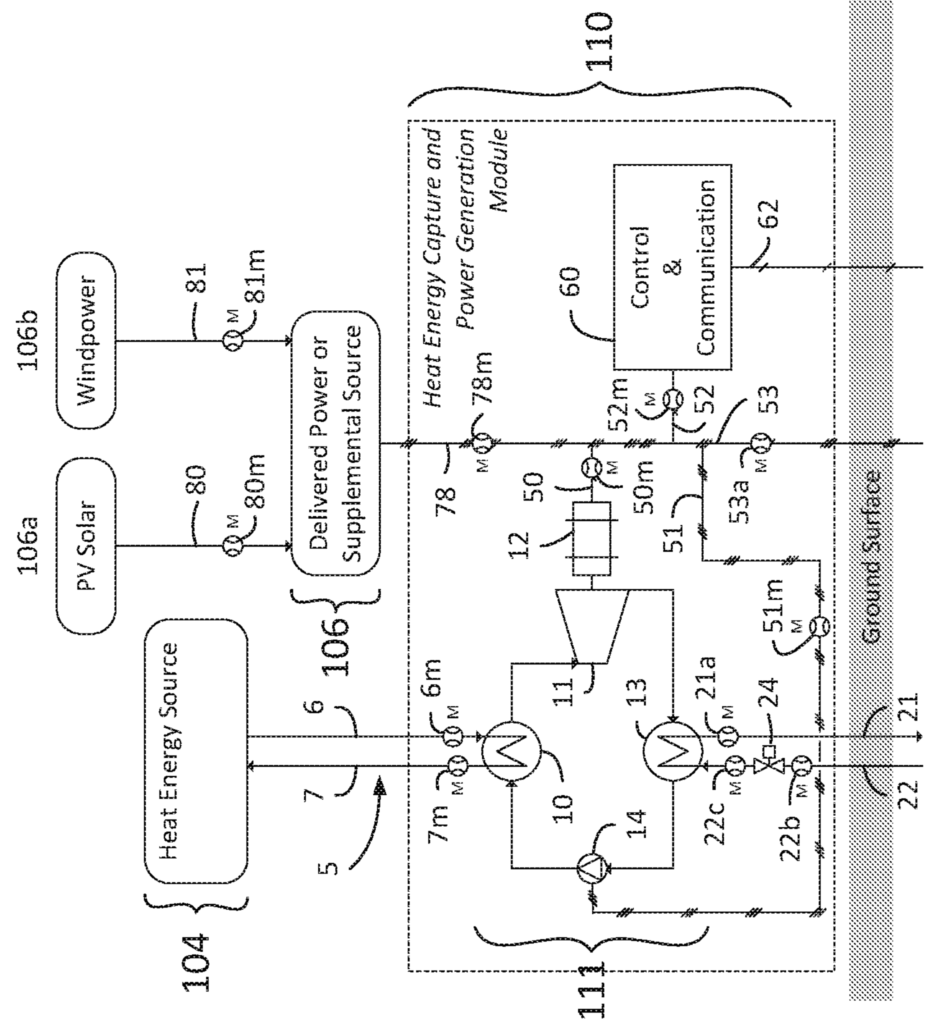
FIG. 9 is a schematic flowchart showing a view of the heat energy capture and power generation module 110 of the system 100 shown in FIGS. 1 and 2, illustrating an additional input of power captured by PV solar cells 106*a* and/or by wind turbines 106*b* into the external supply of power 106.

According to an aspect of this embodiment, the supplemental supply of electrical power 106 from an electrical grid infrastructure may be further supplemented or alternatively, substituted for by electrical power captured by PV solar cells 106*a* and delivered to the first module 110 via power transmission line 80 (FIG. 9). The amounts of electrical power transmitted from the PV solar cells 106*a* is continuously recorded by meter 80*m* in constant communication with the control & communication systems 60. Additionally or alternatively, electrical power generated by one or more wind turbines 106*b* may be delivered by power transmission line 81 (FIG. 9). The amounts of electrical power transmitted from the one or more wind turbines 106*b* is continuously recorded by meter 81*m* in constant communication with the control & communication systems 60.

Figure 10:
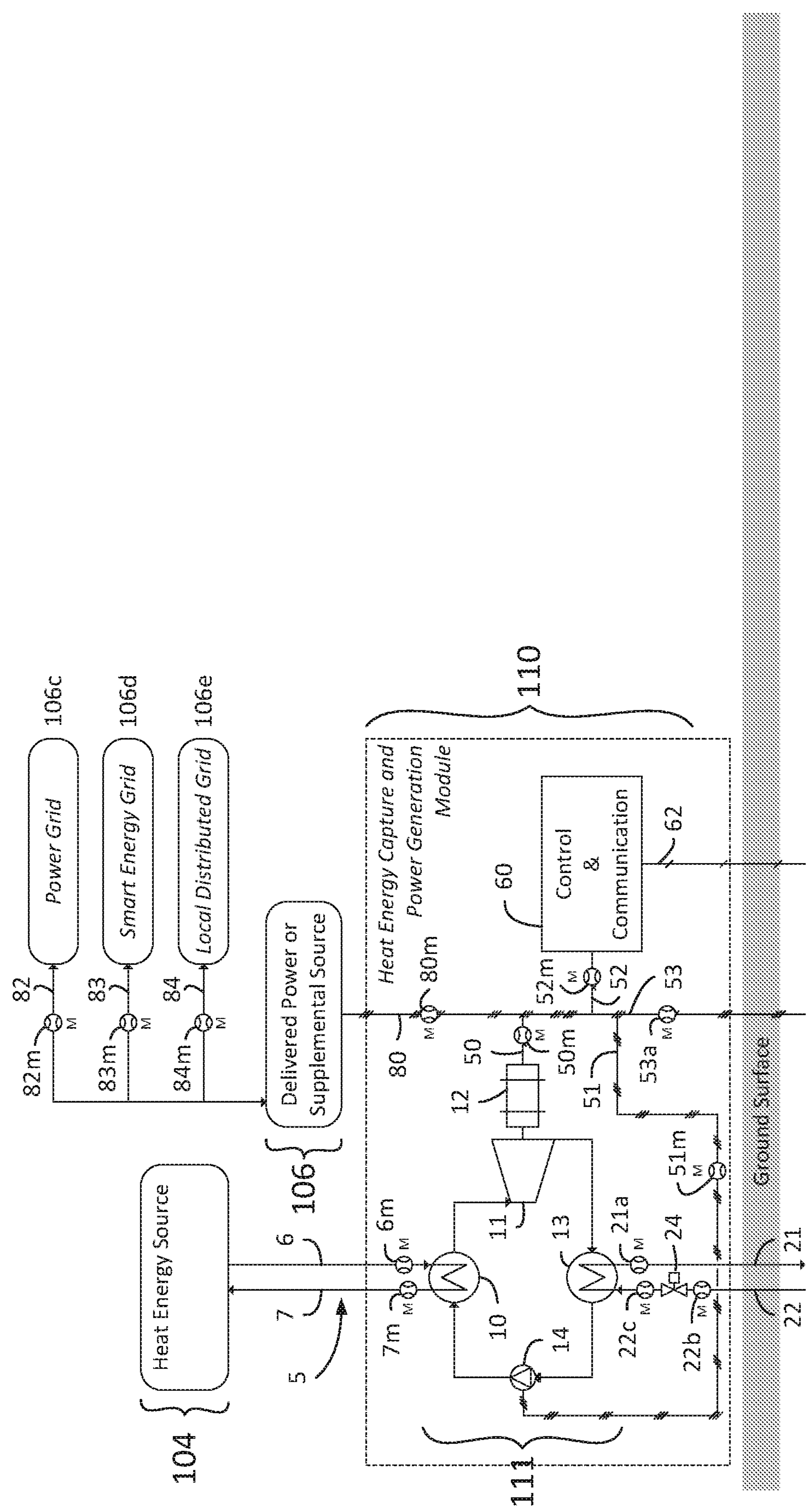
FIG. 10 is a schematic flowchart showing a view of the heat energy capture and power generation module 110 of the system 100 shown in FIGS. 1 and 2, illustrating additional power inputs from one or more of an electrical grid, a smart energy grid, and a local distributed electrical grid into the external supply of power 106.

According to another aspect of this embodiment, the supplemental supply of electrical power 106 from an electrical grid infrastructure may be further supplemented or alternatively, substituted for by electrical power delivered from a power grid 106*c* and delivered to the first module 110 via power transmission line 82 (FIG. 10). The amounts of electrical power transmitted from the power grid 106*c* is continuously recorded by meter 82*m* in constant communication with the control & communication systems 26.

According to another aspect of this embodiment, the supplemental supply of electrical power 106 from an electrical grid infrastructure may be further supplemented or alternatively, substituted for by electrical power delivered from a smart energy grid 106*d* and delivered to the first module 110 via power transmission line 83 (FIG. 10). The amounts of electrical power transmitted from the smart energy grid 106*d* is continuously recorded by meter 83*m* in constant communication with the control & communication systems 60.

According to another aspect of this embodiment, the supplemental supply of electrical power 106 from an electrical grid infrastructure may be further supplemented or alternatively, substituted for by electrical power delivered from a local distributed grid 106*e* and delivered to the first module 110 via power transmission line 84 (FIG. 10). The amounts of electrical power transmitted from the local distributed grid 106*e* is continuously recorded by meter 84*m* in constant communication with the control & communication systems 60.

Figure 11:
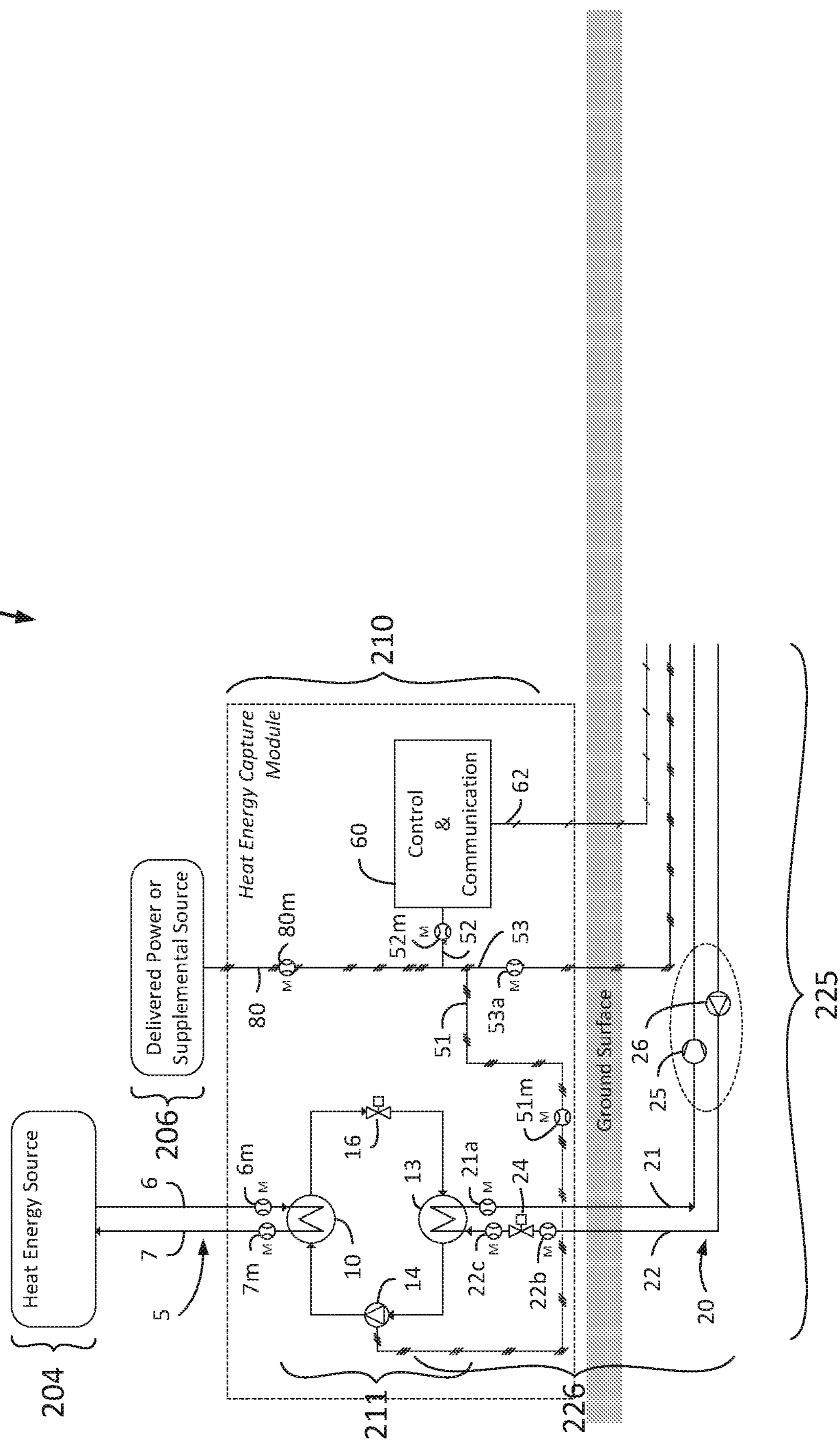
FIG. 11 is a schematic flowchart showing a view of a heat energy capture and power generation module 210 of another embodiment of a stand-alone long-distance three-loop closed-loop heat energy capture, conveyance, and delivery system 200, wherein none of the heat energy captured from one or more heat energy sources 204 is used for power production in the heat energy capture module 210, and an external supply of power 206 is provided.

Another embodiment of the present disclosure relates to a stand-alone integrated system, apparatus, and methods for the capture of heat energy and for the long-distance conveyance, storage, and distribution of the captured-heat energy at ambient temperatures illustrated in FIG. 11, wherein none of the captured-heat energy is used for generation of electrical power. An illustration of this version of a stand-alone integrated system comprises a three-loop closed-loop system 200 comprising a first closed-loop 211, with the second long-distance conveyance closed-loop 226 and the third captured-heat delivery module (not shown in FIG. 11) configured similarly to closed-loop 126, 136 illustrated in FIGS. 1 and 2. The first module 210 of the three-loop closed-loop system 200 comprises a heat energy capture loop 211 as well as a heat exchanger (condenser) 13 of the second long-distance conveyance loop 226 as well as heat exchanger (condenser) 13 of the second long-distance conveyance loop wherein are circulated LBP working fluids.

The heat energy capture closed-loop 211 (FIG. 11) is interconnected to a heat energy source 204 by a piping infrastructure 5 comprising a pipe 6 in communication with the heat energy source 204 and a heat exchanger 10 within the heat energy capture closed-loop 211, and a pipe 7 in communication with the heat exchanger 10 and the heat energy source 204. A working fluid circulates within the piping infrastructure 5 in pipes 6, 7.

Electrical power 206 is supplied to the heat energy capture module 210 of the three-loop closed-loop system 200 (FIG. 11) from one or more of a power grid or a smart energy grid or a local distributed grid via trunk power transmission cable 80. A portion of the electrical power is transmitted via power cable 51 to the pump 14, and via power cable 52 to the control and communication system 60. The amounts of electrical power 206 delivered to the three-loop closed-loop system 200 are monitored and recorded by meter 80*m*, while the amounts of electrical power used for powering the pump 14 and the control and communication system 60 are monitored and recorded by meters 51*m* and 52*m*, respectively. The amount of electrical power delivered to the long-distance conveyance module 225 via closed loop 226 is continuously monitored and recorded by meter 53*m*. The supplier of the electrical power 206 may bill the operator of the three-loop closed-loop system 200 for the amounts of power delivered, while the operator may use the data recorded by meters 80*m* and 53*m* to monitor and control the operating efficiency of the heat energy capture loop 211, and to monitor the transmission of electrical power into the long-distance conveyance module 225 for metered delivery to downstream power users.

Figure 12:
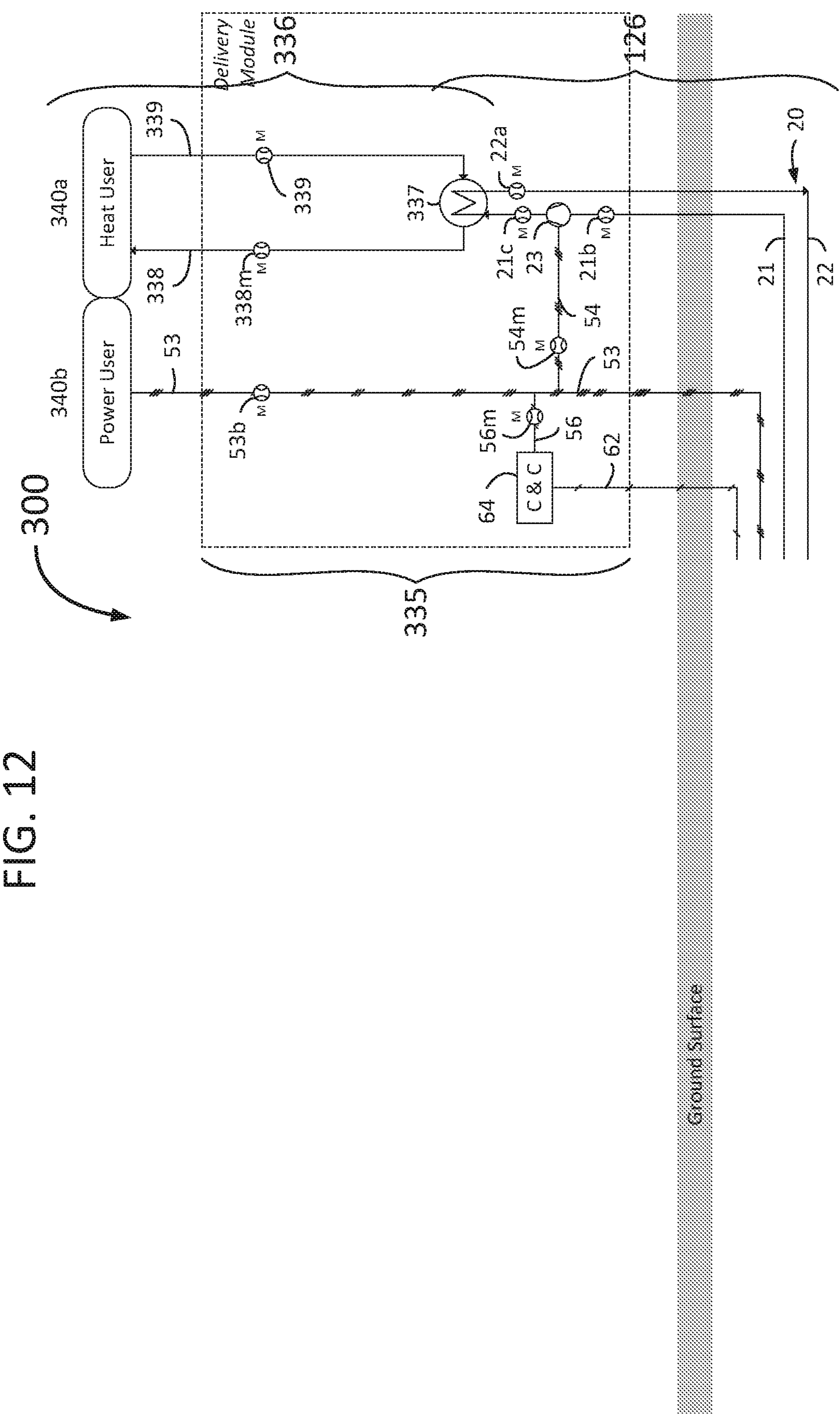
FIG. 12 is a schematic flowchart showing a view of an optional modification 300 to the heat energy capture, conveyance, and delivery system 100 illustrated in FIGS. 1 and 2, wherein the long-distance conveyance loop 326 of the long-distance conveyance module is also the heat energy delivery loop 336.

Another embodiment of the present disclosure illustrated in FIG. 12 relates to a stand-alone integrated system, apparatus, and methods wherein a two closed-loop system 300 is used for the capture of heat energy and for the long-distance conveyance, storage, and distribution of the captured-heat energy at ambient temperatures.

The two-loop closed-loop system 300 (FIG. 12) comprises a heat energy capture and power generation loop (not shown) configured similarly to the heat energy capture and power production loop 111 illustrated in FIGS. 1, and 2. The heat energy captured and electrical power generated therefrom in the first heat energy capture and power generation loop (not shown) is conveyed along the second long-distance conveyance loop 125 in vapor flowline 21 and power transmission cable 53 to a heat energy and power delivery module 335. In this two-loop closed-loop system 300, the captured-heat energy in a LBP fluid circulating in the closed-loop piping infrastructure 336 is transferred by heat exchanger 337 from the line 21 to a working fluid circulating in heat energy delivery flowline 338 to a heat energy user 340*a* for return to the heat exchanger 337 via flowline 339. Meters 338*m*, 339*m* in communication with flowlines 338, 339, constantly monitor and record the amounts of captured-heat energy delivered to the heat energy user 340*b* from the two closed-loop system 300.

Electrical power generated in the first heat energy capture and power generation loop is conveyed along the long-distance conveyance module 125 to the heat energy and power delivery module 335 in power transmission cable 53. Meters 21*b*, 21*c* monitor the flow rate of the captured-heat energy in flowline 21, and if necessary, the control and communication system 64 draws power from the power transmission cable 53 for transmission via power cable 54 to compressor 23 to control the flowrate of the captured-heat energy in flowline 21. Expansion valve 24 is provided to control the flow of the LBP working fluid in flowline 22 back to the first heat energy capture and power generation loop. Electrical power is delivered to a power user 340*b* via power transmission trunk cable 53, and the quantities of electrical power delivered are constantly monitored and recorded by meter 53*b* (FIG. 12).

Figure 13:
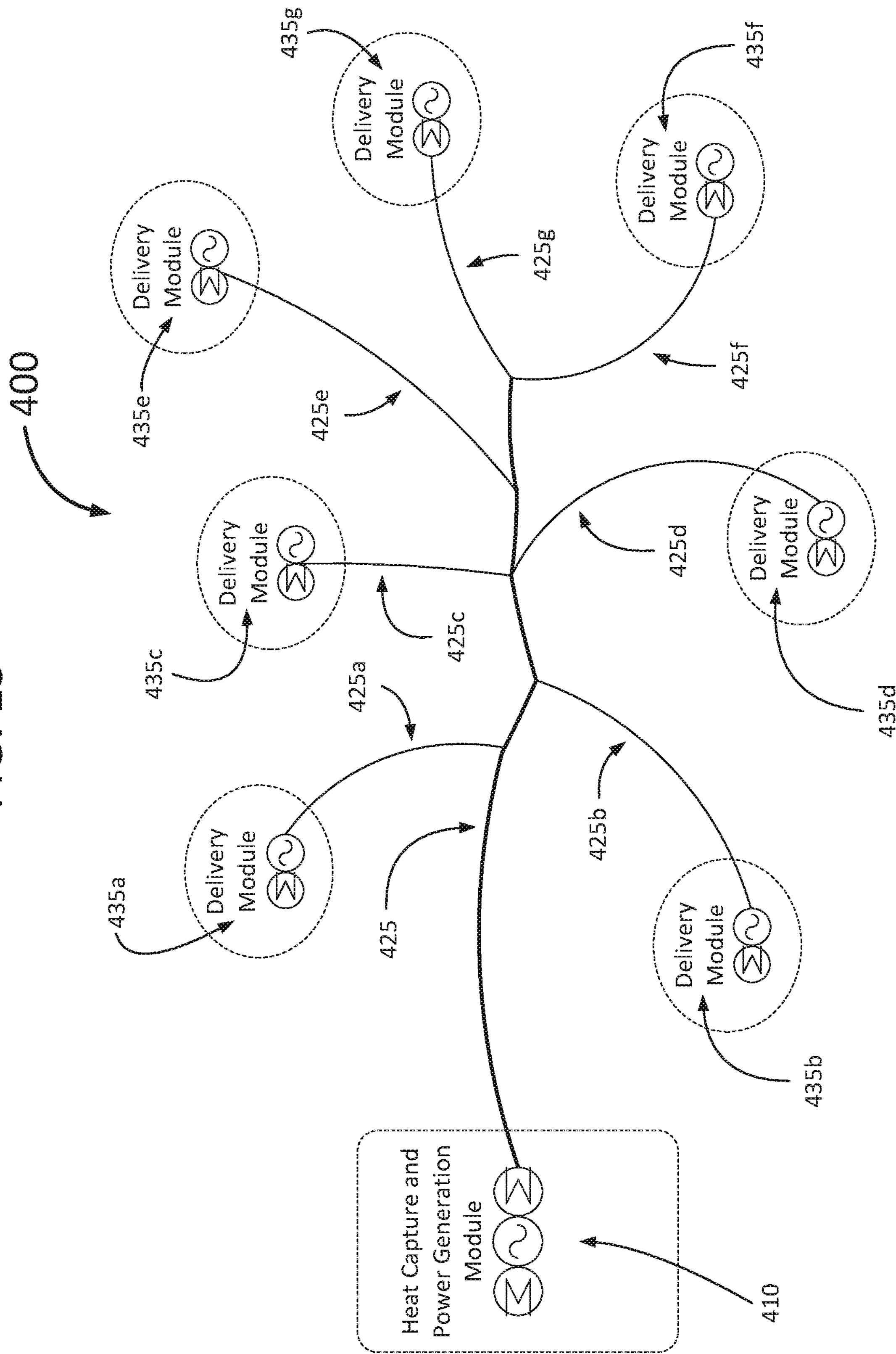
FIG. 13 is a schematic flowchart illustrating an embodiment of the present disclosure of the self-sufficient stand-alone long-distance three-loop closed-loop heat energy capture, storage, distribution, delivery, storage, and sharing system 400, for capturing heat energy from a single heat energy source, generating power from a portion of the captured-heat energy, then conveying and delivering the captured-heat energy and power therefrom along a conveyance infrastructure to multiple delivery modules.

An example of another embodiment of the present disclosure is illustrated in FIG. 11 and relates to a three closed-loop system 400 with heat energy capture and power generation utilizing captured-heat energy from a single site, long-distance conveyance along a trunk line, and delivery to multiple heat energy and power users via multiple branch heat-energy-delivery conveyance lines. The three closed-loop system 400 comprises a first module 410 that is a heat energy capture and power generation module that may be configured capture heat energy from a selected heat energy source with a first closed-loop piping infrastructure in which is circulating a LBP working fluid, similarly to the heat energy capture and power generation module 110 illustrated in FIGS. 1, and 2. The captured-heat energy is transferred from the first module 410 to a second module 425 which is a long-distance captured-heat energy and power-transmission trunk conveyance module comprising a second closed-loop piping infrastructure wherein is circulating a LBP working fluid. The captured-heat energy is conveyed along the long-distance captured-heat energy and power-transmission trunk conveyance module 425 in the vapor phase of the LBP working fluid, and is delivered to eight users "a", "b", "c", "d", "e", "f", and "g" by branch heat-energy-delivery conveyance modules 425*a*, 425*b*, 425*c*, 425*d*, 425*e*, 425*f*, and 425*g*, respectively (FIG. 13). A third closed-loop piping infrastructure wherein is circulating a LBP working fluid, interconnects each branch heat-energy-delivery conveyance module 425*a*, 425*b*, 425*c*, 425*d*, 425*e*, 425*f*, and 425*g* with a heat energy and power delivery module 435*a*, 435*b*, 435*c*, 435*d*, 435*e*, 435*f*, and 435*g*, respectively. Each of the heat energy and power delivery modules 435*a*-435*g* may be configured similarly to the heat energy capture and power generation module 110 illustrated in FIGS. 1, and 2. An integrated system and network of meters may be provided to monitor and record: (i) the amounts of heat energy captured by the first module 410 from the selected heat energy source, (ii) how much of the captured-heat energy is used for power generation by the first module 410, (iii) how much captured-heat energy and power are transferred from the first module 410 to the long-distance captured-heat energy and power-transmission trunk conveyance module 425, (iv) how much captured-heat energy and power are transferred from the long-distance captured-heat energy and power-transmission trunk conveyance module 425 to each of the branch heat-energy-delivery conveyance modules 425*a*-425*g*, and (v) how much captured-heat energy and power are transferred from each of the branch heat-energy-delivery conveyance modules 425*a*-425*g* to users "a"-"g" via heat energy and power delivery modules 435*a*-435*g*.

Figure 14:
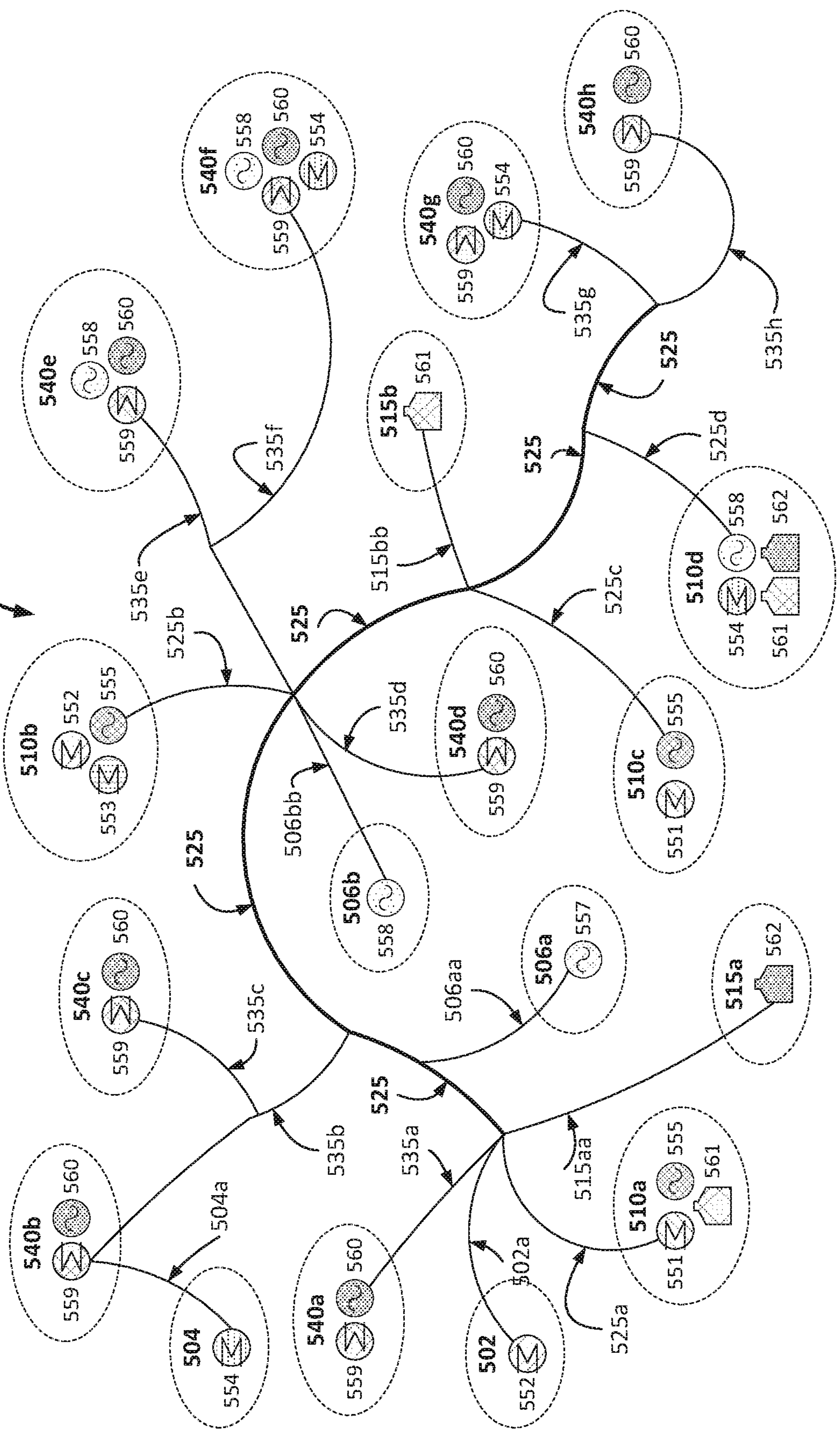
FIG. 14 is a schematic flowchart illustrating another embodiment of the present disclosure of a self-sufficient stand-alone long-distance three-loop closed-loop heat energy capture, storage, distribution, delivery, storage, and sharing system 500, wherein heat energy is captured from a plurality of heat energy sources and conveyed along a main trunk line, generating power from portions of the captured-heat energy, and delivering the captured-heat energy and power from the main trunk line to multiple delivery modules.
Figure 15:
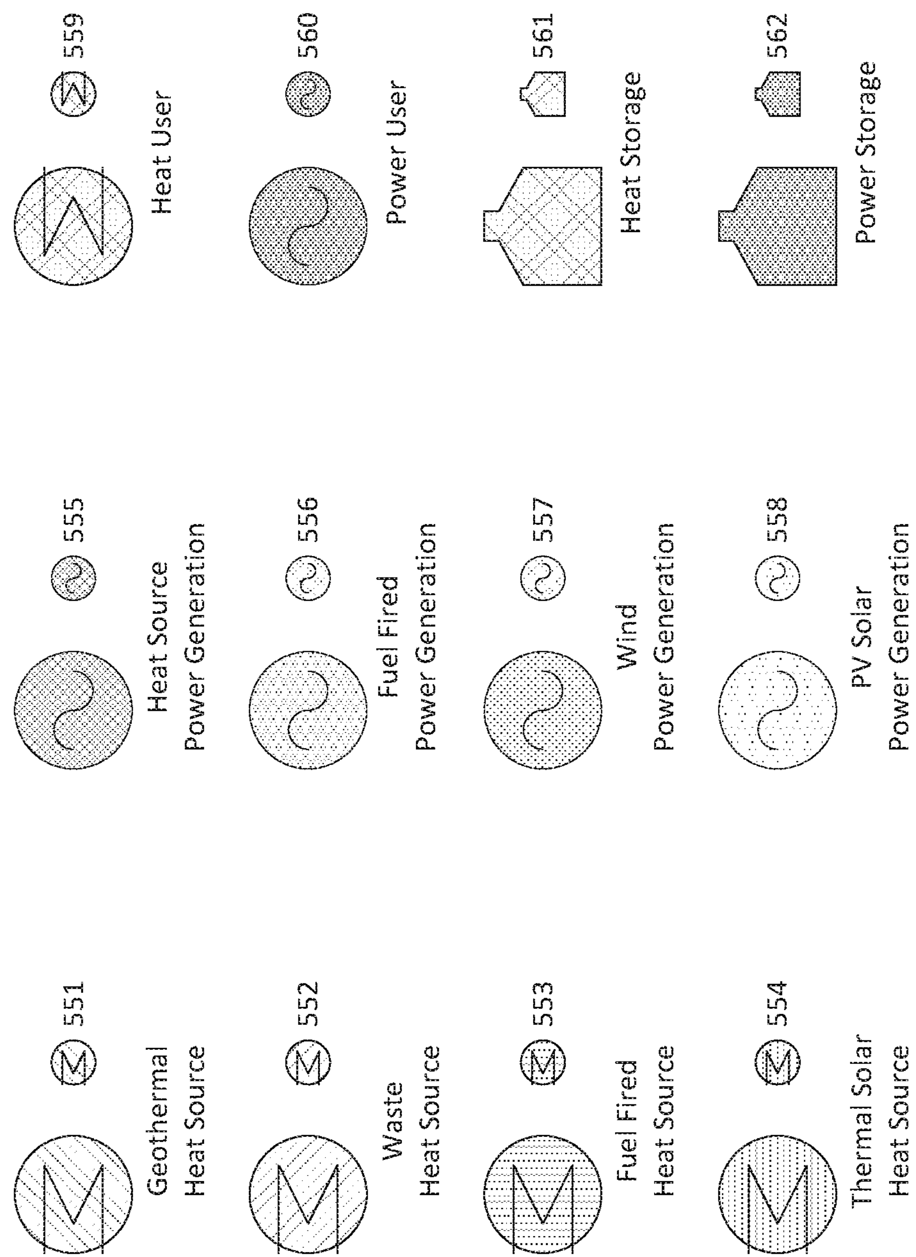
FIG. 15 is a key for the symbols used in FIGS. 11 and 12.

Another example of an embodiment of the present disclosure is illustrated in FIGS. 14 and 15, and relates to a system 500 with: (i) heat energy capture and power generation utilizing captured-heat energy from multiple heat energy source sites, (ii) transfer of the captured-heat energy from each of the multiple heat energy source sites to a long-distance trunk line for long-distance conveyance of the captured-heat energy and power therealong, (iii) and delivery of the captured-heat energy and power to multiple heat energy and power users via multiple branch heat-energy-delivery conveyance lines. A key for the symbols used in FIG. 14 is provided in FIG. 15.

The system 500 illustrated in FIG. 14 comprises four geographically separated heat energy capture and power generation modules 510*a*, 510*b*, 510*c*, and 510*d* interconnected with the main long-distance captured-heat energy and power-transmission trunk conveyance module 525 by branch captured-heat energy and power conveyance lines 525*a*, 525*b*, 525*c*, and 525*d* respectively. The system 500 also comprises an input of captured-heat energy 504 from a thermal solar heat source 554 conveyed to heat delivery site 540*b* by a conveyance line 504*a*.

The first heat energy capture and power generation module 510*a* (FIG. 14) comprises a heat energy capture and power generation loop configured similarly to loop 111 illustrated in FIGS. 1 and 2, in communication with a geothermal heat source 551 to capture waste heat therefrom and to generate power 555 with a portion of the captured waste heat energy. The first heat energy capture and power generation module 510*a* additionally comprises a geothermal heat storage 561 (described in more detail later). The remaining captured-heat energy and power generated therefrom, is transferred to the main long-distance captured-heat energy and power-transmission trunk conveyance module 525 by a branch captured-heat energy conveyance line 525*a*. Conversely, supplemental power may be supplied to module 510*a* via conveyance line 515*a*.

Heat energy captured from the waste heat source 502 (FIG. 14) is conveyed to the main long-distance captured-heat energy and power-transmission trunk conveyance module 525 by a branch captured-heat energy conveyance line 502*a* configured similarly to loop 111 illustrated in FIGS. 1 and 2.

The second heat energy capture and power generation module 510*b* (FIG. 14) comprises a heat energy capture and power generation loop configured similarly to loop 111 illustrated in FIGS. 1 and 2, but in communication with a waste heat energy source 552 to capture waste heat therefrom and to generate power 555 with a portion of the captured waste heat energy. The remaining captured-heat energy and power generated therefrom, is transferred to the main long-distance captured-heat energy and power-transmission trunk conveyance module 525 by the branch captured-heat energy conveyance line 525*b*. The second heat energy capture and power generation module 510*b* additionally comprises a fuel-fired boiler 553 from which waste heat energy is also captured and transferred to the long-distance captured-heat energy and power-transmission trunk conveyance module 525 by the branch captured-heat energy conveyance line 525*b*.

The third heat energy capture and power generation module 510*c* (FIG. 14) comprises a heat energy capture and power generation loop configured similarly to loop 111 illustrated in FIGS. 1 and 2, in communication with a geothermal heat source 551 to capture waste heat therefrom and to generate power 555 with a portion of the captured waste heat energy. The remaining captured-heat energy and power generated therefrom, is transferred to the main long-distance captured-heat energy and power-transmission trunk conveyance module 525 by the branch captured-heat energy conveyance line 525*c*. Conversely, supplemental power may be supplied to module 510*c* via conveyance line 525*a*.

The fourth heat energy capture and power generation module 510*d* (FIG. 14) comprises a heat energy capture and power generation loop configured similarly to loop 111 illustrated in FIGS. 1 and 2, in communication with (i) a thermal solar heat source 554 to capture waste heat therefrom, and (ii) a PV solar power generating apparatus 558. The captured-heat energy from the thermal solar heat source 554 and power generated from the a PV solar power generating apparatus 558, is transferred to the main long-distance captured-heat energy and power-transmission trunk conveyance module 525 by the branch captured-heat energy conveyance line 525*d*. The fourth heat energy capture and power generation module 510*d* additionally comprises a geothermal heat storage 561 (described in more detail later) and a power storage module 562.

The system 500 illustrated in FIG. 14 may additionally comprise one or more wind turbines 506*a* for generating electrical power which is transferred by a power transmission cable 506*aa* to the main long-distance captured-heat energy and power-transmission trunk conveyance module 525. The system 500 may also comprise a PV solar power generation installation 506*b* that converts sunlight into electricity, which transferred by a power transmission cable 506*bb* to the main long-distance captured-heat energy and power-transmission trunk conveyance module 525.

The system 500 illustrated in FIG. 14 has eight heat energy and power delivery locations 540*a*, 540*b*, 540*c*, 540*d*, 540*e*, 540*f*, 540*g*, and 540*h*. Each of the heat energy and power delivery locations 540*a*, 540*b*, 540*c*, 540*d*, 540*e*, 540*f*, 540*g*, 540*h*, is interconnected with the main long-distance captured-heat energy and power-transmission trunk conveyance module 525 by branch heat energy and power delivery modules 535*a*, 535*b*, 535*c*, 535*d*, 535*e*, 535*f*, 535*g*, 535*h*, respectively. Each of the branch heat energy and power delivery modules 535*a*, 535*b*, 535*c*, 535*d*, 535*e*, 535*f*, 535*g*, 535*h*, comprises a closed-loop piping infrastructure wherein is circulating a LBP working fluid configured similarly to the third closed-loop 136 illustrated in FIGS. 1 and 2, that interconnects the main long-distance captured-heat energy and power-transmission trunk conveyance module 525 with the heat energy and power delivery locations 540*a*, 540*b*, 540*c*, 540*d*, 540*e*, 540*f*, 540*g*, and 540*h*.

Heat energy delivery location 540*b* (FIG. 14) additionally receives heat energy and solar energy captured by a solar thermal power installation 504 having a solar collector system to heat an energy storage system during daylight hours and then uses the heat from the storage system to produce electrical power. The heat energy delivery location 540*b* is interconnected to the solar thermal power installation 504 by conveyance line 504*a*.

The system 500 (FIG. 14) may also be provided with and interconnected with a stand-alone power storage module 515*a* wherein excess power generated in other modules, for example in modules 510*a*, 510*b*, 510*c*, 510*d*, 506*a*, can be stored and drawn from during periods of time when demands for power from one one of or all of power users 540*a*-540*h* increase significantly. Suitable examples of stand-alone power storage facilities include containerized sodium sulphur (NaS) battery units available from NGK Insulators Ltd (Aichi Prefecture, Japan), modular systems consisting of multiple 10-cell modules of rechargeable zinc-air-cell batteries available from NantEnergy Inc. (Scottsdale, Ariz., USA), lithium-based Powerpack systems available from Tesla Inc. (Palo Alto, Calif., USA), and the like.

The system 500 (FIG. 14) may also be interconnected with a heat storage module 515*b* by a closed-loop piping infrastructure 515*bb* wherein is circulating a LBP working fluid or a substance such as water, hot oil, glycol solution, gases, and the like, with or without phase change, for delivery and storage of excess captured-heat energy that may be circulating in the main long-distance captured-heat energy and power-transmission trunk conveyance module 525, and then transferring the stored captured-heat energy back to the main long-distance captured-heat energy and power-transmission trunk conveyance module 525 on an as-needed basis. Examples of a suitable heat storage module 515*b* may be a shallow geological formation of crystalline rocks (e.g., granite), near surface subsoil, freshwater aquifer, body of water, storage tank, and the like. For subsurface storage, multiple closely spaced holes may be bored to depths ranging from 2 m to 20 m or more into which are inserted one of tubing wherein is flowing a working fluid, or alternatively, heat-conductive metal rods. Excess captured heat energy may be recovered when a heat energy demand is placed on the system 500 by one or more heat energy users 540*a*-540*h*. Another example of a suitable subterranean geothermal heat-sink storage module 561 includes a closed-loop piping infrastructure in communication with, for example, the long-distance captured-heat energy and power-transmission trunk conveyance module and a subterranean water body or alternatively, an aquifer. A working fluid circulating within the piping infrastructure may transfer excess captured heat energy from the main long-distance captured-heat energy and power-transmission trunk conveyance module 525 to the heat storage module 561, and subsequently, may recover and return the stored heat energy from the heat storage module 561 to the main long-distance captured-heat energy and power-transmission trunk conveyance module 525.

The following examples are provided to more fully various embodiments disclosed herein and are not intended to limit the scope of this disclosure in any way.

Example 1: Thermodynamic Modelling of a Three Closed-Loop Circulation System According to an Embodiment of the Present Disclosure Thermodynamic modelling was carried out for the three loop-closed-loop circulation system illustrated in FIGS. 1 and 14 operating at 0° C. ambient, to demonstrate the functionality and workability of the closed-loop circulation systems disclosed herein from an engineering thermodynamics perspective.

Figure 16:
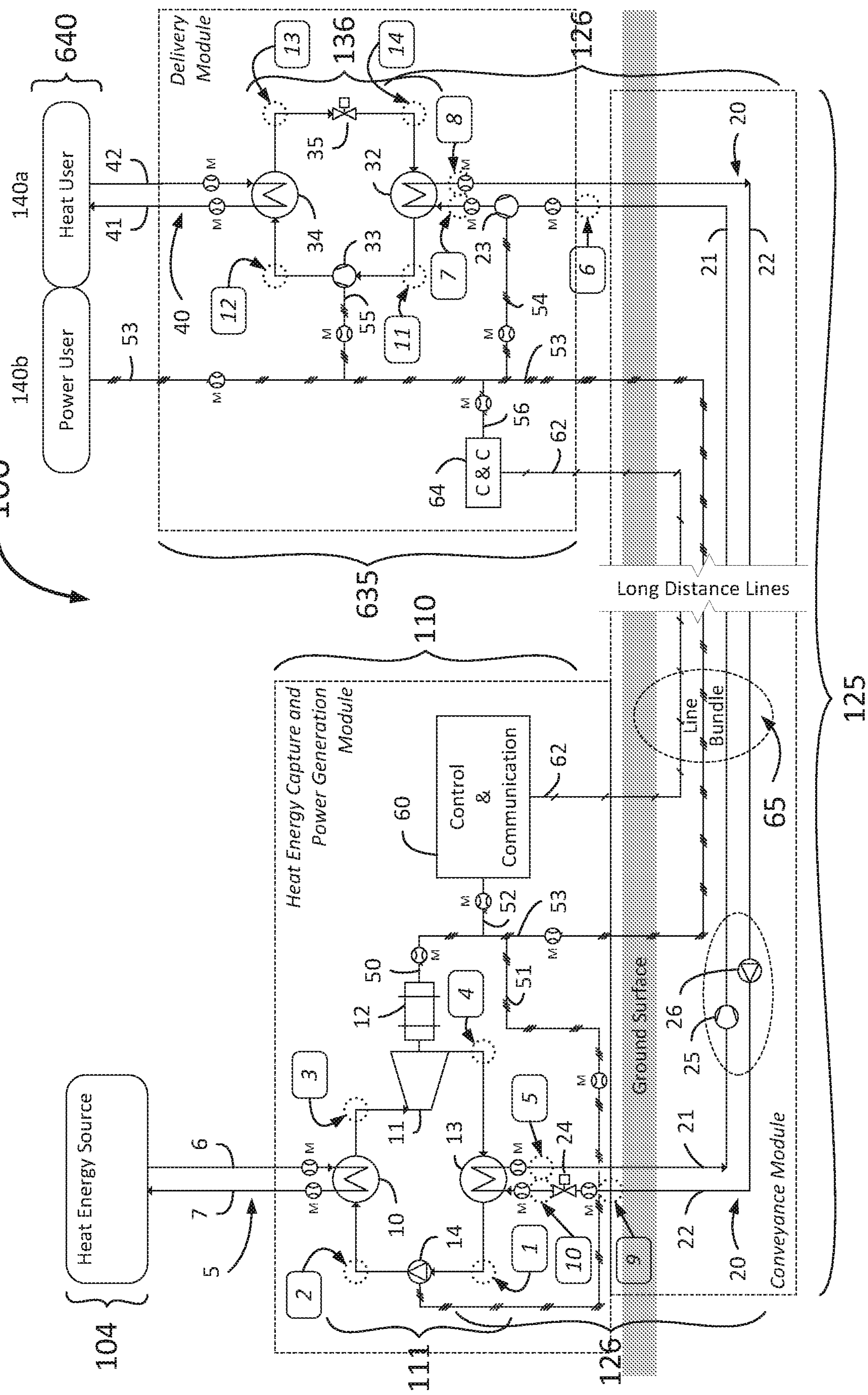
FIG. 16 is a schematic flowchart illustrating the locations of the working fluid thermodynamic properties that were modelled for each of the three closed loops shown in FIGS. 1 and 2, as discussed in Examples 1 and 2.

A simplified thermodynamic model as outlined herein was utilized. Some key elements of the thermodynamic model are:

1. Three closed loops wherein are circulating LBP working fluids, as disclosed in various embodiments of the present disclosure, wherein:
   The first loop is a heat energy capture and power generation loop 111 configured as illustrated in FIGS. 1 and 16 and comprises a simple Rankine cycle having a pump 14, a heat exchanger 10 that functions as a boiler (or a vaporiser or an evaporator), an expander 11 coupled with a generator 12 that captures mechanical energy with which to generate electrical power, and a heat exchanger 13 that functions as the condenser. The first loop 111 may be considered a simplified Organic Rankin Cycle (ORC) system because a LBP fluid is circulated within the loop 111 and has been configured to demonstrate the thermodynamic feasibility of this embodiment. Those skilled in this art will understand that other configurations and equipment such as reheat cycles, regenerative cycles, combined reheat and regenerative cycles, and the like, may be selected to adapt and optimize the systems disclosed herein, for specific situations and/or operating conditions and/or optimization goals. For example, the expander 11 could be substituted for with a turbine as illustrated in FIGS. 1 and 16, or alternatively, with a scroll, or a screw, or a rotary vane, or another type of suitable expander known to those skilled in this art. Also, other types of technologies may be substituted for the Rankine cycle and the organic Rankine cycle technologies. For example, a Kalina cycle technology may be substituted, or a sterling-engine cycle technology, or an absorption cycle technology, and the like.
   The second loop is a long-distance heat-energy conveyance loop 126 configured as illustrated in FIGS. 1 and 16 and comprises a compressor 23, a heat exchanger 32 that functions as a condenser, an expansion valve 24, and a heat exchanger 13 that functions as an evaporator, with engineering thermodynamic characteristics similar to that of a simplified heat pump cycle. Those skilled in this art will understand that other configurations and equipment such as cascade technologies, or multistage compression technologies, or absorption technologies, and the like, may be selected to adapt and optimize the systems disclosed herein, for specific situations and/or operating conditions and/or optimization goals.
   The third loop is a heat energy delivery loop 136 as illustrated in FIGS. 1 and 16, and comprises a compressor 33, a heat exchanger 34 that functions as a condenser, an expansion valve 35, and a heat exchanger 32 that functions as an evaporator, with engineering thermodynamic characteristics similar to that of a simplified heat pump cycle. Those skilled in this art will understand that other configurations and equipment such as cascade technologies, or multistage compression technologies, or absorption technologies, and the like, may be selected to adapt and optimize the systems disclosed herein, for specific situations and/or operating conditions and/or optimization goals.
2. Captured heat energy is transferred between the three closed loops as follows:

Heat energy captured from a source of heat energy is delivered to the heat energy capture and power generation loop 111, as illustrated in FIGS. 1 and 16, to a heat exchanger 10 wherein a high-pressure LBP working fluid in the heat energy capture and power generation loop 111 is evaporated (boiled) into a high-pressure vapor that drives the expander 11 which in turn, drives the generator 12 to generate power. Heat exchanger 10 can be a vessel wherein heat energy is exchanged within the vessel or alternatively, may a configuration wherein the heat exchanger that vaporises the circulating fluid is comprised of flowlines that extend into an outside heat energy source such as a wellbore, or into a nearby heat source, or the like.

The heat energy capture and power generation loop 111 and the long distance conveyance loop 126, as illustrated in FIGS. 1 and 16, are connected via a heat exchanger 13 that functions as: (i) a condenser on the heat energy capture and power generation loop side 111 and (ii) an evaporator on the conveyance loop side 126, whereby low-pressure vapor is condensed on the heat energy capture and power generation side 111 and liquid in the long-distance conveyance loop side 126 that is returning from the delivery module is evaporated. Condensation of the vapor releases heat energy that is transferred via the heat exchanger 13 to evaporate the liquid returning to the heat energy capture and power generation module 110 from the delivery module 135 via the long distance conveyance module 125 and thereafter, the vapor is returned to the delivery module.

The long-distance conveyance loop 126 and the delivery loop 136, as illustrated in FIGS. 1 and 16, are connected via a heat exchanger 32 that functions as a condenser on the conveyance loop side 126 and an evaporator on the delivery loop side 136, whereby vapor is condensed on the conveyance loop side 126 and liquid on the delivery loop side 136 is evaporated. Condensation of the vapor releases heat energy that is transferred via the heat exchanger 32 to evaporate the low-pressure liquid on the delivery loop side 136, whereafter the liquid on the conveyance loop side 126 is returned to the heat energy capture and power generation module 110.

Captured heat energy is delivered to a heat user site 140*b* as illustrated in FIGS. 1 and 16 from the delivery loop 136 via a heat exchanger 34 whereby vapor in the delivery loop 136 is condensed thereby releasing heat energy for use in the heat user site 140*b*. The heat exchanger 34 could be, for example but is not necessarily restricted to, aerial fan-driven heating coils or hot-water heaters or boilers heating circulating hot water or steam.

3. Operating parameters of the model:

(a) The schematic flowchart in FIG. 16 and the table in FIG. 18 summarize the operating parameters of the thermodynamic model. Locations of the state points are shown in FIG. 16 and the values used in the model in the table on FIG. 18. The state points are:

(i) [1], [2], [3], [4] for the first heat energy capture and power generation loop 111 and the pump 14, the first heat exchanger 10, the turbine 11, and the second heat exchanger 13, respectively;

(ii) [5], [6], [7], [8], [9], [10] for the second long distance conveyance loop 126 and the compressor 23, the third heat exchanger 32, the expansion valve 24, and the second heat exchanger 13, respectively; and (iii) [11], [12], [13], [14] for the third heat energy delivery loop 136 and the compressor 33, the fourth heat exchanger 34, the expansion valve 35, and the third heat exchanger 32, respectively.

(b) The values for pressure, temperature, enthalpy, and entropy for each of the state points used in this model [1], [2], [3], [4] for loop 111, [5], [6], [7], [8], [9], [10] for loop 126, and [11], [12], [13], [14] for loop 136 are summarized for the base model on the table in FIG. 18, in reference to the inlet and outlet values for each of the: (i) the pump 14, the first heat exchanger 10, the turbine 11, and the second heat exchanger 13, respectively, of the first heat energy capture and power generation loop 111, (ii) the compressor 23, the third heat exchanger 32, the expansion valve 24, and the second heat exchanger 13, respectively, of the second long-distance conveyance loop 126, and (iii) the compressor 33, the fourth heat exchanger 34, the expansion valve 35, and the third heat exchanger 32, respectively, of the third heat energy delivery loop 136.

(c) For the base model, an 80° C. source temperature and a 0° C. outlet temperature were used for the first heat energy capture and power generation loop 111, a 0° C. inlet temperature and a 15° C. outlet temperature were used for the second long-distance conveyance loop 126, and a 15° C. inlet temperature and a 60° C. outlet temperature were used for the third heat energy delivery loop. It should be noted that the 0° C. temperatures were considered as the ambient conveyance temperature for this model.

(d) The values used for this model were simplified idealisations wherein (i) the efficiencies of pumps, compressors, and expanders were at 100%, (ii) temperature differentials across heat exchangers were not included, (iii) heat losses or gains outside of the system including in the long-distance conveyance lines were not included, and (iv) the power requirements for long-distance flowline compressors and pumps 25, 26 were not included. Those skilled in this art will understand that real-world equipment efficiencies will be in the 87-93% range, that there will be temperature differentials in the heat exchangers for heat energy transfer to occur, and there will be heat losses or gains from outside of the system. On the other hand, real world configurations will include optimisations and therefore, this simplified model is sufficient for illustrating the engineering thermodynamics of the various embodiments of the present disclosure.

Figure 19:
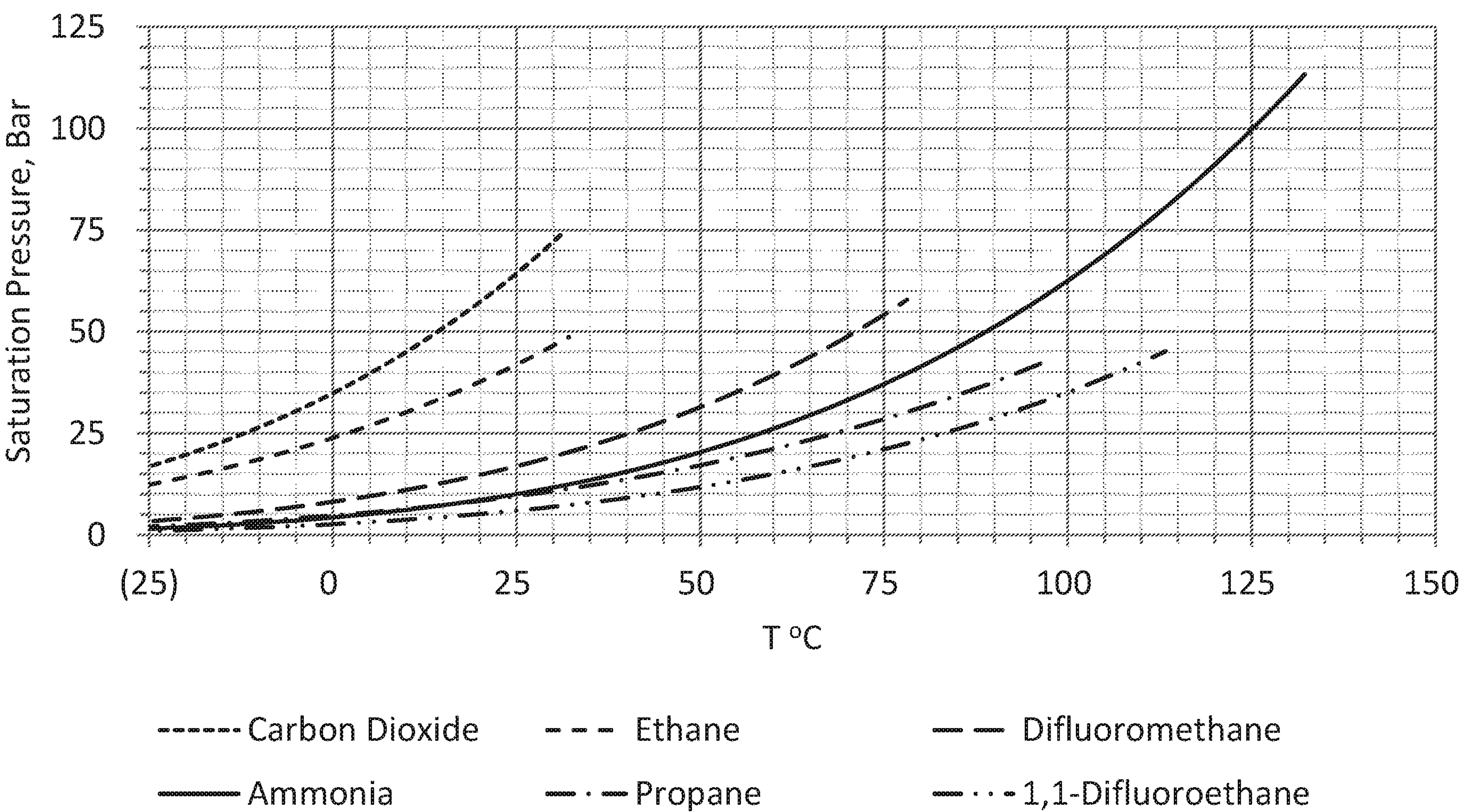
FIG. 19 is a chart showing the saturation (vapor) pressure curves for some examples of low-boiling-point fluids suitable for use in the heat energy conveyance loops disclosed herein.
Figure 20:
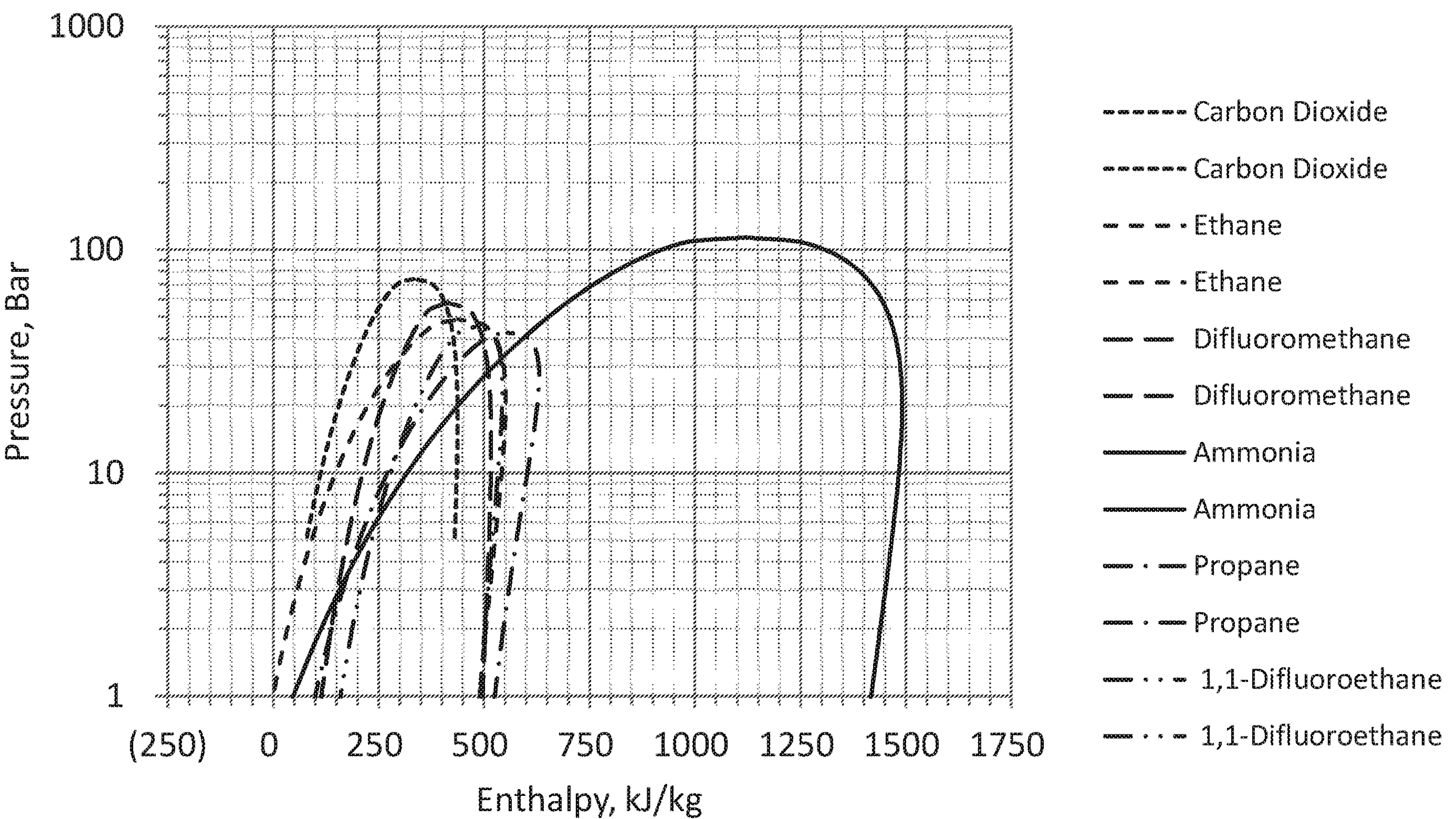
FIG. 20 is a chart showing the enthalpy curves for some low-boiling-point fluids suitable for use in the heat energy conveyance loops disclosed herein.
Figure 21:
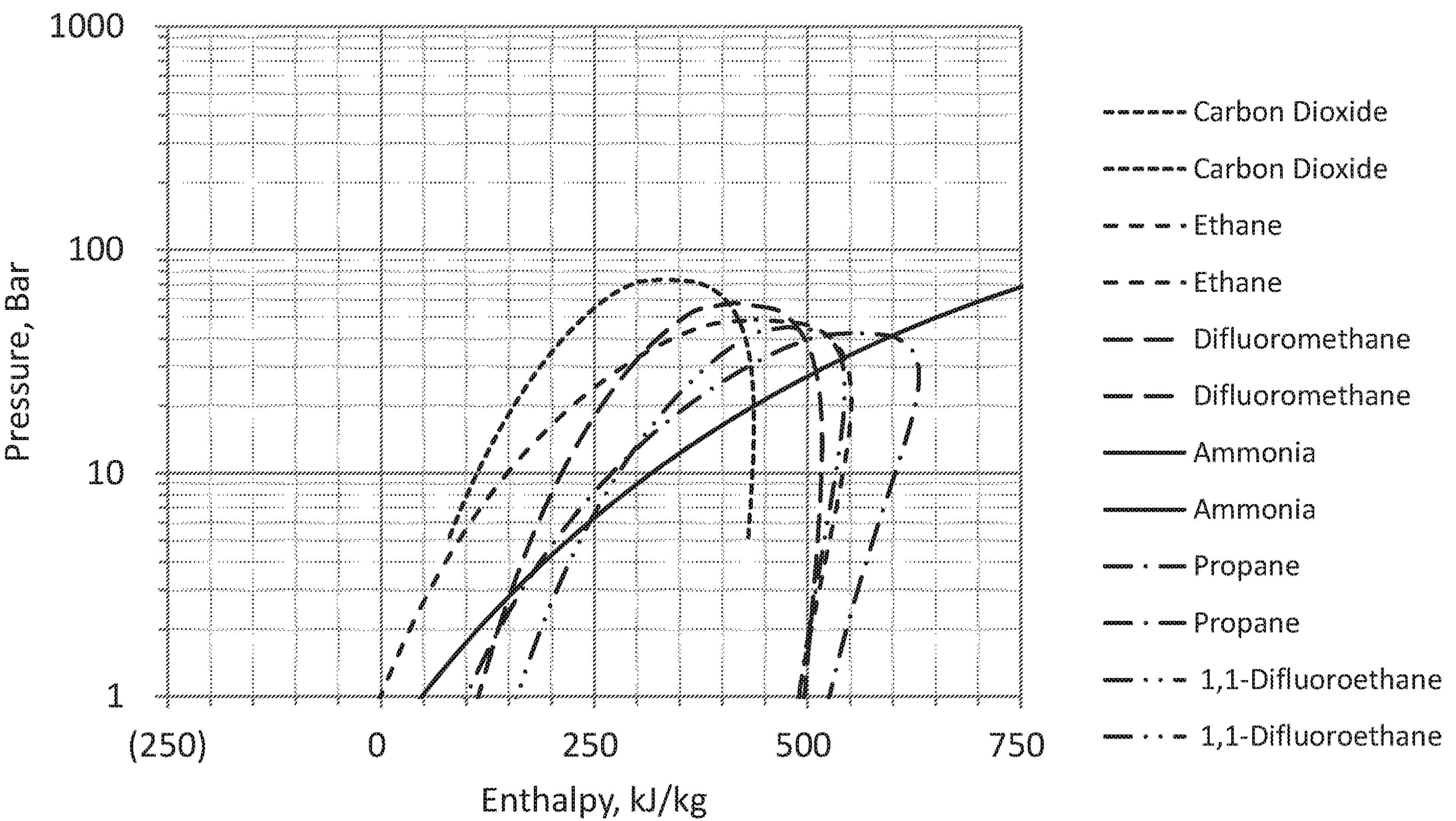
FIG. 21 is a chart showing the entropy curves for some low-boiling-point fluids suitable for use in the heat energy conveyance loops disclosed herein.

(e) The LBP working fluids chosen for the first heat energy capture and power generation loop 111, the second long-distance conveyance loop 126, and the third heat energy delivery loop 136, were ammonia, ethane, and difluoromethane R-32, respectively. However, it is to be noted that there are numerous other LBP working fluids that have suitable thermodynamic and physical properties, and may also be selected for use as LBP working fluids in each of the three loops 111, 126, 136 disclosed herein. For example, some suitable LBP fluids include $CO_2$, chlorodifluoromethane R-22, dichlorodifluoromethane R-12, propane, propene, propylene, and the like (FIGS. 19, 20, 21).

(f) The enthalpy and entropy state points for the ammonia working fluid circulating in the first heat energy capture and power generation loop 111, are shown in FIGS. 22A and 22B, respectively. The enthalpy and entropy state points for the ethane working fluid circulating in the second long-distance conveyance loop 126, are shown in FIGS. 23A and 23B, respectively. The enthalpy and entropy state points for the difluoromethane working fluid circulating in the third heat energy delivery loop 136, are shown in FIGS. 24A and 24B, respectively.

Figure 5:
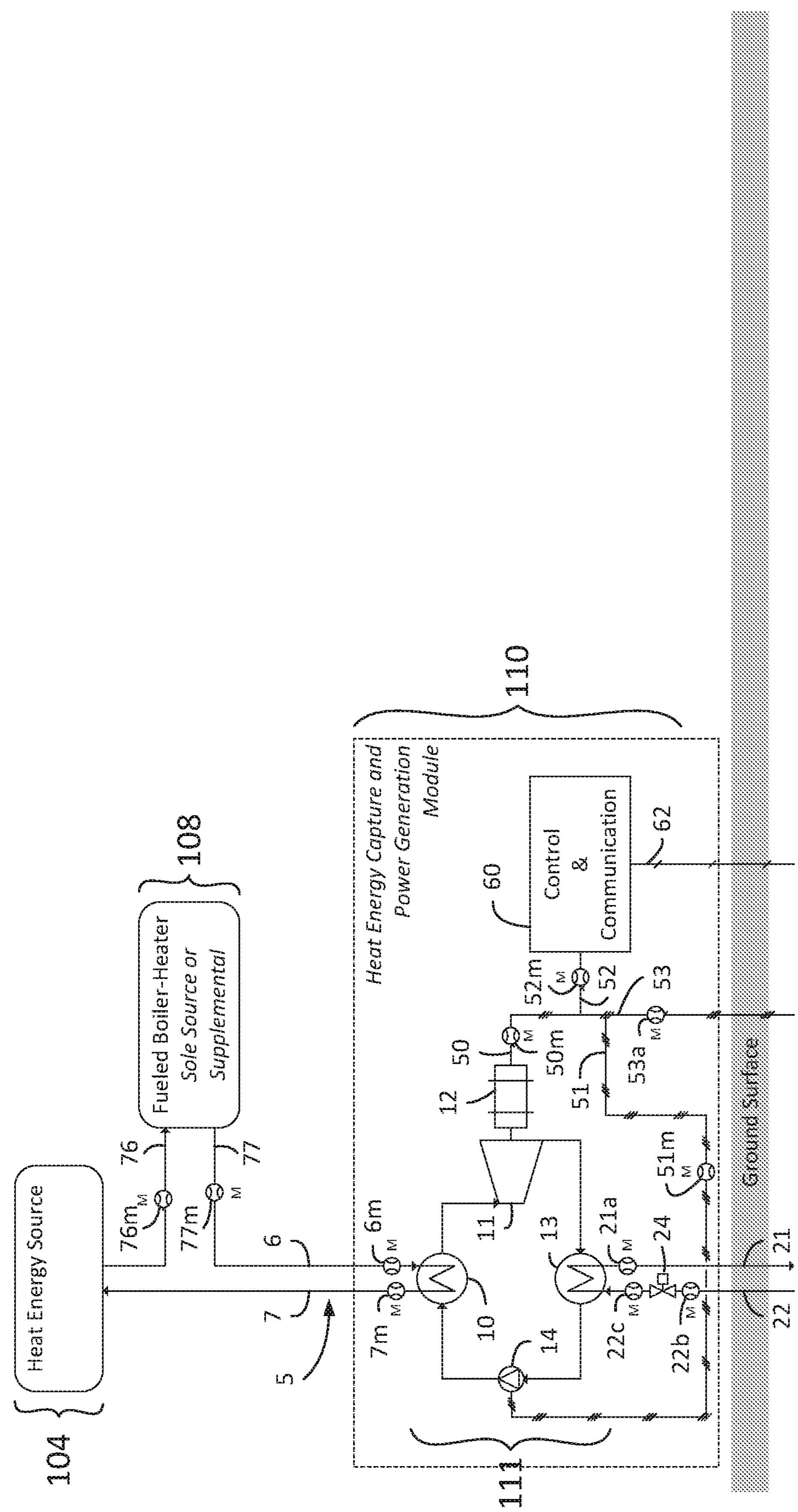
FIG. 5 is a schematic flowchart showing a view of the heat energy capture and power generation loop 111 of the system 100 shown in FIGS. 1 and 2, illustrating an additional input of heat energy captured from a fueled boiler-heater.

4. Energy balance calculations and some key observations:
   (a) In addition to the base energy balance model for an 80° C. heat energy source using the operating parameters listed in FIG. 16, energy balances were modelled for heat energy sources having temperatures of 60° C., 100° C., 120° C., and 140° C., as shown in the table in FIG. 23. All of the modelling cases were based on a heat energy capture and power generation loop 111 circulation rate of 1 kg/s, with the outlet temperature of the heat exchanger 10 at the same temperature as the heat energy source temperature. Energy balances were modelled-matched both within each of the three loops 111, 126, 136, and between the loops 111-126 and 126-136. This model also calculated the
      (i) enthalpy change rates for each element 14, 10, 11-12, 13, of the loops 111, for each element 23, 32, 24, 13 of loop 126, and for each element 33, 34, 35, 32 of loop 136, from each element's inlet and outlet values,
      (ii) the energy transferred between loops 111-126 and 126-136,
      (iii) the amounts of power produced,
      (iv) the amounts of power used, and
      (v) power shortfalls or surpluses, together with the amount of heat energy delivered to the user.
   (b) As shown in the table on FIG. 25, increasing the heat source temperature increased the fraction of mechanical energy extracted from the heat energy to generate power. One outcome of the $2^{nd}$ law of thermodynamics is that the fraction of heat energy that can be converted into mechanical energy for power generation by a heat engine is higher for higher source temperatures ($T_H$) compared to sink temperatures ($T_L$). Accordingly, it is evident that this system had the ability to generate power for its own requirements, and surplus power generated increased as the heat source temperatures were increased.
   (c) The amounts of power produced, power used, and shortfalls or surpluses as well as fraction of power requirements generated by the system 100 (FIG. 16) are summarized in FIG. 26. Based on this model, the system 100 illustrated in FIG. 14, began to generate power sufficient for its own requirements at heat source temperatures above 112° C. However, at lower heat source temperatures, i.e., at of 60° C. and 80° C. respectively, the system 100 still provided 54% and 72% of its power requirements. The power shortfall can be made up in such situations, by incorporating options such as using a fuel-fired heater-boiler as illustrated in FIG. 5, or by purchasing power from a grid as illustrated in FIG. 10, or by topping up the heat source temperature as illustrated in FIG. 4, to levels where the system 100 is self-sufficient in power, as illustrated in FIG. 5. It is also an option to acquire supplemental power from a grid or other sources as illustrated in FIGS. 8, 9, and 10.
   (d) Those skilled in this art will understand that the embodiments of the present disclosure and the associated opportunities are based on engineering fundamentals that include, for example:
      (iii) most engineering thermodynamic methodologies and processes are based on what is commonly referred to as "burn and turn" strategies whereby a fuel is burned to produce heat energy, using as much of the produced heat energy as possible to produce mechanical energy, and disposing of the what isn't captured for production of mechanical energy. An example of such "burn and turn" strategies includes a power plant that burns coal to generate high-pressure steam, flows the high-pressure steam through a turbine to produce mechanical energy with which to generate power, condenses the low-pressure steam to water thereby ejecting the heat to a cooling pond or other heat sink, and then pumping the water back into the boiler for reheating. Based such strategies, designing a system that is 11% efficient (for example 11% of the heat energy converted to mechanical energy per the heat balance modelling shown in the table on FIG. 16 for the 80° C. source temperature case) does not make sense as 89% of the energy is ejected (i.e., disposed of, wasted).
      (ii) However the systems disclosed herein are less concerned about the efficiency being only 10% or so. The systems disclosed herein may scavenge necessary or available heat energy for power generation to operate the system, additionally buying power or selling surplus power, and then sending whatever heat energy is left to a heat energy user wherein power generated is used (plus a top up of power or heat energy if necessary) to power the conveyance and delivery loops.
      (iii) An outcome of the $2^{nd}$ law of thermodynamics is that theoretical reversible efficiency (amount of heat energy converted to mechanical energy) of a reversible heat engine is a function of the ratio of the heat source temperature to the heat sink temperature ($\eta_{th,rev}=1-T_L/T_H$, in ° K). For a heat source temperature of 80° C. and a conventional strategy of ejecting heat at ambient (heat sink) temperatures of say 15° C., $\eta_{th,rev}=0.184$ (1−288/353), however for a sink heat of 0° C. $\eta_{th,rev}=0.227$ (1−273/353). For a source temperature of 60° C. $\eta_{th,rev}$ is 0.135 and 0.180 for sink temperatures 15° C. and 0° C. respectively. Accordingly, an aspect of the embodiments of the present disclosure is that the sink temperature ($T_L$) is lower than ambient, thereby allowing more of the source heat energy to be utilized for generating high-value mechanical energy for generating power.
   (e) Another aspect of the embodiments of the present disclosure and the associated opportunities is that these systems do not require that all the heat energy be captured from one source. As illustrated in FIGS. 4, 5, 8, 9, 10, the systems disclosed herein may access heat and power energy from multiple sources and from combinations of multiple sources. For example, if the source temperature is 80° C. that, based on this model will generate only 81% of the required power, a fuel-fired heater-boiler could be utilized to top up the source temperature to the 112° C. breakeven point. The system thus becomes self-sufficient in power requirements, with some supplemental fuel being used to top up the captured heat energy, with much of the energy from the top-up fuel required to generate additional power eventually still ending up as heat energy delivered to the user as power energy used by the compressors and pumps is transferred to the energy of the circulating LBP fluids as heat energy.

Example 2: Modelling of a Stand-Alone Self-Sufficient Long-Distance Heat-Energy and Power-Generation Capture, Distribution, Delivery, and Storage System According to an Embodiment of the Present Disclosure, Based on Systems with Configurations Comprising of Three Closed Loops Example 2 pertains to the modelling of a stand-alone self-sufficient long-distance heat-energy and power-generation capture, distribution, delivery, and storage system expanded from the system 400 illustrated in FIG. 13, whereby an expanded heat energy capture and power generation module delivers power and heat energy to multiple energy user sites. This part of the model illustrates how the engineering thermodynamics of such a system could function and shows that such a system is functional and workable.

In reference to the results of the modelling for Example 1 as summarized in the table on FIG. 23 together with the assumptions and calculations summarized in the table on FIG. 25, given a circulation rate of 1 kg/s of ammonia in the heat energy capture and power generation loop, the amount of energy delivered by the delivery loop was 1,480 kJ/s, which is an amount of energy that could supply sixty three residences with a heat duty of 23.4 kW (80,000 Btu/hr) per residence. As each of the sixty three delivery sites would have delivery modules with capacity and power requirements 1/63 of the one delivery model outlined in Example 1, the power requirements for the long-distance conveyance loop compressor and the heat energy delivery loop compressor would be 1.1 and 2.3 kW (1.5 and 3.1 hp) respectively for a total of 3.53 kW (4.6 hp). The modelling results in Example 2 demonstrate that the system provides a workable power requirement for a residential location, in particular since the power would be supplied by the system. As well the amount of top-up power requirements at the heat energy capture and power generation module for the lower-temperature heat energy locations would be quite small on a per residence basis.

Based on the results of the model disclosed in Example 1, the amount of heat energy captured with a circulation rate of 1 kg/s of ammonia would range from 1,379 to 1,538 kW for the range of heat source temperatures modelled. If the heat energy captured by the first heat energy capture and power generation loop was from a low-enthalpy geothermal heat energy source whereby deep sedimentary aquifer water is circulated from a wellbore or wellbores through the first heat exchanger of the heat energy capture and power generation loop, the circulation rates would vary from 474 to 226 $m^3/d$ (i.e., 2,984 to 1,419 bbl/d).

As calculated in the model of Example 1, the amount of power generated for the range of temperatures modelled is 119 to 278 kW (equivalent of 160 to 373 hp).

As for Example 1, these calculations are based on a simplified model that does not include calculations for power use by equipment as such flowline booster pumps and compressors, to circulate geothermal water, and auxiliaries. Albeit simplified, the results of the model affirm and demonstrate that the systems outlined in the embodiments of this disclosure are workable.

Example 3: Thermodynamic Modelling of a Two Closed-Loop Circulation System According to an Embodiment of the Present Disclosure Thermodynamic modelling was carried out for the two loop-closed-loop circulation system illustrated in FIGS. 4 and 17, and operating at a 15° C. ambient temperature.

Figure 17:
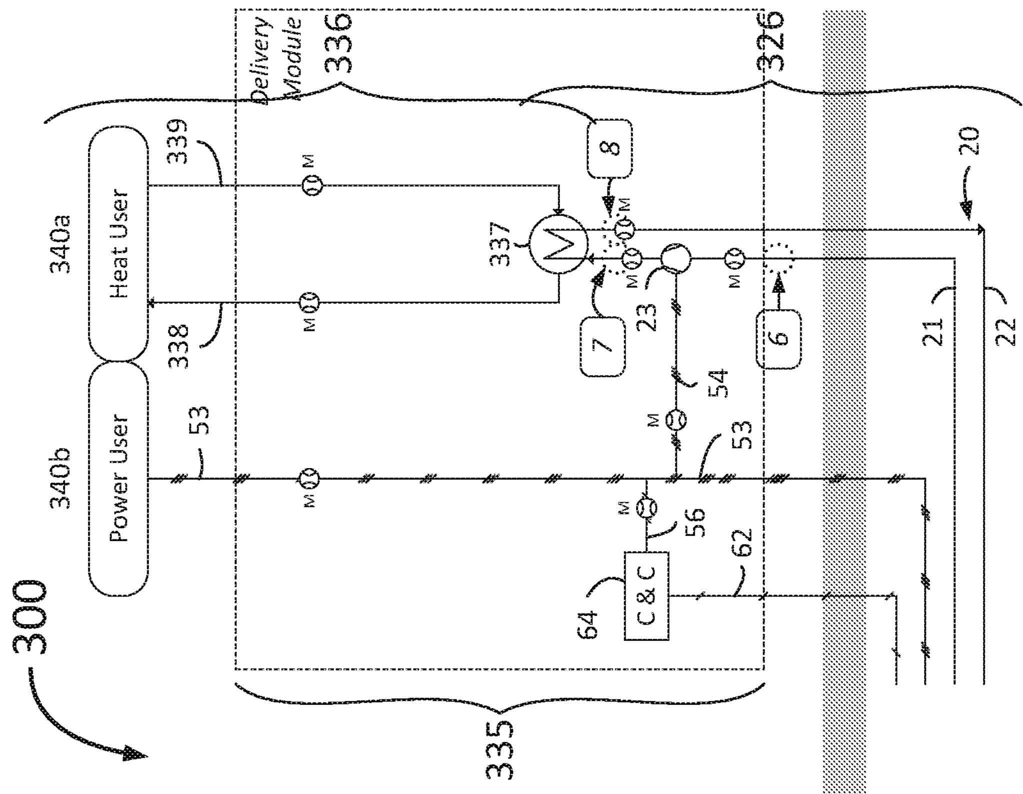
FIG. 17 is a schematic flowchart illustrating the locations of the circulating working fluid thermodynamic properties that were modelled for the second closed-loop module 335 shown in FIG. 12, as discussed in Examples 3 and 4.

The simplified three-loop thermodynamic model described in Example 1 was modified to model a two-loop closed-loop system. As illustrated in FIG. 17, the two-loop closed-loop system 300 did not include the third delivery loop. Instead of the heat energy being delivered to a user as illustrated in FIGS. 4 and 16 from the delivery loop 136 via a heat exchanger 34 whereby the delivery loop vapor was condensed thereby releasing heat energy for use by the user, the heat energy was delivered to the user directly from the conveyance loop 126 as illustrated in FIGS. 12 and 17 via a heat exchanger 337 whereby the conveyance loop vapor was condensed releasing heat energy directly for use by the user.

It is to be noted that warmer ambient conveyance temperatures drive a preference for two-loop closed-loop systems, while colder ambient conveyance temperature drive a preference for three loop-closed systems wherein the temperature difference between ambient conditions and the heat energy user is higher.

The operating parameters used in the two-loop model are shown in the table in FIG. 28 are similar to those used in Example 1 (FIG. 18). The energy balance results for Example 3 are summarized in the table in FIG. 29 and FIGS. 30A, 30B in a similar fashion to those for Example 1 (see FIGS. 25, 26A, 26B).

The amount of available mechanical energy for power generation in the heat energy capture and power generation loop was less due to higher sink temperatures. However, the amount of power required to deliver heat energy to the user at the delivery site was less because the temperature increase was less, and in the case of this model, largely offsetting.

Example 4: Modelling of a Stand-Alone Self-Sufficient Long-Distance Heat-Energy and Power-Generation Capture, Distribution, Delivery, and Storage System According to an Embodiment of the Present Disclosure, Based on Systems with Configurations Comprising of Two Closed Loops Example 4 is a model of a stand-alone self-sufficient long-distance heat-energy and power-generation capture, distribution, delivery, and storage system configured as illustrated in FIG. 13, whereby a heat energy capture and power generation module delivers power and heat energy to several user sites utilizing a two closed-loop system 400 operating at an ambient temperature of 15° C.

The model for Example 2 was modified whereby the system 400 as illustrated in FIG. 13 is configured for a two-loop closed-loop system instead of a three-loop closed-loop system. As for Example 3, this part of the model illustrates how the engineering thermodynamics of such a system could function.

In reference to the results of the modelling for Example 2 as summarized in the table on FIG. 28 together with the assumptions and calculations summarized in the table on FIG. 29, given a circulation rate of 1 kg/s of ammonia in the heat energy capture and power generation loop, as summarized in FIG. 31, the amount of energy delivered to the heat energy user by the conveyance loop is 1,383 kJ/s, which is an amount of energy that could supply fifty nine residences with a heat duty of 23.4 kW (80,000 Btu/hr) per residence. As each of the fifty nine delivery sites would have delivery modules with capacity and power requirements 1/59 of the one delivery model outlined in Example 3, the power requirements for the conveyance loop compressor would be 3.0 kW (4.0 hp). This example provides a functional and workable power requirement for a residential location, in particular since the power would be supplied by the system. As well the amount of top-up power requirements at the heat energy capture and power generation module for the lower-temperature heat energy sources would be quite small on a per residence basis.

Based on the results of the model described in Example 2, the amount of heat energy captured with a circulation rate of 1 kg/s of ammonia would range from 1,291 to 1,444 kW for the range of heat source temperatures modelled. However, if the heat energy captured were from a low-enthalpy geothermal heat energy source whereby deep sedimentary aquifer water is circulated from a wellbore or wellbores through the heat exchanger of the heat energy capture and power generation loop, the circulation rates would vary from 444 to 212 $m^3$/d (i.e., 2,794 to 1,332 bbl/d).

As calculated in the model of Example 1, the amount of power generated for the range of temperatures modelled is 87 to 240 kW (equivalent of 117 to 321 hp).

These results are based on a simplified thermodynamic model as described in Example 2. Albeit simplified the model serves to demonstrate that systems based on these embodiments are functional and workable.

NUMBER KEY

FIGS. 1-3

100—three-loop system with heat energy capture and power generation, long-distance conveyance, and delivery to a single site; FIGS. 1, 2, 3
104—heat energy source
106—delivered supplemental electrical power source
110—heat energy capture and power generation module
111—heat energy capture and power generation loop
125—long-distance conveyance module
126—long-distance conveyance loop
135—heat energy delivery module
136—heat energy delivery loop
140*a*—heat user
140*b*—power user
5—first closed-loop piping infrastructure
6—vapor flowline (1st closed loop)
6*m*—meter vapor flowline
7—liquid flowline (1st closed loop)
7*m*—meter liquid flowline
10—heat exchanger, heat energy source 104 to loop 111
11—turbine, loop 111
12—generator
13—heat exchanger, loop 111 to loop 126
14—pump, loop 111
15—heat exchanger (FIGS. 6, 7)
16—expansion valve (FIG. 11)
20—second closed-loop infrastructure
21—vapor flowline, loop 126
21*a*—meter vapor flowline, loop 126 module 110
21*b*—meter vapor flowline, loop 126 module 125
21*c*—meter high pressure vapor, loop 126 module 135
22—liquid flowline, loop 126
22*a*—meter liquid flowline, loop 126 module 110
22*b*—meter liquid flowline, loop 126 module 135
22*c*—meter high-pressure liquid, loop 126 module 135
23—compressor, loop 126
24—expansion valve, loop 126
25—booster compressors, module 125
26—booster pumps, module 125
32—heat exchanger, loop 126 to loop 136
33—compressor, loop 136
34—heat exchanger, loop 136 to heat user 140*a*
35—expansion valve, loop 136
40—third closed-loop piping infrastructure
41—vapor flowline pipe, heat user 140*a* supply
41*m*—meter, vapor flowline 41
42—liquid flowline pipe, heat user 140*a* return
42*m*—meter, liquid flowline 42
50—electric power transmission cable
50*m*—meter, power cable 50
51—power cable, pump 14 supply
51*m*—meter, power cable 51
52—power cable into control & communications 60
52*m*—meter, power cable 52
53—power transmission trunk cable, module 126
53*a*—meter, power transmission trunk cable 53 into 2nd module 125
53*b*—meter, power transmission trunk cable 53 to power user 140*b*
54—power cable, compressor 23 supply
54*m*—meter, power cable 54
55—power cable, compressor 32 supply
55*m*—meter, power cable 55
56—power cable into control & communications 64
56*m*—meter, power cable 56
60—control & communication systems, module 110
62—control system cable, module 126
64—control & communication systems, module 135
65—line bundle

FIGS. 4-7

70—vapor flowline from geothermal source 104*a* to heat exchanger 10, loop 111
70*m*—meter, vapor flowline 70
71—liquid flowline from heat exchanger 10 to geothermal source 104*a*, loop 111
71*m*—meter, liquid flowline 71
72—vapor flowline from thermal solar source 104*b* to heat exchanger 10, loop 111
72*m*—meter, vapor flowline 72
73—liquid flowline from heat exchanger 10 to thermal solar source 104*b*, loop 111
73*m*—meter, liquid flowline 73
74—vapor flowline from waste heat source 104*c* to heat exchanger 10, loop 111
74*m*—meter, vapor flowline 74
75—liquid flowline from heat exchanger 10 to waste heat source 104*c*, loop 111
75*m*—meter, liquid flowline 75
76—liquid flowline from heat energy source 104 to fueled boiler-heater source source 108, loop 111
76*m*—meter, liquid flowline 76
77—vapor flowline from fueled boiler-heater source 108 to heat exchanger 10, loop 111
77*m*—meter, vapor flowline 77

FIGS. 8-10

78—power cable from delivered supplemental electrical power source 106
78*m*—meter, power cable 78
80—power cable transmitting supplemental electrical power from PV solar source 106*a*
80*m*—meter, power cable 80

81—power cable transmitting supplemental electrical power from a power grid 106*b*
81*m*—meter, power cable 81
82—power cable transmitting supplemental electrical power from a smart energy grid 106*c*
82*m*—meter, power cable 82
83—power cable transmitting supplemental electrical power from a local distributed grid 106*d*
83*m*—meter, power cable 83
FIG. 11
200—three-loop system without power generation
204—heat energy source
206—delivered supplemental electrical power from a supplemental source
210—heat energy capture and power generation module
211—heat energy capture and power generation loop
225—long-distance conveyance module
226—long-distance conveyance loop
FIG. 12
300—two-loop system, conveyance loop is delivery loop (FIG. 10)
335—delivery module
336—delivery loop
337—heat exchanger in communication with long-distance conveyance loop 126
338—vapor flowline from heat exchanger 337 to heat user 340*a*
338*m*—meter vapor flowline
339—liquid flowline from heat user 340*a* to heat exchanger 337
339*m*—meter liquid flowline
FIG. 13:
400—three closed-loop system with heat energy capture and power generation, long-distance conveyance, and delivery to multiple sites
410—heat energy capture and power generation module
425—long-distance captured-heat energy and power-transmission trunk conveyance module
425*a*—branch heat-energy-delivery conveyance module to user "a"
425*b*—branch heat-energy-delivery conveyance module to user "b"
425*c*—branch heat-energy-delivery conveyance module to user "c"
425*d*—branch heat-energy-delivery conveyance module to user "d"
425*e*—branch heat-energy-delivery conveyance module to user "e"
425*f*—branch heat-energy-delivery conveyance module to user "f"
425*g*—branch heat-energy-delivery conveyance module to user "g"
435*a*—heat energy and power delivery module to user "a"
435*b*—heat energy and power delivery module to user "b"
435*c*—heat energy and power delivery module to user "c"
435*d*—heat energy and power delivery module to user "d"
435*e*—heat energy and power delivery module to user "e"
435*f*—heat energy and power delivery module to user "f"
435*g*—heat energy and power delivery module to user "g"
FIGS. 14-15
500—heat energy capture and distribution system having a main long-distance conveyance trunkline interconnected with multiple heat energy capture and power generation loops and with multiple heat energy and power delivery sites
502—waste heat energy source
502*a*—branch conveyance line from 502 to 525
504—thermal solar heat energy source
504*a*—conveyance line from 504 to 540*b*
506*a*—module for generating power from PV solar
506*aa*—branch conveyance line from 506*a* to 525
506*b*—module for capturing heat energy from thermal solar
506*bb*—branch conveyance line from 506*a* to 525
510*a*—a first installation of a heat energy capture and power generation module (having heat-sink storage)
510*b*—a second installation of a heat energy capture and power generation module (having a supplemental fuel-fired heat source)
510*c*—a third installation of a heat energy capture and power generation module
510*d*—a fourth installation of a heat energy capture and power generation module (heat energy from thermal solar; power generation from PV solar; a heat-sink storage; power storage)
515*a*—power storage module
515*aa*—power cables to/from 515*a* and 525
515*b*—geothermal heat storage module
515*bb*—branch conveyance line from 515*b* to 525
525—long-distance captured-heat energy and power-transmission trunk conveyance module
525*a*—branch conveyance line from 510*a*
525*b*—branch conveyance line from 510*b*
525*c*—branch conveyance line from 510*c*
525*d*—branch conveyance line to/from 525*d*
535*a*—branch conveyance line to 540*a*
535*b*—branch conveyance line to 540*b*
535*c*—branch conveyance line to 540*c*
535*d*—branch conveyance line to 540*d*
535*e*—branch conveyance line to 540*e*
540*f*—branch conveyance line to 540*f*
540*g*—branch conveyance line to 540*g*
540*h*—branch conveyance line to 540*h*
540*a*—heat and power delivery module/user
540*b*—heat and power delivery module/user
540*c*—heat and power delivery module/user
540*d*—heat and power delivery module/user
540*e*—heat and power delivery module/user
540*f*—heat and power delivery module/user
540*g*—heat and power delivery module/user
540*h*—heat and power delivery module/user
551—geothermal heat source
552—waste heat source
553—fuel-fired heat source
554—thermal solar heat source
555—heat source power generation
556—fuel-fired power generation
557—wind power generation
558—PV solar power generation
559—heat user
560—power user
561—geothermal heat-sink storage module
562—power storage module
FIG. 16
111-[1]—state point 1, loop 111
111-[2]—state point 2, loop 111
111-[3]—state point 3, loop 111
111-[4]—state point 4, loop 111
126-[5]—state point 5, loop 126
126-[6]—state point 6, loop 126
126-[7]—state point 7, loop 126
126-[8]—state point 8, loop 126
126-[9]—state point 9, loop 126
126-[10]—state point 10, loop 126

136-11—state point 11, loop 136
136-12—state point 12, loop 136
136-13—state point 13, loop 136
136-14—state point 14, loop 136
FIG. 15
326-6—state point 6, loop 326
326-7—state point 7, loop 326
326-8—state point 8, loop 326
326-9—state point 9, loop 326

The invention claimed is:

1. A system for capturing and collecting energy from an energy supply location and delivering the captured energy to an energy delivery location, the system comprising:

a heat energy capture closed-loop module in communication with a source of heat energy, said heat energy capture closed-loop module comprising a first closed-loop piping infrastructure wherein is circulating a first low-temperature-boiling-point working fluid having a liquid phase and a vapor phase, said first closed-loop module configured to capture the heat energy from the source of heat energy and to transfer the captured heat energy to the first low-temperature-boiling-point working fluid thereby converting the first working fluid into its vapor phase, said first closed-loop module provided with an apparatus configured for generating electrical power by converting a portion of the vaporized working fluid into its liquid phase; and a long-distance umbilical cord apparatus configured for interconnecting the heat energy capture closed-loop module with the energy delivery location, said umbilical cord apparatus comprising:

a first end that is demountably and sealably engageable with the heat energy capture closed-loop module;

a second end that is demountably and sealably engageable with the energy delivery location;

a first pipe configured for demountable and sealable engagement with the energy supply location and for receiving therefrom a first flow of a second low-temperature-boiling-point working fluid selected from ammonia, $CO_2$, ethane, propane, propene, propylene, chlorodifluoromethane R-22, dichlorodifluoromethane R-12, and difluoromethane R-32, and for demountable and sealable engagement with the energy delivery location and for delivery of the first flow thereto, said first pipe provided with a first protective covering therealong;

a second pipe configured for demountable and sealable engagement with the energy delivery location and for receiving therefrom a second flow of the second low-temperature-boiling-point working fluid selected from ammonia, $CO_2$, ethane, propane, propene, propylene, chlorodifluoromethane R-22, dichlorodifluoromethane R-12, and difluoromethane R-32, and for demountable and sealable engagement with the energy supply location and for delivery of the second flow thereto, said second pipe provided with a second protective covering therealong;

a power transmission trunk cable configured for demountable engagement with heat energy capture closed-loop module and the energy delivery location; and a control systems cable configured for demountable engagement with the heat energy capture closed-loop module and the energy delivery location;

wherein the first pipe, the second pipe, the power transmission trunk cable, and the control systems cable are bundled together and are provided with a third protective covering therealong from the first end to the second end.

2. The system according to claim 1, wherein one or more of the first protective covering, the second protective covering, and the third protective covering comprises a temperature-resistant material.

3. The system according to claim 1, wherein one or more of the first protective covering, the second protective covering, and the third protective covering comprises an insulating material.

4. The system according to claim 1, wherein the third protective covering is a flexible coiled tubing.

5. The system according to claim 4, wherein the long-distance umbilical cord apparatus additionally comprises a sensor therealong.

6. The system according to claim 5, wherein the sensor is a leakage sensor.

7. The system according to claim 1, wherein the second end of the long- distance umbilical cord apparatus is demountably and sealably engageable with a first end of a second long-distance umbilical cord apparatus.

* * * * *